United States Patent [19]

Togano et al.

[11] Patent Number: 5,075,030

[45] Date of Patent: Dec. 24, 1991

[54] LIQUID CRYSTAL COMPOSITION AND LIQUID CRYSTAL DEVICE USING SAME

[75] Inventors: Takeshi Togano, Yokohama; Takao Takiguchi, Tokyo; Takashi Iwaki, Isehara; Yoko Yamada, Atsugi; Shinichi Nakamura, Atsugi; Shosei Mori, Atsugi, all of Japan

[73] Assignee: Canon Kabushiki Kaisha, Tokyo, Japan

[21] Appl. No.: 558,488

[22] Filed: Jul. 27, 1990

[30] Foreign Application Priority Data

Jul. 31, 1989 [JP] Japan .................... 1-198262

[51] Int. Cl.$^5$ .................... C09K 19/52; C09K 19/34
[52] U.S. Cl. .................... 252/299.61; 252/299.01
[58] Field of Search .................... 252/299.01, 299.61; 350/350 R, 250 S; 548/136, 142; 544/335

[56] References Cited

U.S. PATENT DOCUMENTS

| | | | |
|---|---|---|---|
| 4,367,924 | 1/1983 | Clark et al. | 350/334 |
| 4,834,904 | 5/1989 | Krause et al. | 252/299.01 |
| 4,904,410 | 2/1990 | Nohira et al. | 252/299.61 |
| 4,927,244 | 5/1990 | Bahr et al. | 350/350 S |

FOREIGN PATENT DOCUMENTS

| | | |
|---|---|---|
| 107216 | 8/1981 | Japan . |
| 193426 | 11/1984 | Japan . |
| 193427 | 11/1984 | Japan . |
| 156046 | 8/1985 | Japan . |
| 156047 | 8/1985 | Japan . |
| 245142 | 10/1986 | Japan . |
| 242724 | 11/1986 | Japan . |
| 246722 | 11/1986 | Japan . |
| 246723 | 11/1986 | Japan . |
| 249024 | 11/1986 | Japan . |
| 249025 | 11/1986 | Japan . |
| 051644 | 3/1987 | Japan . |
| 045258 | 2/1988 | Japan . |
| 222148 | 9/1988 | Japan . |
| 061472 | 3/1989 | Japan . |
| 8808019 | 10/1988 | PCT Int'l Appl. . |

OTHER PUBLICATIONS

Helv. Chim. Acta., vol. 39, No. 59 (1956) 504:13.
Helv. Chim. Acta., vol. 40, No. 249 (1957) 2428:33.
Appl. Phys. Lett., vol. 18, No. 4 (Feb. 1971) 127:28.
R. Tschesche and W. Fuhrer. Chem. Ber. vol. III (1978) 3502:05.
P. B. Rasmussen et al., Bull. Soc. Chim. de France, No. 1 (1985) 62:65.

*Primary Examiner*—John S. Maples
*Assistant Examiner*—Shean C. Wu
*Attorney, Agent, or Firm*—Fitzpatrick, Cella, Harper & Scinto

[57] ABSTRACT

A liquid crystal composition, comprising: at least one compound represented by the following formula (I):

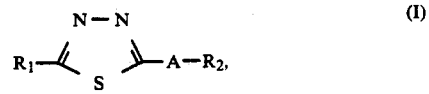

wherein $R_1$ and $R_2$ respectively denote an optically inactive linear or branched alkyl group having 1–18 carbon atoms capable of including one or non-neighboring two or more methylene groups which can be replaced with at least one species of

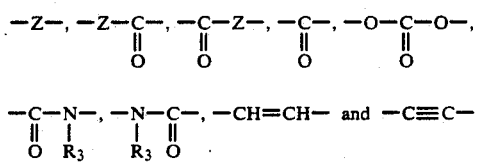

wherein Z denotes —O— or —S— and $R_3$ denotes hydrogen or an alkyl group having 1–5 carbon atoms; A denotes —$A_1$— or —$A_2$—$A_3$— wherein $A_1$ denotes (Abstract continued on next page.)

-continued
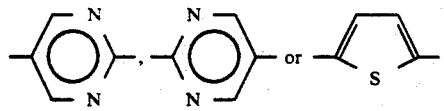
and $A_2$ and $A_3$ respectively denote
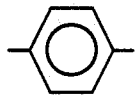
or —$A_1$—; and at least one compound represented by the following formula (II):
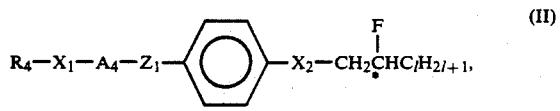
wherein $R_4$ denotes a linear or branched alkyl group having 1–18 carbon atoms capable of having a substituent; $X_1$ denotes a single bond, —O—,
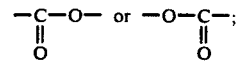
$X_2$ denotes a single bond, —O— or
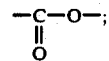
$Z_1$ denotes a single bond or
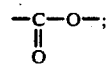
$A_4$ denotes
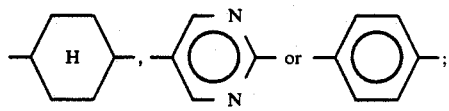
and $l$ is 1–12.
6 Claims, 2 Drawing Sheets

LIQUID CRYSTAL COMPOSITION AND LIQUID CRYSTAL DEVICE USING SAME

FIELD OF THE INVENTION AND RELATED ART

The present invention relates to a liquid crystal composition used in a liquid crystal display device, a liquid crystal-optical shutter, etc., more particularly to a novel liquid crystal composition with improved responsiveness to an electric field and a liquid crystal device using the liquid crystal composition.

Hitherto, liquid crystal devices have been used as an electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is on the order of milli-seconds, which is too slow for many uses. On the other hand, a simple matrix system of driving is most promising for application to a large-area flat display in view of cost, productivity, etc., in combination. In the simple matrix system, an electrode arrangement wherein scanning electrodes and signal electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected or regions where a scanning electrode is not selected and a signal electrode is selected (which regions are so called "half-selected points"). If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N. Accordingly, the larger the number of scanning lines are, the smaller is the voltage difference of an effective value applied to a selected point and non-selected points when scanning is repeatedly effected. As a result, this leads to unavoidable drawbacks of lowering of image contrast or occurrence of interference or crosstalk. These phenomena are regarded as essentially unavoidable problems appearing when a liquid crystal having no bistability (i.e. liquid crystal molecules are horizontally oriented with respect to the electrode surface as stable state and is vertically oriented with respect to the electrode surface only when an electric field is effectively applied) is driven (i.e. repeatedly scanned) by making use of a time storage effect. To overcome these drawbacks, the voltage averaging method, the two-frequency driving method, the multiple matrix method, etc. has been already proposed. However, any method is not sufficient to overcome the above-mentioned drawbacks. As a result, it is the present state that the development of large image area or high packaging density in respect to display elements is delayed because it is difficult to sufficiently increase the number of scanning lines.

To overcome drawbacks with such prior art liquid crystal devices, the use of liquid crystal devices having bistability has been proposed by Clark and Lagerwall (e.g. Japanese Laid-Open Patent Appln. No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric and retaining the resultant state in the absence of an electric field.

In addition to the above-described characteristic of showing bistability, such a ferroelectric liquid crystal (hereinafter sometimes abbreviated as "FLC") has an excellent property, i.e., a high-speed responsiveness. This is because the spontaneous polarization of the ferroelectric liquid crystal and an applied electric field directly interact with each other to induce transition of orientation state. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, ferroelectric liquid crystal materials developed heretofore cannot be said to satisfy sufficient characteristics required for a liquid crystal device including low-temperature operation characteristic, high-speed responsiveness, etc. Among a response time $\tau$, the magnitude of spontaneous polarization Ps and viscosity $\eta$, the following relationship exists: $\tau = \eta/(Ps \cdot E)$, where E is an applied voltage. Accordingly, a high response speed can be obtained by (a) increasing the spontaneous polarization Ps, (b) lowering the viscosity $\eta$, or (c) increasing the applied voltage E. However, the driving voltage has a certain upper limit in view of driving with IC, etc., and should desirably be as low as possible. Accordingly, it is actually necessary to lower the viscosity $\eta$ or increase the spontaneous polarization Ps.

A ferroelectric chiral smectic liquid crystal having a large spontaneous polarization generally provides a large internal electric field in a cell given by the spontaneous polarization and is liable to pose many constraints on the device construction giving bistability. Further, an excessively large spontaneous polarization is liable to accompany an increase in viscosity, so that remarkable increase in response speed may not be attained as a result.

Further, if it is assumed that the operation temperature of an actual display device is 5-40° C., the response speed changes by a factor of about 20, so that it actually exceeds the range controllable by driving voltage and frequency.

As described hereinabove, commercialization of a ferroelectric liquid crystal device requires a ferroelectric chiral smectic liquid crystal composition having a low viscosity, a high-speed responsiveness and a small temperature-dependence of response speed.

In a representative FLC cell structure, a pair of substrates are disposed, each substrate of e.g. glass being provided with an electrode pattern of e.g. ITO, further thereon with a layer of e.g. SiO$_2$ (about 1000 Å) for preventing short circuit between the pair of substrates and further thereon with a film of e.g. polyimide (PI; such as SP-510, 710, ... available from Toray K. K.) of about 400 Å in thickness, which is then treated for alignment control by rubbing with e.g. an acetate fiber-planted cloth. Such a pair of substrates are disposed opposite to each other so that their alignment control directions are symmetrical and the spacing between the substrates is held at 1-3 microns.

On the other hand, it is known that the ferroelectric liquid crystal molecules under such non-helical conditions are disposed in succession so that their directors (longer molecular axes) are gradually twisted between the substrates and do not shown a uniaxial orientation or alignment (i.e., in a splay alignment state). A problem in this case is a low transmittance through the liquid crystal layer.

Transmitted light intensity I through a liquid crystal is given by the following equation with respect to the incident light intensity $I_0$ under cross nicols when the uniaxial alignment of the molecules is assumed:

$$I = I_0 \sin^2(4\theta a) \sin^2(\pi \Delta n d/\lambda) \quad (1),$$

wherein $\Delta n$ denotes the refractive index anisotropy of the FLC; d, the cell thickness; $\lambda$, the wavelength of the incident light; and $\theta a$, a half of the angle between two stable states (tilt angle).

When a conventional FLC cell is used, it has been experimentally known that $\theta a$ is 5-8 degrees under a twisted alignment condition. The control of physical properties affecting the term $\Delta n d \pi / \lambda$ cannot be easily performed, so that it is desired to increase $\theta a$ to increase I. However, this has not been successfully accomplished by only a static alignment technique.

With respect to such a problem, it has been proposed to utilize a torque relating to a dielectric anisotropy $\Delta \epsilon$ of an FLC (1983 SID report from AT & T; Japanese laid-Open Patent Applns. 245142/1986, 267722/1986, 246723/1986, 246724/1986, 249024/1986 and 249025/1986). More specifically, a liquid crystal molecule having a negative $\Delta \epsilon$ tends to become parallel to the substrates under application of an electric field. By utilizing this property, if an effective value of AC electric field is applied even in a period other than switching, the above-mentioned twisted alignment is removed, so that $\theta a$ is increased to provide an increased transmittance (AC stabilization effect).

SUMMARY OF THE INVENTION

An object of the present invention is to provide a chiral smectic liquid crystal composition having a large response speed and a decreased temperature-dependence of the response speed adapted for providing a practical ferroelectric liquid crystal device.

Another object of the present invention is to provide a liquid crystal composition which shows an AC stabilization effect providing remarkably improved display characteristics.

A further object of the present invention is to provide a liquid crystal device using such a liquid crystal composition and showing improved driving and display characteristics.

According to the present invention, there is provided a liquid crystal composition, comprising at least one compound represented by the following formula (I):

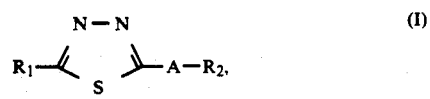

wherein $R_1$ and $R_2$ respectively denote an optically inactive linear or branched alkyl group having 1-18 carbon atoms capable of including one or non-neighboring two or more methylene groups which can be replaced with at least one species of

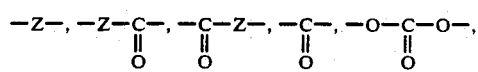

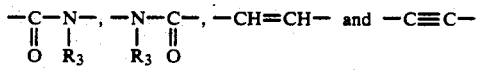

wherein Z denotes —O— of —S— and $R_3$ denotes hydrogen or an alkyl group having 1-5 carbon atoms; A denotes —$A_1$— or —$A_2$—$A_3$— wherein $A_1$ denotes

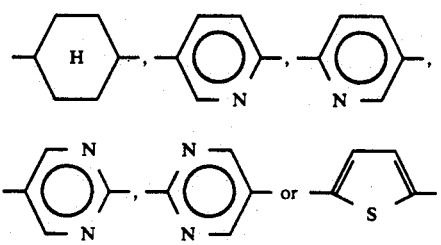

and $A_2$ and $A_3$ respectively denote

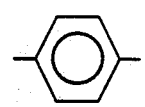

or —$A_1$—; and at least one compound represented by the following formula (II):

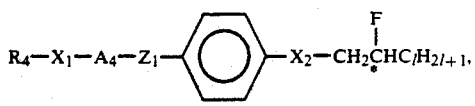 (II)

wherein R₄ denotes a linear or branched alkyl group having 1-18 carbon atoms capable of having a substituent; X₁ denotes a single bond, —O—,

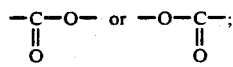

X₂ denotes a single bond, —O— or

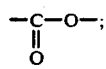

Z₁ denotes a single bond or

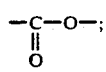

A₄ denotes

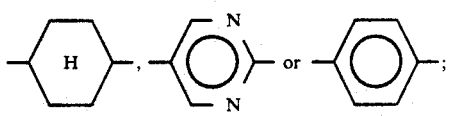

and l is 1-12.

The present invention further provides a liquid crystal device comprising a pair of substrates and such a ferroelectric liquid crystal composition as described above disposed between the electrode plates.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
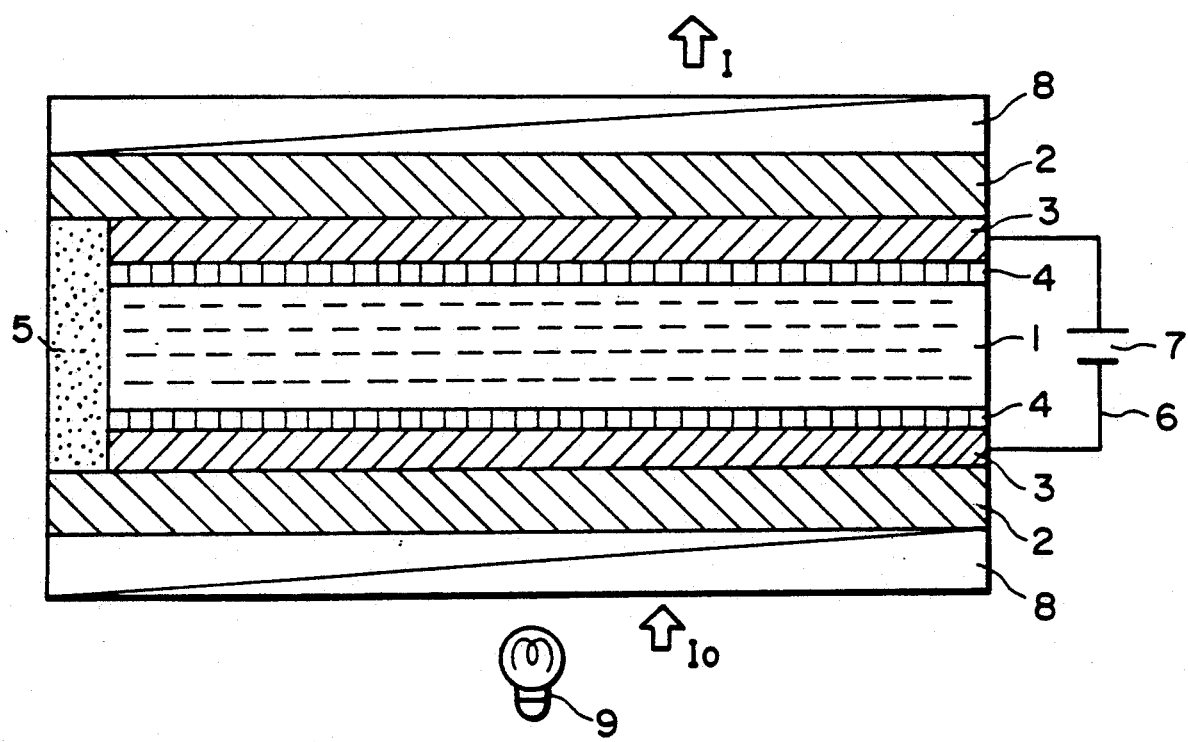
FIG. 1 is a schematic sectional view of a liquid crystal display device using a ferroelectric liquid crystal.

Preferred examples of the compounds represented by the above-mentioned general formula (I) may include those represented by the following formulas (I-a) to (I-h).

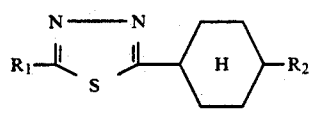 (I-a)

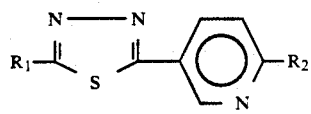 (I-b)

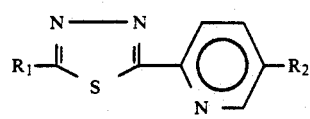 (I-c)

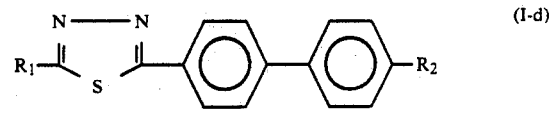 (I-d)

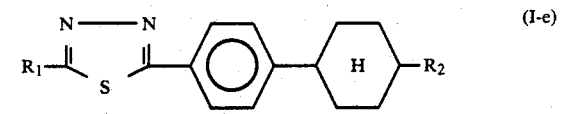 (I-e)

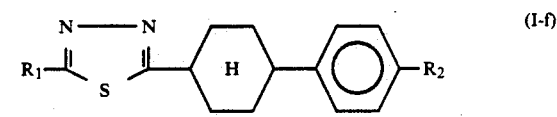 (I-f)

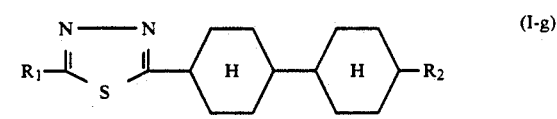 (I-g)

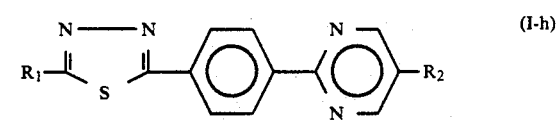 (I-h)

In the formulas (I-a) to (I-h), R₁ and R₂ are respectively the same as in the general formula (I). Preferred examples of R₁ and R₂ may include the following combinations (I-i) to (I-vi):

$R_1$ is n-$C_mH_{2m+1}$— and $R_2$ is n-$C_nH_{2n+1}$—$X_3$—,  (I-i)

$R_1$ is n-$C_mH_{2m+1}$— and $R_2$ is $R_5$—$\overset{CH_3}{\underset{|}{CH}}$$(CH_2)_p$$X_3$—,  (I-ii)

$R_1$ is n-$C_mH_{2m+1}$— and $R_2$ is $R_6O$$(CH_2)_q$$\overset{CH_3}{\underset{|}{CH}}$$(CH_2)_r$$X_3$—,  (I-iii)

$R_1$ is $R_7$—$\overset{CH_3}{\underset{|}{CH}}$$(CH_2)_s$— and $R_2$ is n-$C_nH_{2n+1}$—$X_3$—,  (I-iv)

$R_1$ is $R_7$—$\overset{CH_3}{\underset{|}{CH}}$$(CH_2)_s$— and $R_2$ is $R_5$—$\overset{CH_3}{\underset{|}{CH}}$$(CH_2)_p$$X_3$—,  (i-v)

$R_1$ is $R_7$—$\overset{CH_3}{\underset{|}{CH}}$$(CH_2)_s$— and $R_2$ is $R_6O$$(CH_2)_q$$\overset{CH_3}{\underset{|}{CH}}$$(CH_2)_r$$X_3$—.  (i-vi)

In the above combinations (I-i) to (I-vi), m is 1-18, n is 1-17, p is 0-7, q is 0 or 1, r is 0-7 and s is 0-7; R₅, R₆ and R₇ respectively denote a linear or branched alkyl group; and X₃ denotes a single bond, —O—,

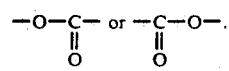

Further, preferred examples of the compounds represented by the above-mentioned general formula (II) may include those represented by the following formulas (II-a) to (II-c).

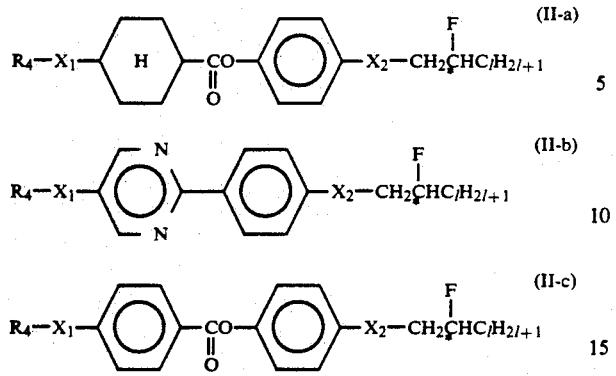
In the formulas (II-a) to (II-c), $R_4$, $X_1$, $X_2$ and $l$ are respectively the same as in the general formula (II).
Specific examples of the compounds represented by the above-mentioned general formula (I) may include those shown by the following structural formulas.
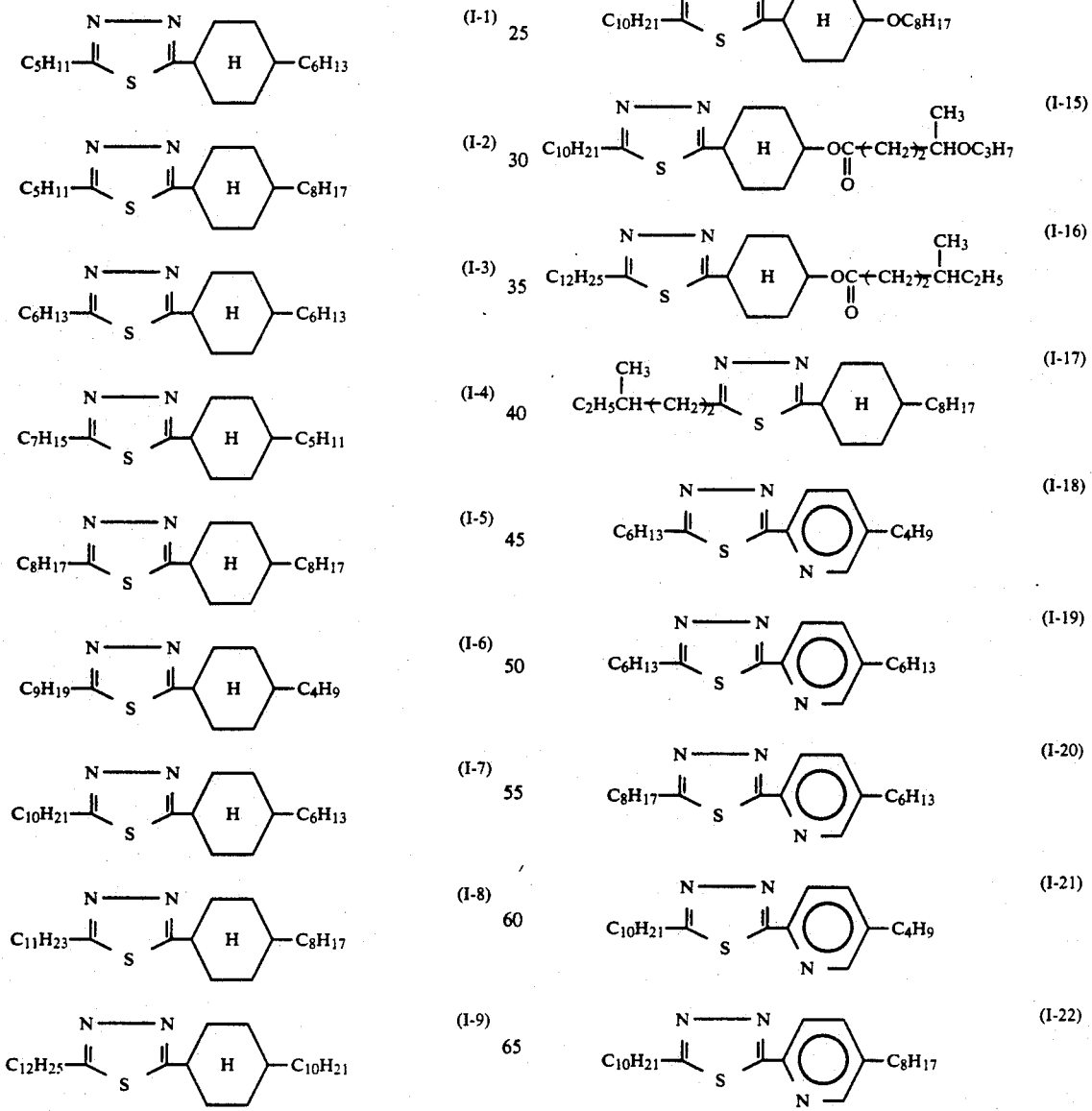

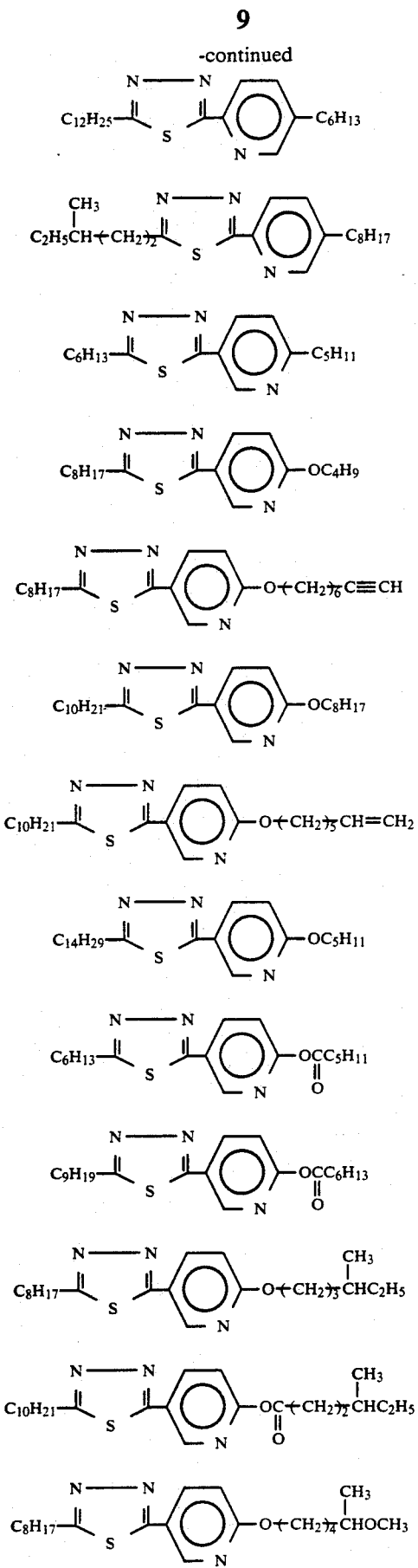
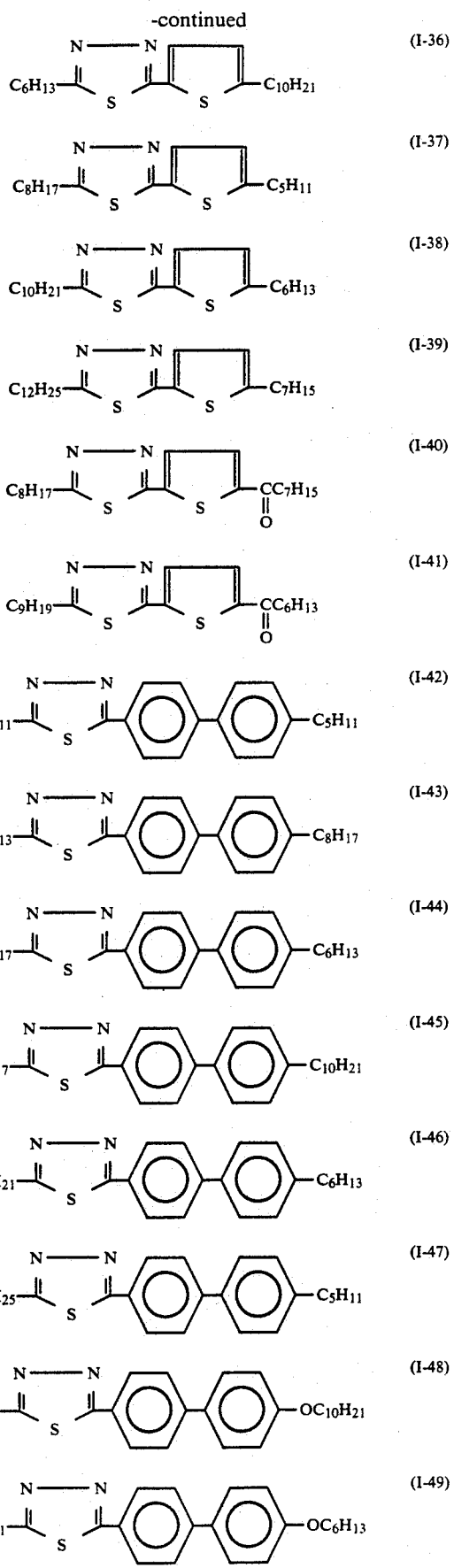

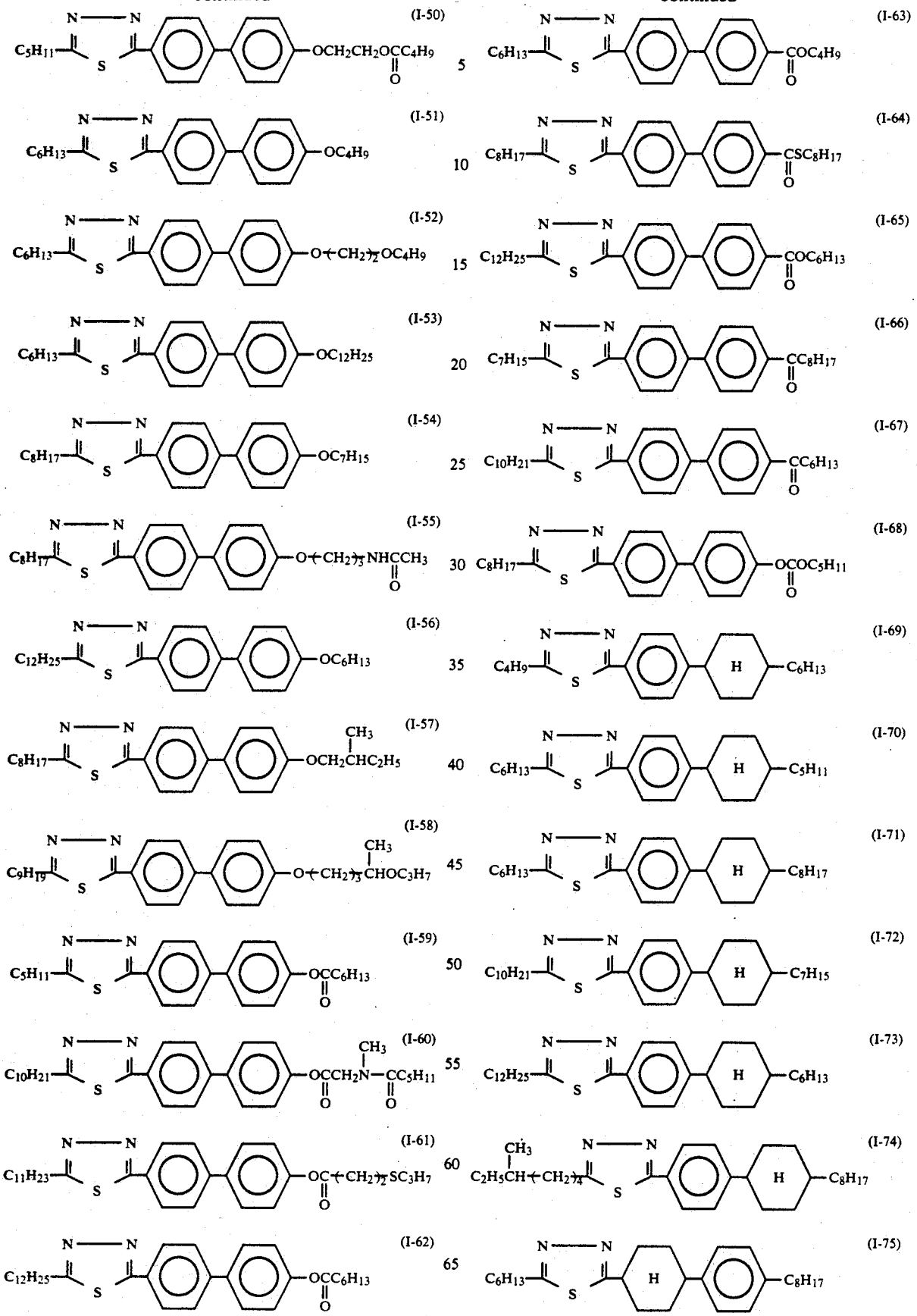

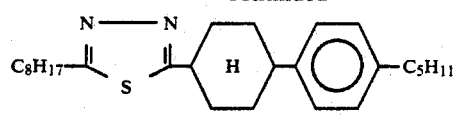 (I-76)
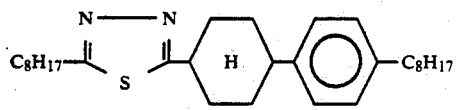 (I-77)
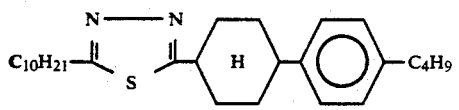 (I-78)
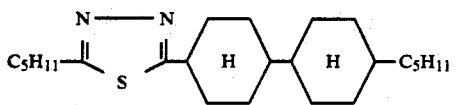 (I-79)
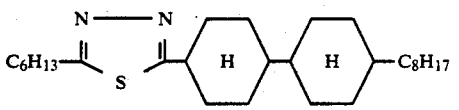 (I-80)
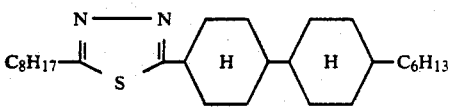 (I-81)
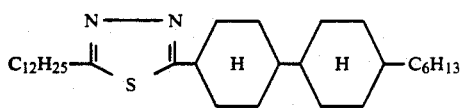 (I-82)
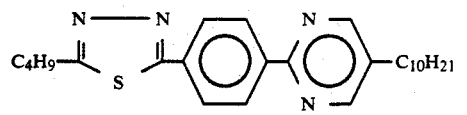 (I-83)
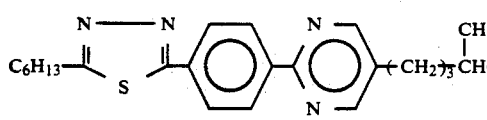 (I-84)
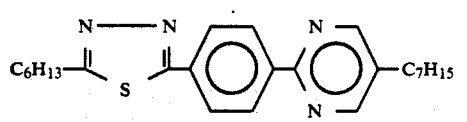 (I-85)
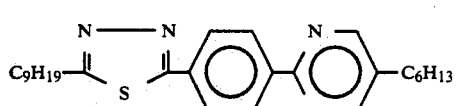 (I-86)
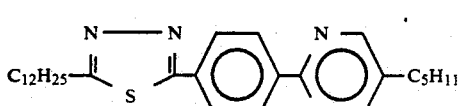 (I-87)
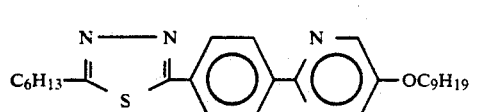 (I-88)
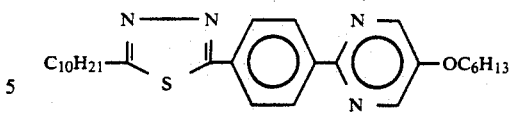 (I-89)
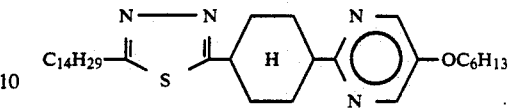 (I-90)
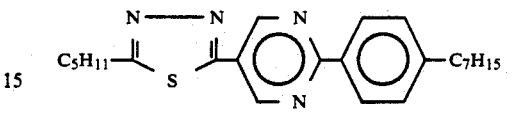 (I-91)
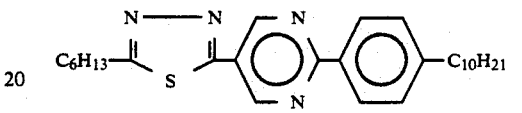 (I-92)
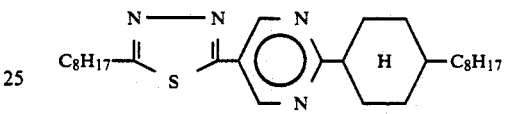 (I-93)
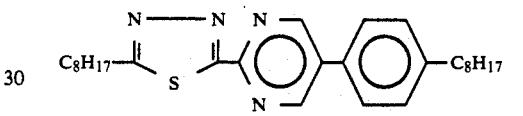 (I-94)
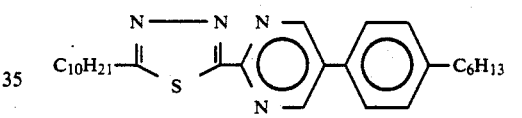 (I-95)
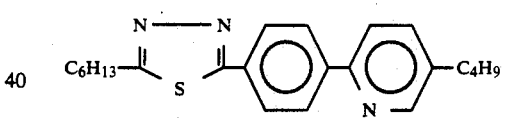 (I-96)
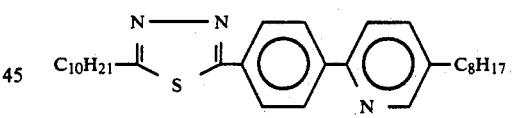 (I-97)
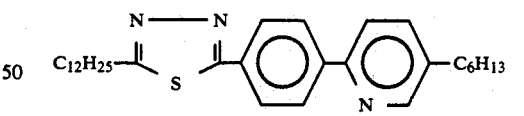 (I-98)
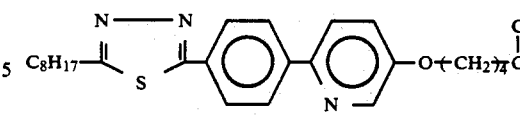 (I-99)
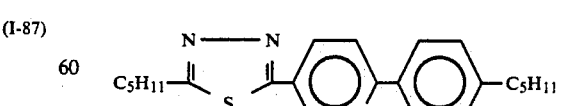 (I-100)
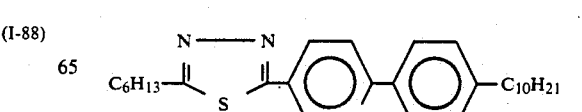 (I-101)

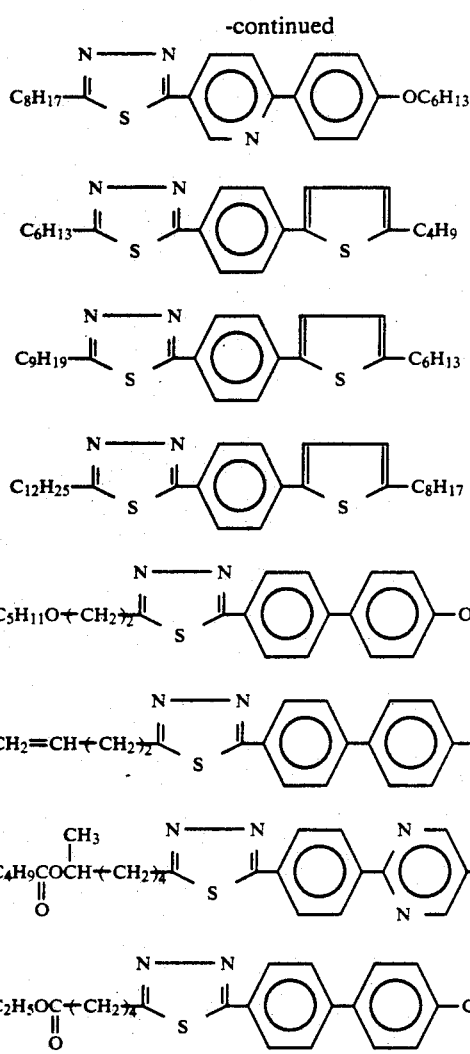

The compounds represented by the general formula (I) may be synthesized through the following reaction schemes A and B.

Reaction scheme A

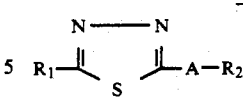

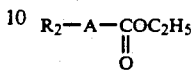

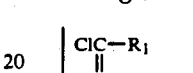

Reaction scheme B

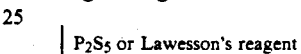

In the above reaction schemes A and B, $R_1$, $R_2$ and A are the same as defined in the general formula (I).

Further, in a case where a methylene group in $R_2$ adjacent to A is replaced with —O—,

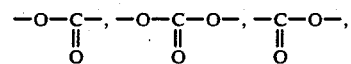

etc., it is possible to form a group of $R_2$—A— through the following steps (a) to (c):

(a) The above-mentioned replacing group combined with A is modified with addition of a protective group into a non-reactive or less reactive group such as

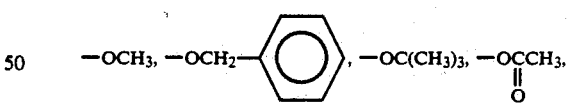

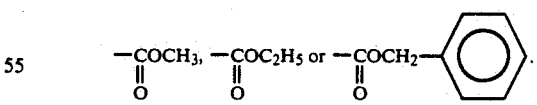

(b) Ring closure is effected to form a thiadiazole ring.
(c) The protective group is eliminated and then the $R_2$—A— structure is formed.

Some representative examples of synthesis of the compound represented by the general formula (I) are shown hereinbelow.

SYNTHESIS EXAMPLE 1

2-(4'-heptyloxy-4''-biphenyl)-5-octyl-1,3,4-thiadiazole (Example Compound No. I-54) was synthesized through the following steps i)–iii).

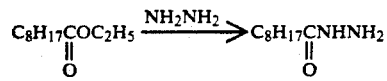

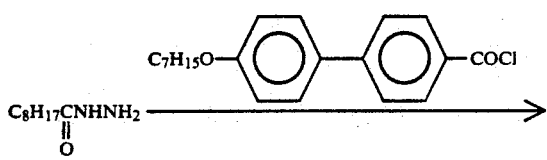

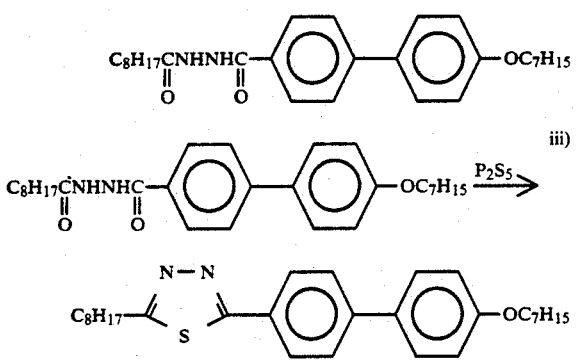

Step i) Production of nonanohydrazide 83.5 of hydrazine hydrate was added to a solution of 120 g of ethyl nananoate in 130 ml of ethanol, followed by heat-refluxing for 6 hours. After the reaction, the reaction mixture was cooled to precipitate a crystal. The crystal was recovered by filtration and recrystallized from 300 ml of ethanol to obtain 85 of nonanohydrazide.

Step ii) Production of N-nonanoyl-N'-4-(4'-heptyloxyphenyl)benzoylhydrazine 1.6 g of nonanohydrazide was dissolved in 18 ml of pyridine and heated to 40° C. To the above solution, a solution of 3.3 g of 4-heptyloxy-4'-biphenylcarbonyl chloride in 10 ml of dry benzene was added dropwise, followed by overnight stirring at room temperature. After the reaction, the reaction solution was diluted with ethyl acetate, followed by washing with water to precipitate an insoluble. The insoluble was recovered by filtration, followed by recrystallization from N,N-dimethylformamide to obtain 4.1 g of N-nonanoyl-N'-4-(4'-heptyloxyphenyl)benzoylhydrazine.

Step iii) Production of 2-(4'-heptyloxy-4"-biphenyl)-5-octyl-1,3,4-thiadiazole To a solution of 3.1 g ($6.65 \times 10^{-3}$ mol) of N-nonanoyl-N'-4-(4'-heptyloxyphenyl)benzoylhydrazine in 20 ml of pyridine, 1.99 g ($8.98 \times 10^{-3}$ mol) of diphosphorus pentasulfide was added at room temperature in 15 minutes, followed by heating to 100° C. for 6 hours of reaction. After the reaction, the reaction mixture was poured into a mixture solution of 10 ml ethanol and 200 ml of water, followed by three times of extraction with 100 ml of chloroform, washing with water, drying with anhydrous magnesium sulfate and distilling-off of the solvent to obtain 3.9 g of a crude crystal. The crude crystal was purified by column chromatography (mobile phase: chloroform/ethyl acetate=20/1, stationary phase: silica gel) to obtain objective 2-(4'-heptyloxy-4"-biphenyl)-5-octyl-1,3,4-thiadiazole.

Phase transition temperature (°C.)

$$\text{Cryst.} \underset{115.6}{\overset{118.5}{\rightleftarrows}} \text{Sm3} \underset{146.1}{\overset{147.2}{\rightleftarrows}} \text{Sm2} \underset{157.5}{\overset{158.5}{\rightleftarrows}} \text{Sm1} \underset{204.0}{\overset{205.3}{\rightleftarrows}} \text{Iso.}$$

Herein, the respective symbols denote the following phases, Iso.: isotropic phase, Sm1–Sm3: smectic phases (unidentified), and Cryst.: crystal phase.

SYNTHESIS EXAMPLE 2

2-hexyl-5-[4'-(4"-pentylcyclohexyl)phenyl]-1,3,4-thiadiazole (Example Compound No. I-70) was synthesized through the following steps i)–iii).

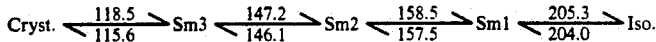

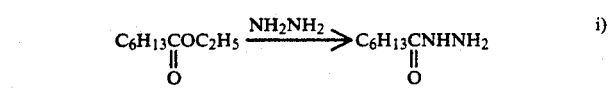

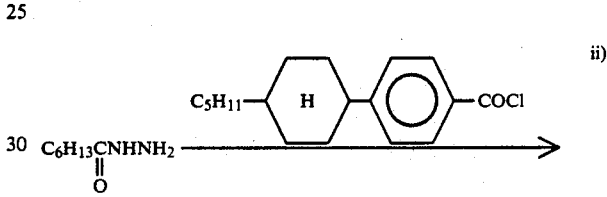

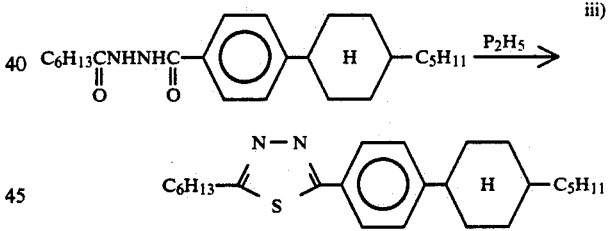

Step i) Production of heptanohydrazide 12.2 g of hydrazine hydrate was added to a solution of 15 g of ethyl heptanoate in 20 ml of ethanol, followed by heat-refluxing for 4.5 hours. After the reaction, the reaction mixture was cooled to precipitate a crystal. The crystal was recovered by filtration and recrystallized from 20 ml of ethanol to obtain 7 g of heptanohydrazide.

Step ii) Production of N-heptanoyl-N'-4-(4'-pentylcyclohexyl)benzoylhydrazine 2.0 g of heptanohydrazide was dissolved in 27 ml of pyridine and heated to 40° C. To the above solution, a solution of 4.4 g of 4-(4'-pentylcyclohexyl)benzoyl chloride in 12 ml of dry benzene was added dropwise, followed by overnight stirring at room temperature. After the reaction, the reaction solution was diluted with ethyl acetate, followed by washing with water to precipitate an insoluble. The insoluble was recovered by filtration, followed by recrystallization from N,N-dimethylformamide to obtain 4.0 g of N-heptanoyl-N'-4-(4'-pentylcyclohexyl)benzohydrazine.

Step iii) Production of
2-hexyl-5-[4'-(4''-pentylcyclohexyl)phenyl]-1,3,4-thiadiazole To a solution of 3.75 g of N-heptanoyl-N'-4-(4'-pentylcyclohexyl)benzoylhydrazine in 30 ml of pyridine, 2.81 g of diphosphorus pentasulfide was added at room temperature in 15 minutes, followed by heating to 100° C. for 6 hours of reaction. After the reaction, the reaction mixture was poured into a mixture solution of 10 ml ethanol and 200 ml of water to precipitate a crystal. The crystal was recovered by filtration and dried to obtain 4.6 g of a crude product. The crude product was dissolved in toluene and then the insoluble was removed from the solution by filtration. The resultant solution was purified by column chromatography (mobile phase: toluene, stationary phase: silica gel) to obtain 0.31 g of an objective product.

Phase transition temperature (°C.)

Cryst. ⇌ 72.1/60.6 → Sm2 ⇌ 81.9/80.7 → Sm1 ⇌ 102.2/100.1 → Iso.

SYNTHESIS EXAMPLE 3

2-octyl-5-[4'-(4''-pentylphenyl)cyclohexyl]-1,3,4-thiadiazole (Example Compound No. I-76) was synthesized through the following steps i) and ii).

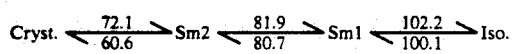

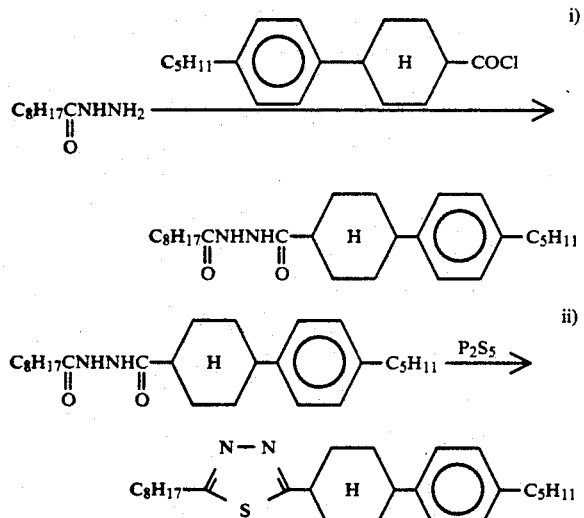

Step i) Production of
N-octanoyl-N'-4-(4'-pentylphenyl)cyclohexanecarbonylhydrazine 2.4 g of nonanohydrazide prepared in the same manner as in Synthesis Example 1 was dissolved in 27 ml of pyridine and heated to 40° C. To the above solution, a solution of 4.4 g of 4-(4'-pentylphenyl)cyclohexanecarbonyl chloride in 12 ml of dry benzene was added dropwise, followed by overnight stirring at room temperature. After the reaction, the reaction solution was diluted with ethyl acetate, followed by washing with water to precipitate an insoluble. The insoluble was recovered by filtration, followed by recrystallization from N,N-dimethylformamide to obtain 4.6 g of N-nonanoyl-N'-4-(4'-pentylphenyl)cyclohexanecarbonylhydrazine.

Step ii) Production of
2-octyl-5-[4'-(4''-pentylphenyl)cyclohexyl]-1,3,4-thiadiazole To a solution of 4.55 g of N-nonanoyl-N'-4-(4'-pentylphenyl)cyclohexanecarbonylhydrazine in 35 ml of pyridine, 3.19 g of diphosphorus pentasulfide was added at room temperature in 15 minutes, followed by heating to 100° C. for 6 hours of reaction. After the reaction, the reaction mixture was poured into a mixture solution of 15 ml ethanol and 300 ml of water, followed by extraction with chloroform, washing with water, drying with anhydrous magnesium sulfate and distilling-off of the solvent to obtain 5.3 g of a half-solid product. The product was purified by column chromatography (mobile phase: hexane/ethyl acetate=10/2, stationary phase: silica gel), followed by recrystallization from ethanol to obtain 0.2 g of 2-octyl-5-[4'-(4''-pentylphenyl)cyclohexyl]-1,3,4-thiadiazole.

Phase transition temperature (°C.)

Cryst. ⇌ 96.4/85.1 → Iso.

SYNTHESIS EXAMPLE 4

2-hexyl-5-[4'-(5-heptyl-2-pyrimidinyl)-phenyl]-1,3,4-thiadiazole (Example Compound No. I-85) was synthesized through the following steps i) and ii).

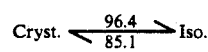

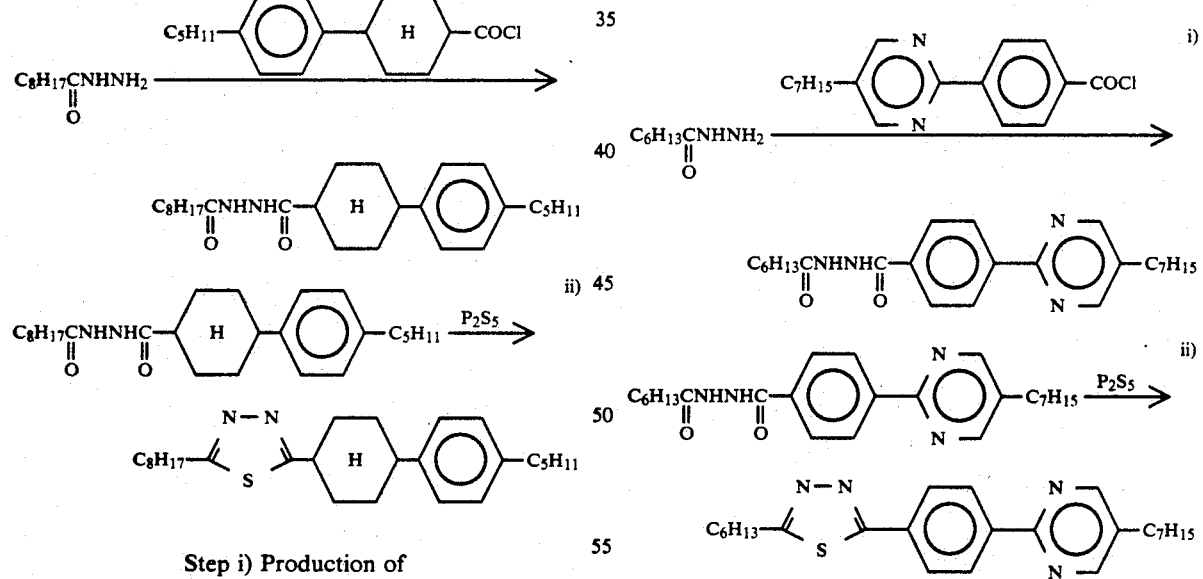

Step i) Production of
N-heptanoyl-N'-4-(5'-heptyl-2'-pyrimidinyl)benzoylhydrazine 2.0 g of heptanohydrazide prepared in the same manner as in Synthesis Example 2 was dissolved in 27 ml of pyridine and heated to 40° C. To the above solution, a solution of 4.7 g of 4-(5'-heptyl-2'-pyrimidinyl)benzoyl chloride in 20 ml of dry benzene was added dropwise, followed by overnight stirring at room temperature. After the reaction, the reaction solution was diluted with ethyl acetate, followed by washing with water to precipitate an insoluble. The insoluble was recovered by filtration, followed by recrystallization from N,N-dimethylformamide to obtain 3.1 g of N-heptanoyl-N'-4-(5'-heptyl-2'-pyrimidinyl)benzoylhydrazine.

Step ii) Production of 2-hexyl-5-[4'-(5-heptyl-2-pyrimidinyl)phenyl]-1,3,4-thiadiazole To a solution of 2.6 g of N-heptanoyl-N'-4-(5'-heptyl-2'-pyrimidinyl)benzoylhydrazine in 20 ml of pyridine, 1.84 g of diphosphorus pentasulfide was added at room temperature in 15 minutes, followed by heating to 100° C. for 6 hours of reaction. After the reaction, the reaction mixture was poured into a mixture solution of 10 ml ethanol and 200 ml of water, followed by three times of extraction with 100 ml of chloroform, washing with water, drying with anhydrous magnesium sulfate and distilling-off of the solvent to obtain 2.5 g of a crude crystal. The crude crystal was purified by column chromatography (mobile phase: toluene/ethyl acetate=2/1, stationary phase: silica gel) to obtain objective 2-hexyl-5-[4'-(5-heptyl-2-pyrimidinyl)-phenyl]-1,3,4-thiadiazole.

Phase transition temperature (°C.)

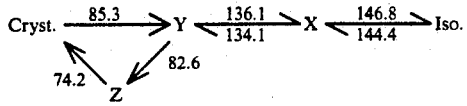

X,Y,Z: mesomorphic phases (unidentified)

Specific examples of the compounds represented by the above-mentioned general formula (II) may include those shown by the following structural formulas.

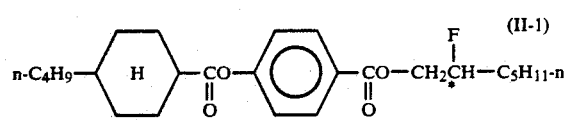
(II-1)

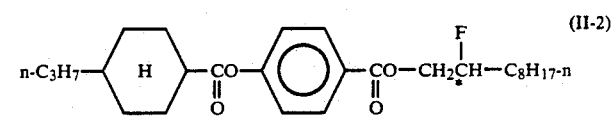
(II-2)

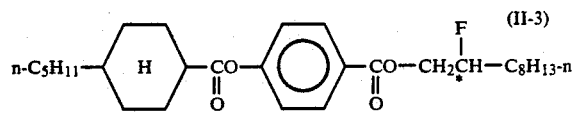
(II-3)

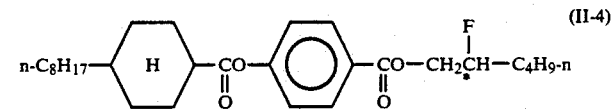
(II-4)

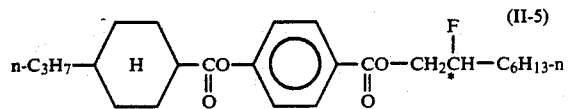
(II-5)

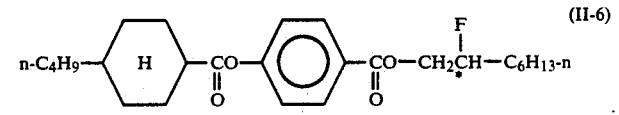
(II-6)

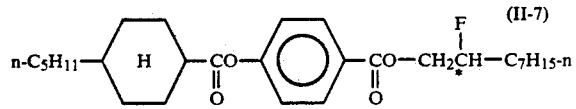
(II-7)

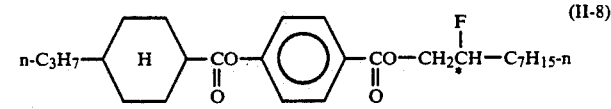
(II-8)

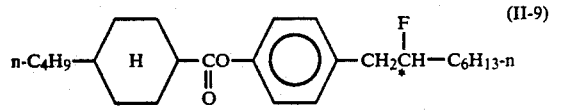
(II-9)

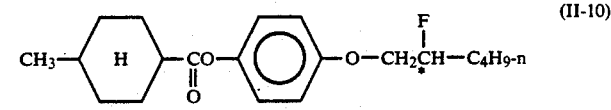
(II-10)

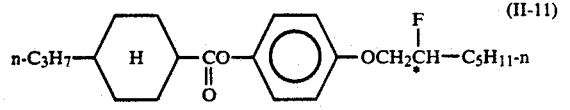
(II-11)

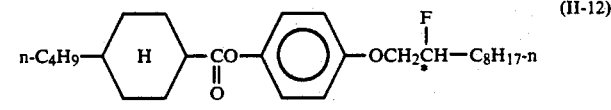
(II-12)

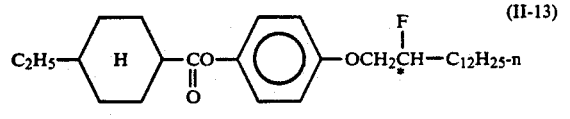
(II-13)

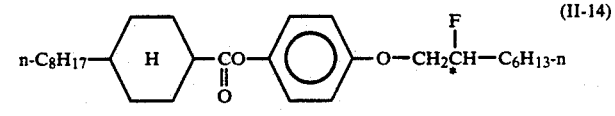
(II-14)

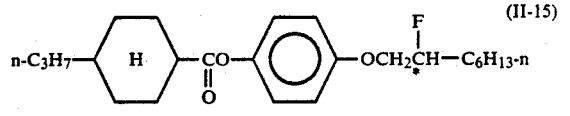
(II-15)

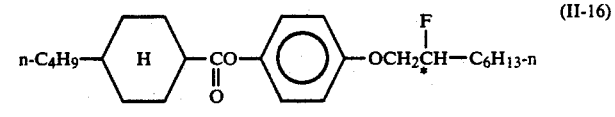
(II-16)

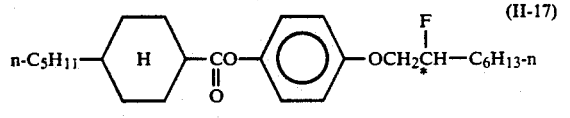
(II-17)

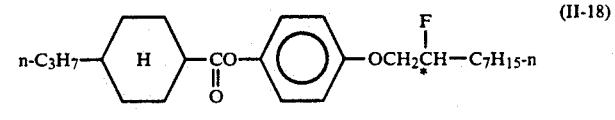
(II-18)

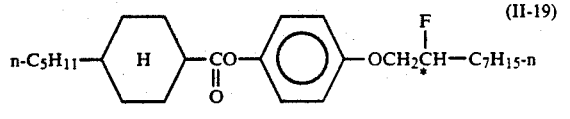
(II-19)

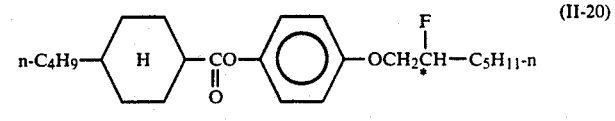
(II-20)

-continued
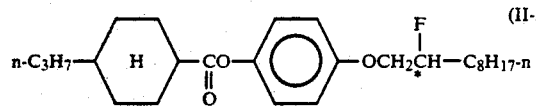 (II-21)
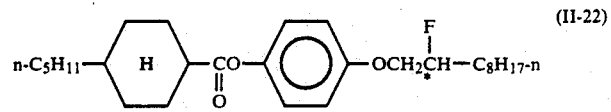 (II-22)
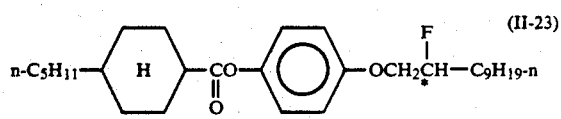 (II-23)
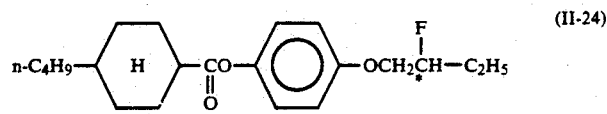 (II-24)
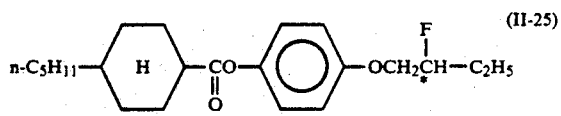 (II-25)
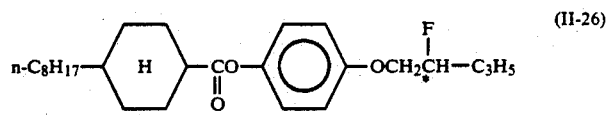 (II-26)
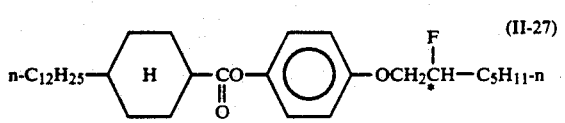 (II-27)
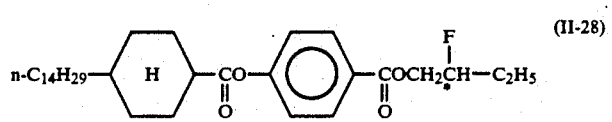 (II-28)
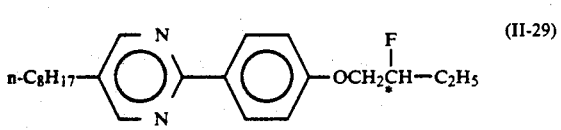 (II-29)
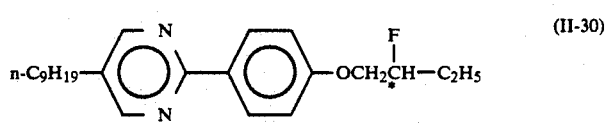 (II-30)
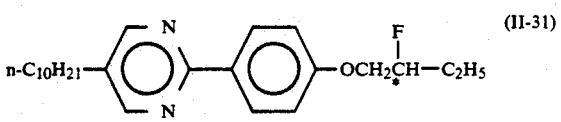 (II-31)
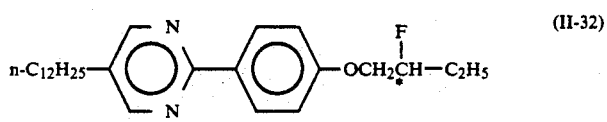 (II-32)
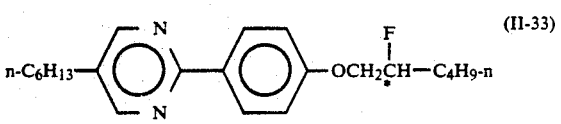 (II-33)
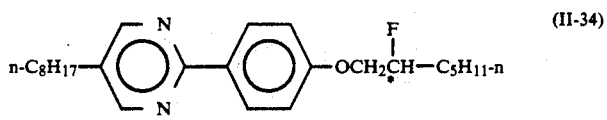 (II-34)
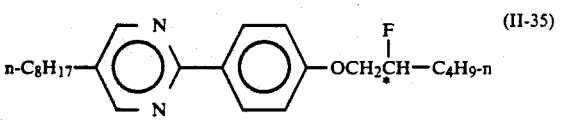 (II-35)
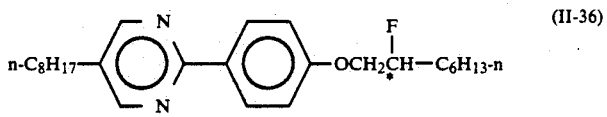 (II-36)
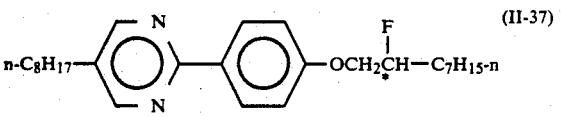 (II-37)
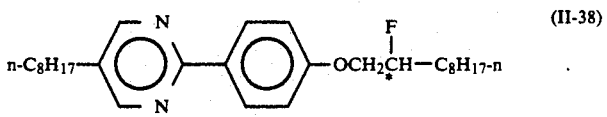 (II-38)
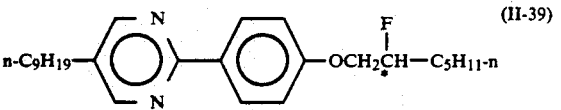 (II-39)
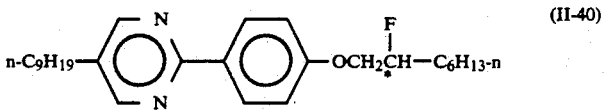 (II-40)
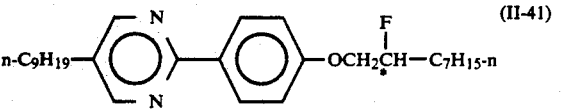 (II-41)
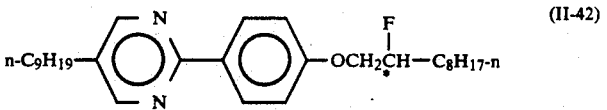 (II-42)
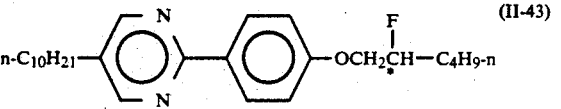 (II-43)
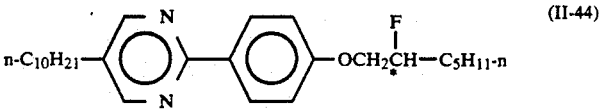 (II-44)
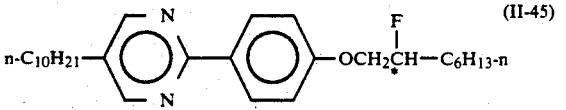 (II-45)
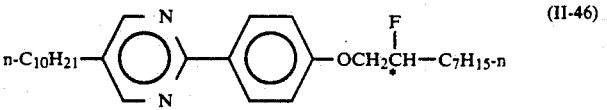 (II-46)

-continued
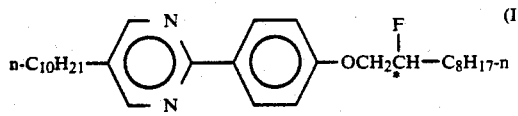 (II-47)
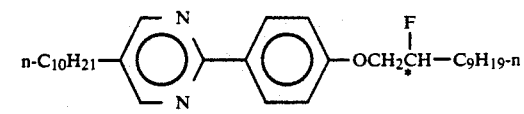 (II-48)
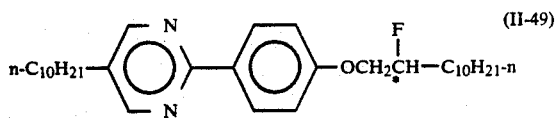 (II-49)
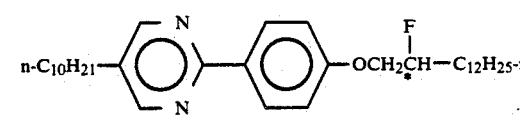 (II-50)
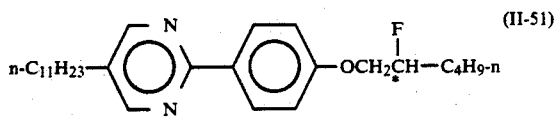 (II-51)
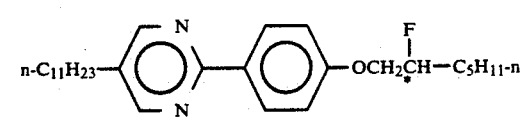 (II-52)
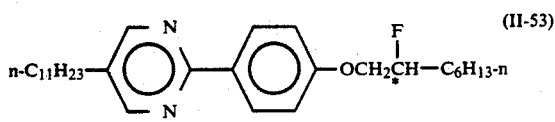 (II-53)
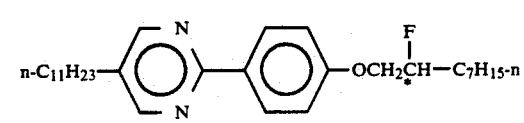 (II-54)
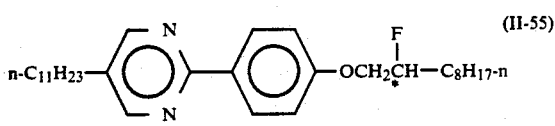 (II-55)
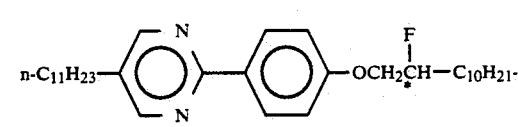 (II-56)
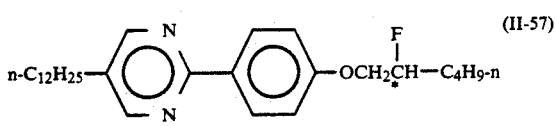 (II-57)
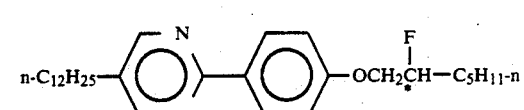 (II-58)
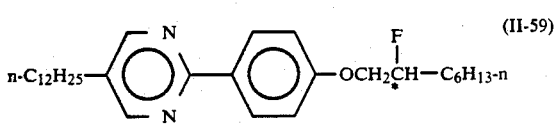 (II-59)
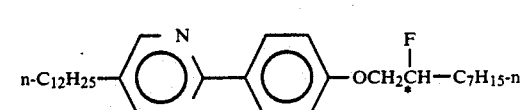 (II-60)
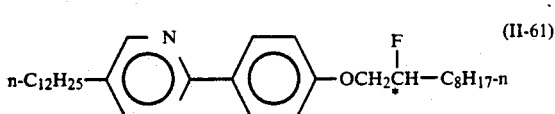 (II-61)
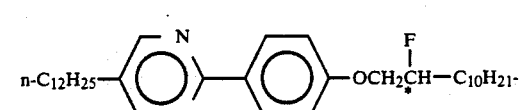 (II-62)
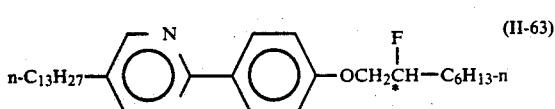 (II-63)
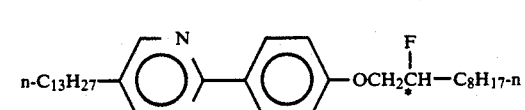 (II-64)
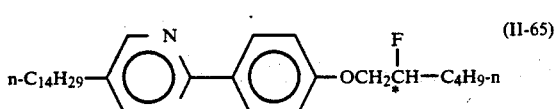 (II-65)
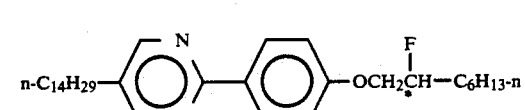 (II-66)
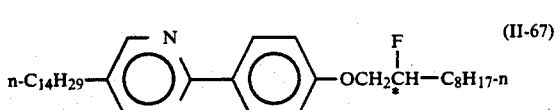 (II-67)
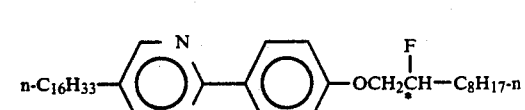 (II-68)
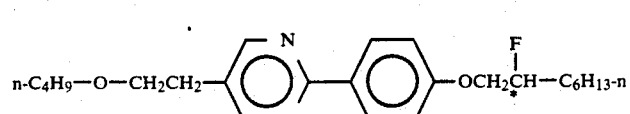 (II-69)
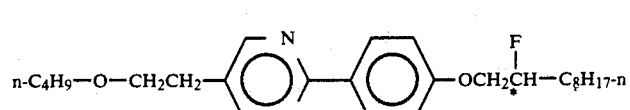 (II-70)

-continued
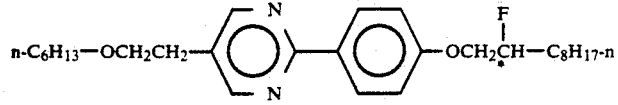 (II-71)
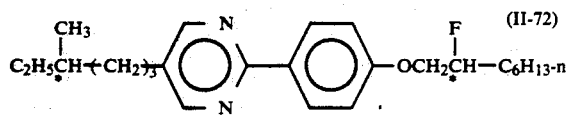 (II-72)  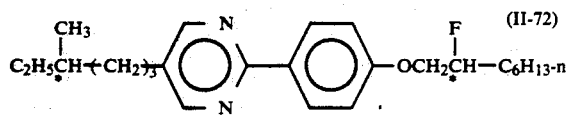 (II-73)
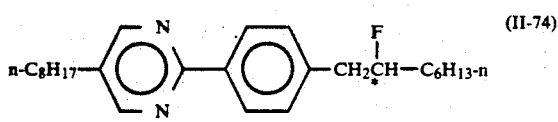 (II-74)  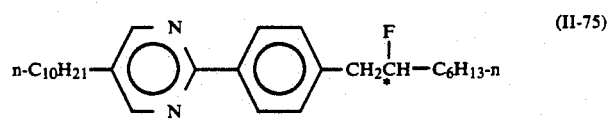 (II-75)
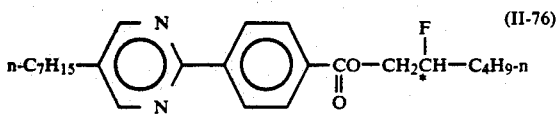 (II-76)  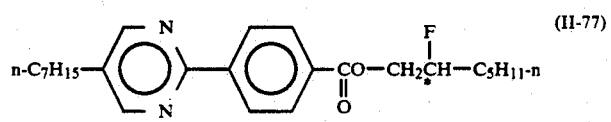 (II-77)
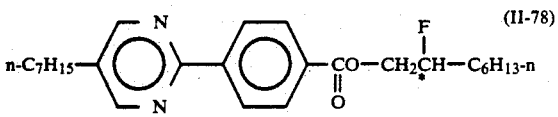 (II-78)  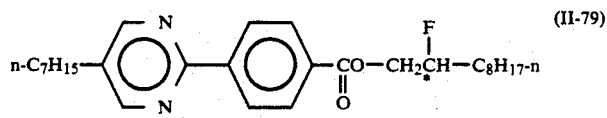 (II-79)
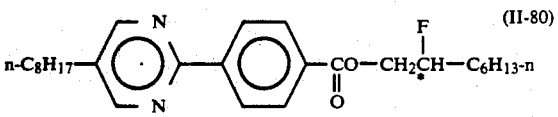 (II-80)  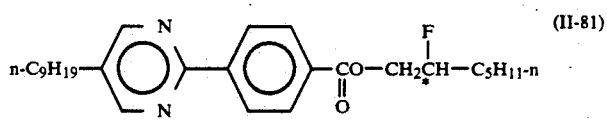 (II-81)
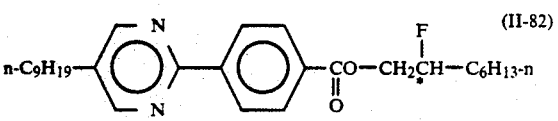 (II-82)  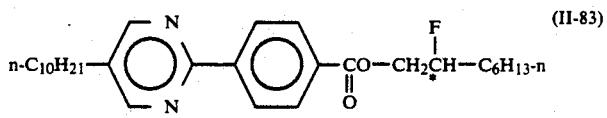 (II-83)
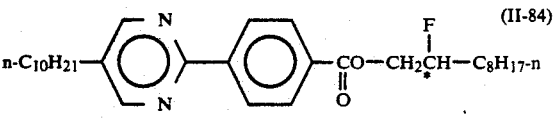 (II-84)  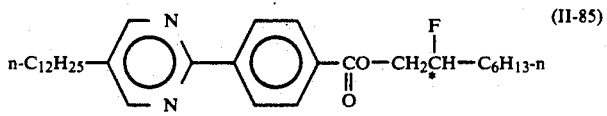 (II-85)
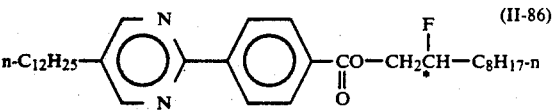 (II-86)  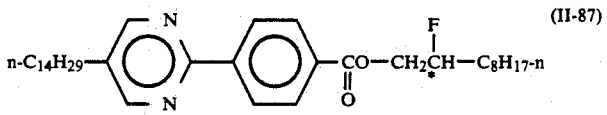 (II-87)
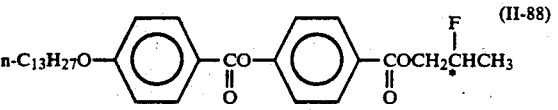 (II-88)  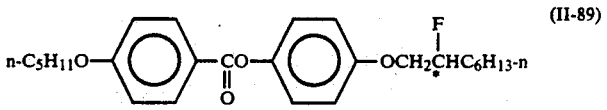 (II-89)
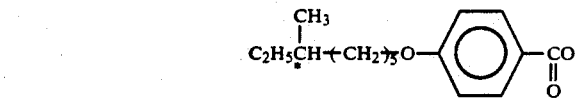 (II-90)
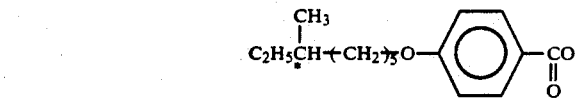 (II-91)   (II-92)
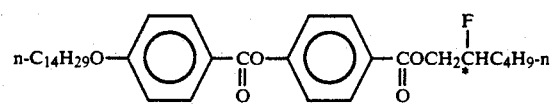 (II-93)

-continued
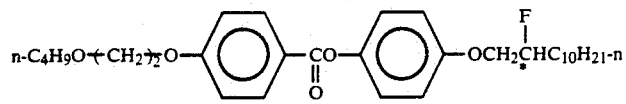 (II-94)
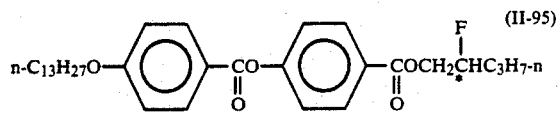 (II-95)
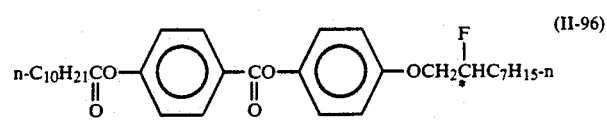 (II-96)
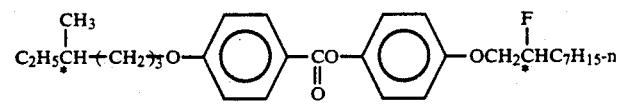 (II-97)
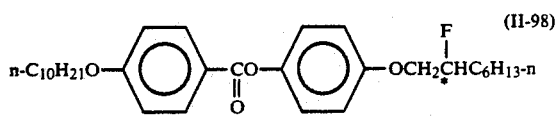 (II-98)
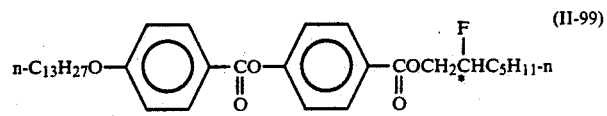 (II-99)
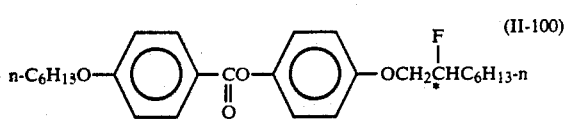 (II-100)
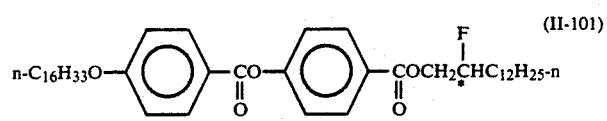 (II-101)
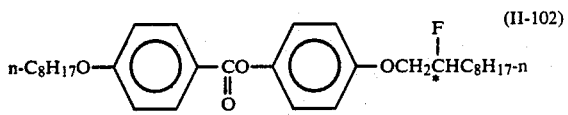 (II-102)
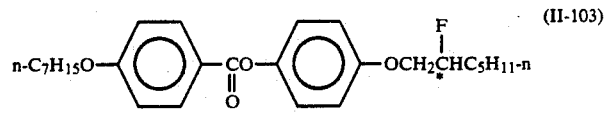 (II-103)
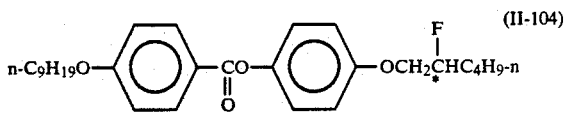 (II-104)
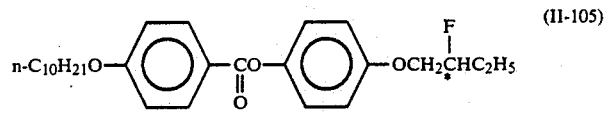 (II-105)
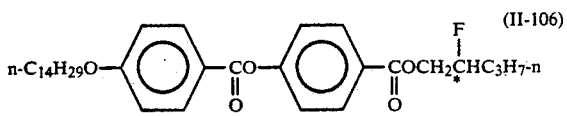 (II-106)
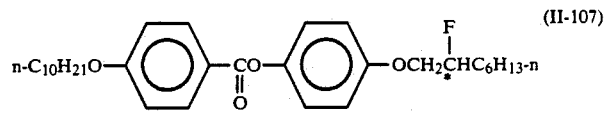 (II-107)
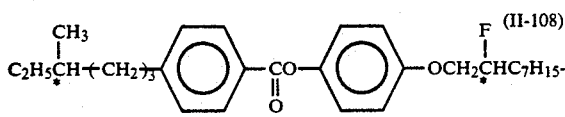 (II-108)
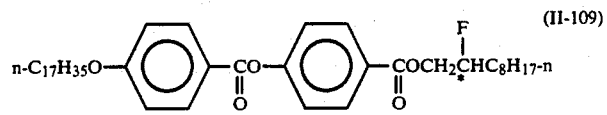 (II-109)
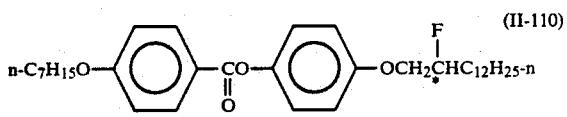 (II-110)
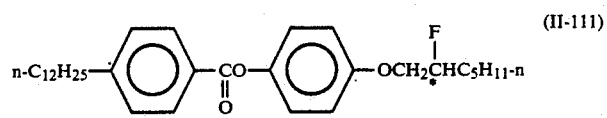 (II-111)
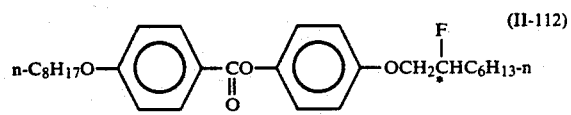 (II-112)
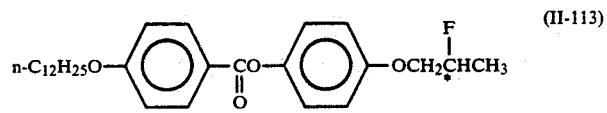 (II-113)
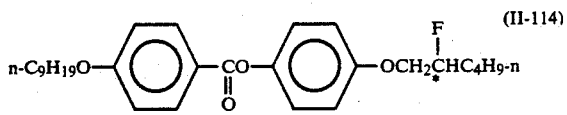 (II-114)
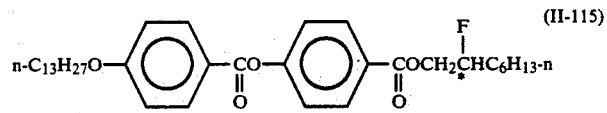 (II-115)
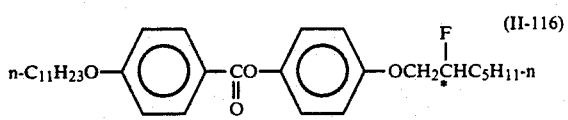 (II-116)
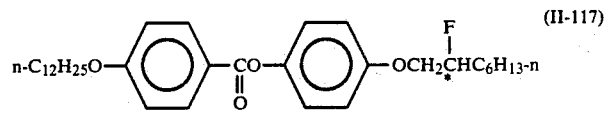 (II-117)
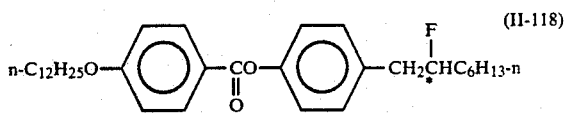 (II-118)
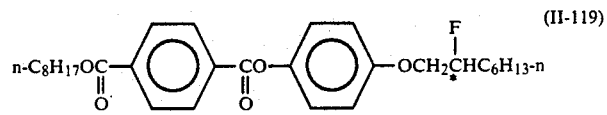 (II-119)

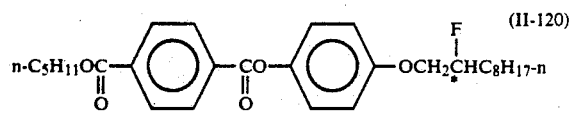
(II-120)
The compounds represented by the general formula (II) may be synthesized through the following reaction schemes A, B and C.
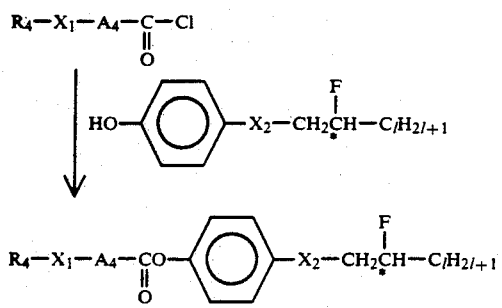
Reaction scheme B
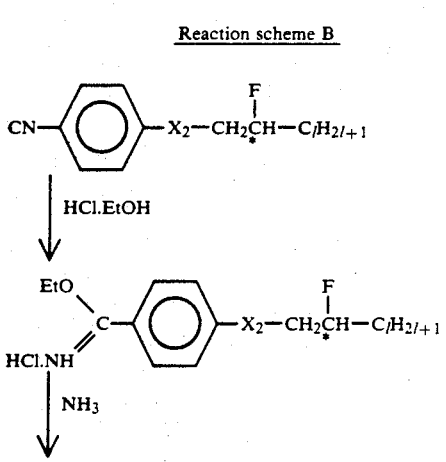
-continued
Reaction scheme B
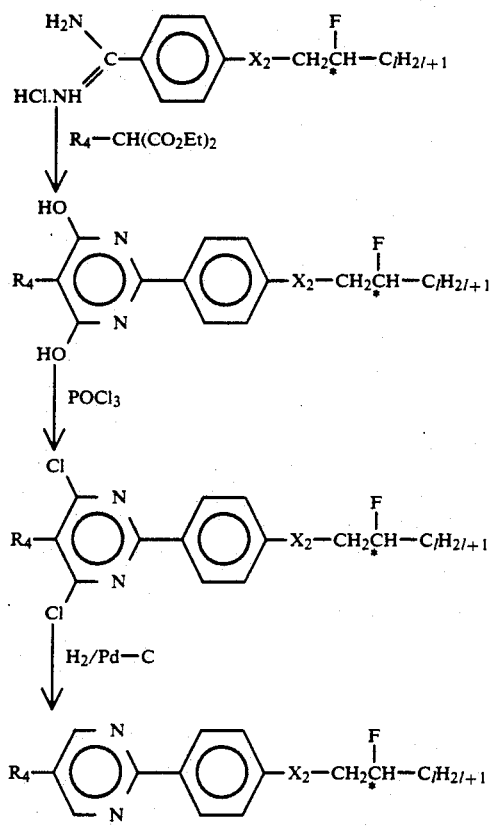
Reaction scheme C
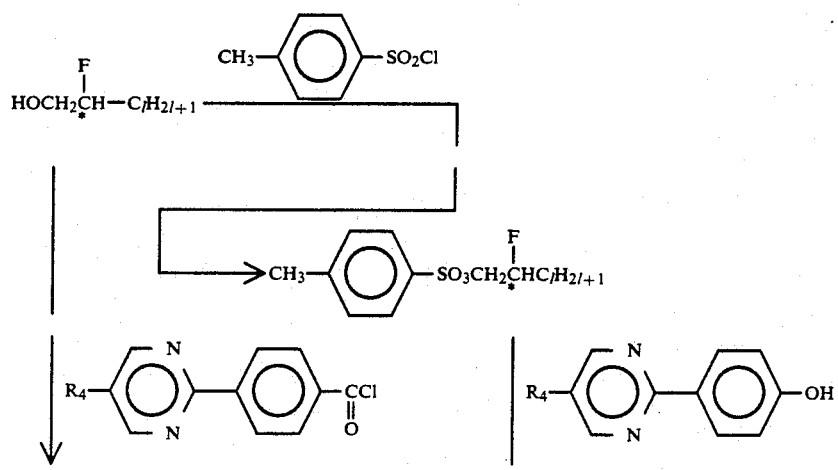

-continued

Reaction scheme C

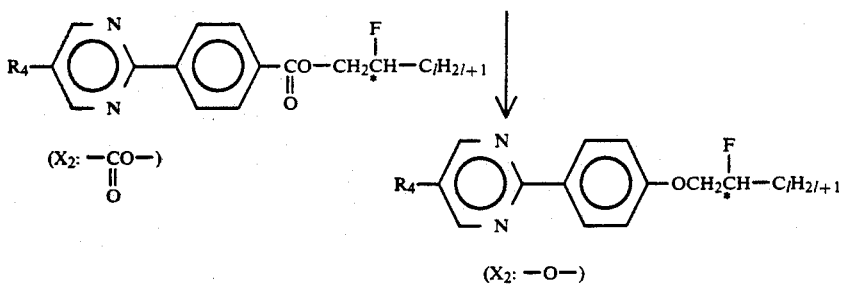

Some representative examples of synthesis of the compound represented by the general formula (II) are shown hereinbelow.

SYNTHESIS EXAMPLE 5

Synthesis of Compound Example II-17

1.00 g (4.16 mM) of p-2-fluorooctyloxyphenol was dissolved in a mixture of 10 ml of pyridine and 5 ml of toluene, and a solution of 1.30 g (6.0 mM) of trans-4-n-pentylcyclohexanecarbonyl chloride in 5 ml of toluene was added dropwise thereto in 20–40 min. below 5° C. After the addition, the mixture was stirred overnight at room temperature to obtain a white precipitate.

After the reaction, the reaction product was extracted with benzene, and the resultant benzene layer was washed with distilled water, followed by drying with magnesium sulfate and distilling-off of the benzene, purification by silica gel column chromatography and recrystallization from ethanol/methanol to obtain 1.20 g (2.85 mM) of trans-4-n-pentylcyclohexanecarboxylic acid-p-2-fluorooctyloxyphenyl-ester.

(Yield: 68.6%)

NMR data (ppm) 0.83–2.83 ppm (34H, m); 4.00–4.50 ppm (2H, q); 7.11 ppm (4H, s)

IR data (cm$^{-1}$) 3456, 2928, 2852, 1742, 1508, 1470, 1248, 1200, 1166, 1132, 854.

Phase transition temperature (°C.)

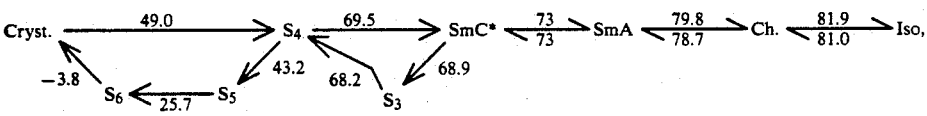

Herein, the respective symbols denote the following phases, Iso.: isotropic phase, Ch.: cholesteric phase, SmA: smectic A phase, SmC*: chiral smectic C phase, $S_3$ –$S_6$: phases of higher order than SmC*, and Cryst.: crystal phase.

SYNTHESIS EXAMPLE 6

Synthesis of Compound Example II-34

In a vessel sufficiently replaced with nitrogen, 0.40 g (3.0 mmol) of (−)-2-fluoroheptanol and 1.00 g (13 mmol) of dry pyridine were placed and stirred for 30 min. under cooling on an ice bath. Into the solution, 0.69 g (3.6 mmol) of p-toluenesulfonyl chloride was added, and the mixture was stirred for 5 hours. After the reaction, 10 ml of 1N-HCl was added, and the resultant mixture was subjected to two times of extraction with 10 ml of methylene chloride. The extract liquid was washed once with 10 ml of distilled water and dried with an appropriate amount of anhydrous sodium sulfate, followed by distilling-off of the solvent to obtain 0.59 g (2.0 mmol) of (+)-2-fluoroheptyl p-toluenesulfonate.

The yield was 66%, and the product showed the following optical rotation and IR data.

Optical rotation: $[\alpha]_D^{26.4}+2.59$ degrees (c=1, CHCl$_3$); $[\alpha]_{435}^{23.6}+9.58$ degrees (c=1, CHCl$_3$)

IR (cm$^{-1}$): 2900, 2850, 1600, 1450, 1350, 1170, 1090 980, 810, 660, 550

0.43 g (1.5 mmol) of the thus obtained (+)-2-fluoroheptyl p-toluenesulfonate and 0.28 g (1.0 mmol) of 5-octyl-2-(4-hydroxyphenyl)pyrimidine were mixed with 0.2 ml of 1-butanol, followed by sufficient stirring. To the solution was quickly added a previously obtained alkaline solution of 0.048 g (1.2 mmol) of sodium hydroxide in 1.0 ml of 1-butanol, followed by 5.5 hours of heat-refluxing. After the reaction, 10 ml of distilled water was added, and the mixture was extracted respectively once with 10 ml of benzene and 5 ml of benzene, followed by drying with an appropriate amount of anhydrous sodium sulfate, distilling-off of the solvent and purification by silica gel column chromatography (chloroform) to obtain 0.17 g (0.43 mmol) of objective (+)-5-octyl-2-[4-(2-fluoroheptyloxy)phenyl]pyrimidine.

The yield was 43%, and the product showed the following optical rotation and IR data.

Optical rotation: $[\alpha]_D^{25.6}+0.44$ degree (c=1, CHCl$_3$); $[\alpha]_{435}^{22.4}+4.19$ degrees (c=1, CHCl$_3$)

IR (cm$^{-1}$) 2900, 2850, 1600, 1580, 1420, 1250 1160, 800, 720, 650, 550.

The liquid crystal composition according to the present invention may be obtained by mixing at least one species of the compound represented by the formula (I), at least one species of the compound represented by the formula (II) and at least one species of another mesomorphic compound in appropriate proportions. The liquid crystal composition according to the present invention may preferably be formulated as a ferroelectric liquid crystal composition, particularly a ferroelectric chiral smectic liquid crystal composition.

Specific examples of another mesomorphic compound as described above may include those denoted by the following structural formulas.

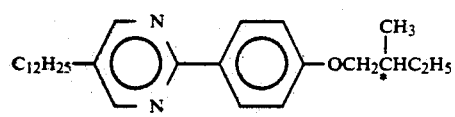 (1)
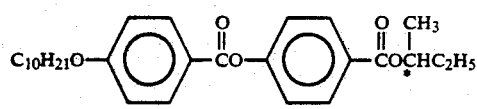 (2)
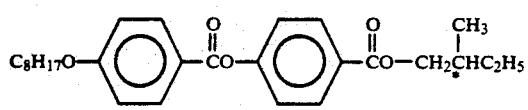 (3)
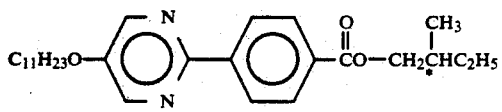 (4)
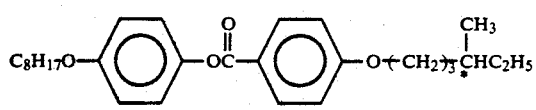 (5)
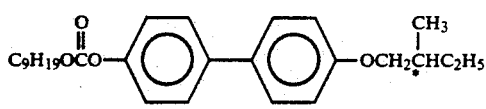 (6)
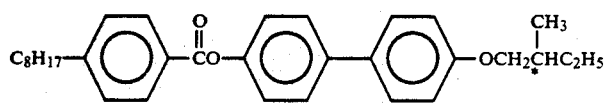 (7)
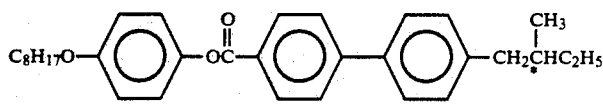 (8)
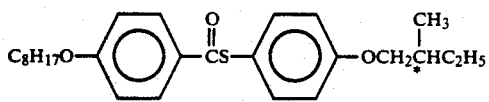 (9)
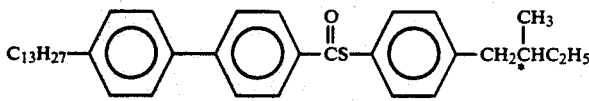 (10)
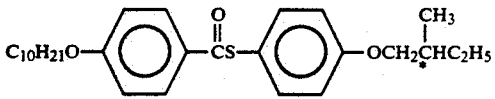 (11)
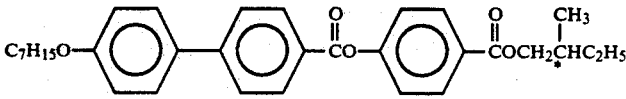 (12)
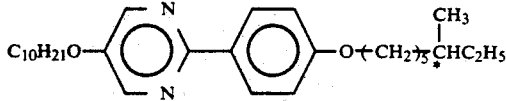 (13)

-continued
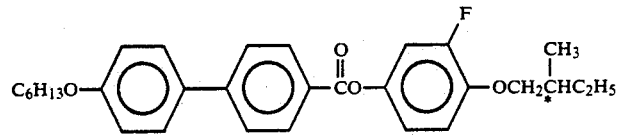           (14)
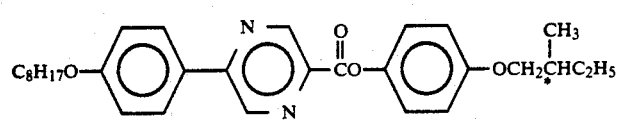           (15)
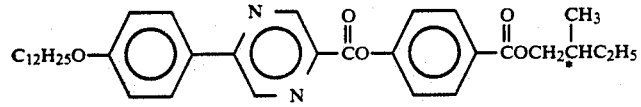           (16)
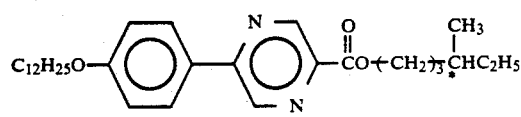           (17)
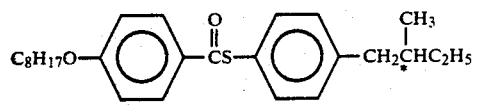           (18)
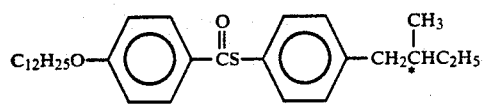           (19)
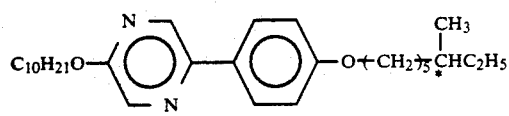           (20)
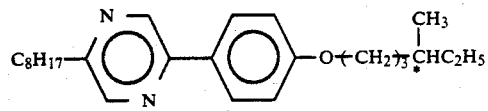           (21)
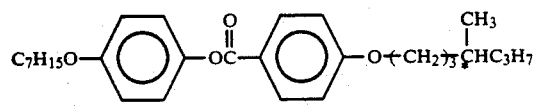           (22)
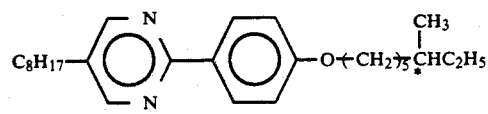          (23)
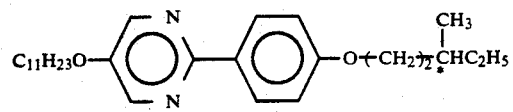          (24)
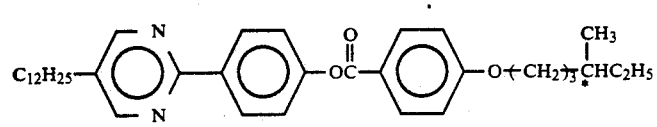          (25)
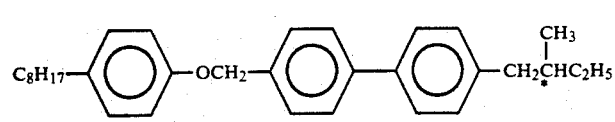          (26)

-continued
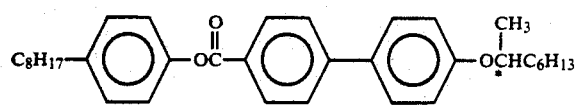 (27)
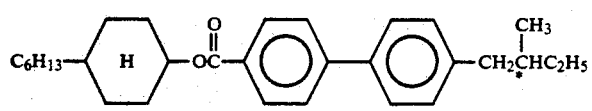 (28)
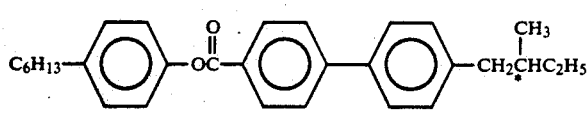 (29)
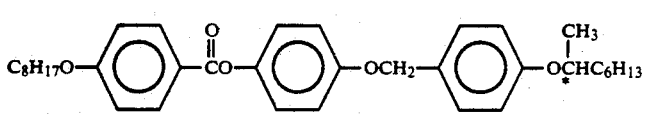 (30)
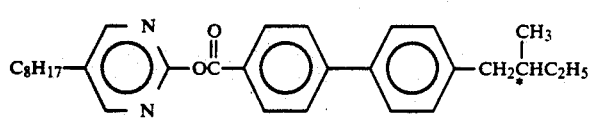 (31)
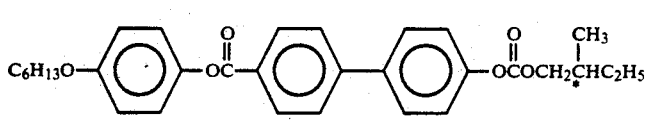 (32)
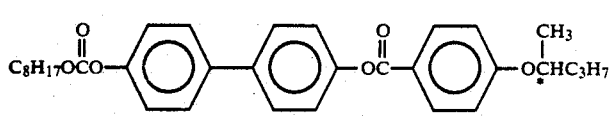 (33)
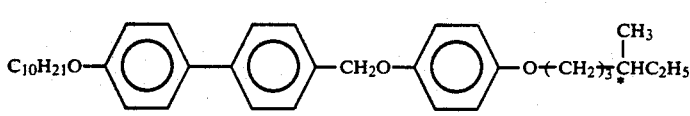 (34)
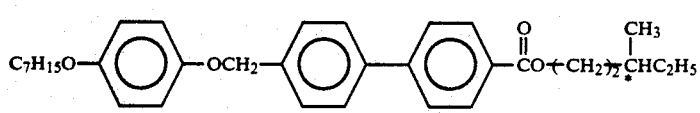 (35)
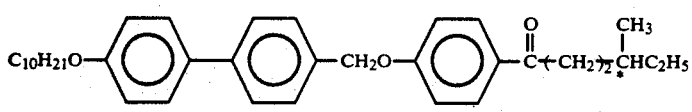 (36)
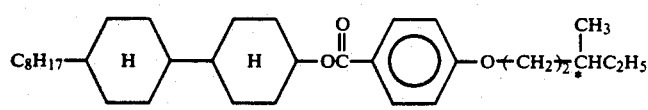 (37)
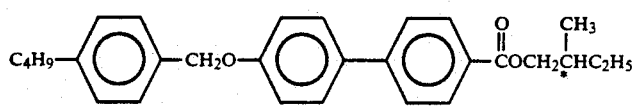 (38)
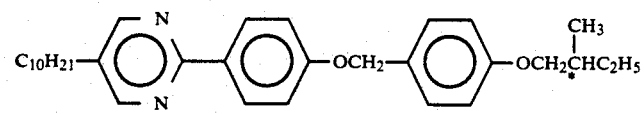 (39)

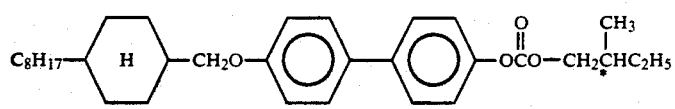
(40)
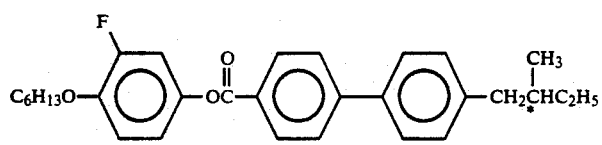
(41)
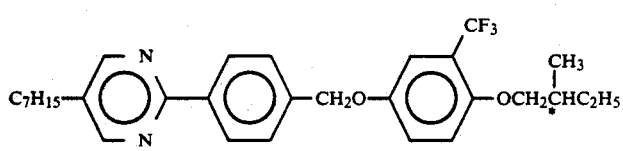
(42)
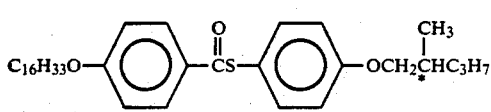
(43)
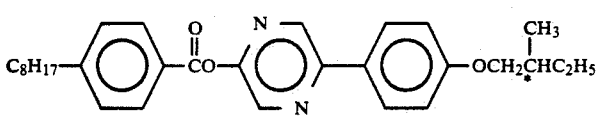
(44)
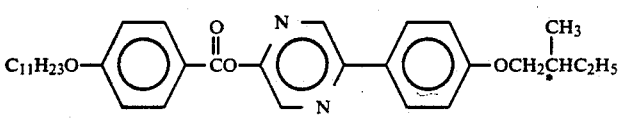
(45)
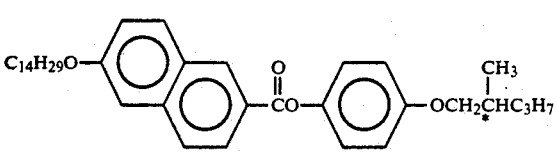
(46)
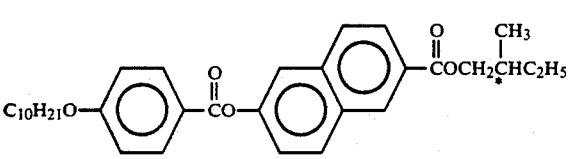
(47)
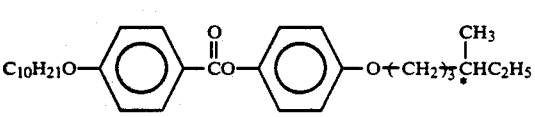
(48)
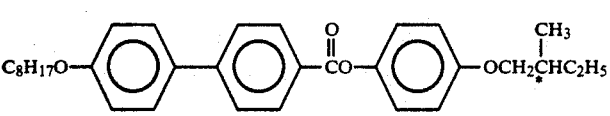
(49)
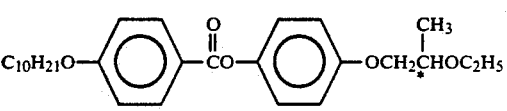
(50)
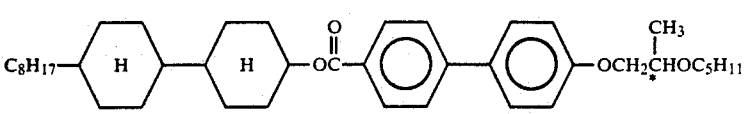
(51)

-continued
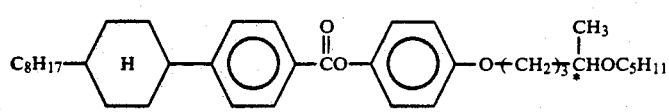 (52)
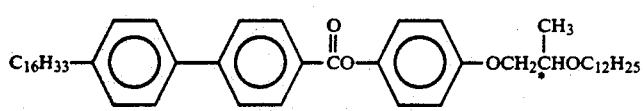 (53)
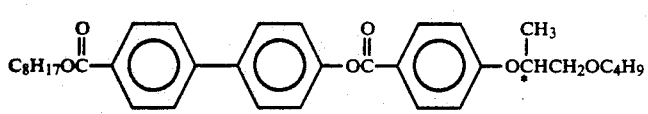 (54)
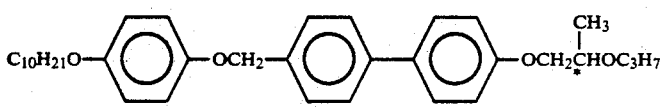 (55)
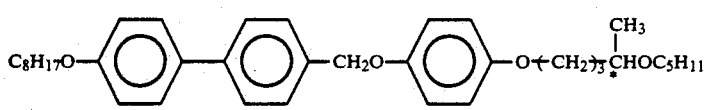 (56)
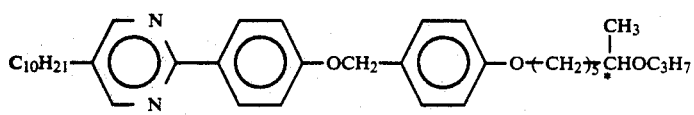 (57)
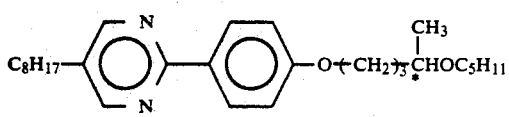 (58)
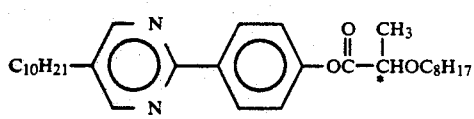 (59)
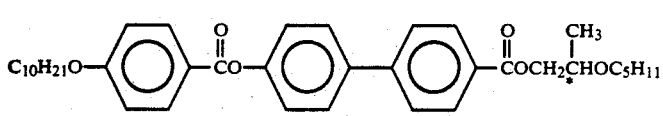 (60)
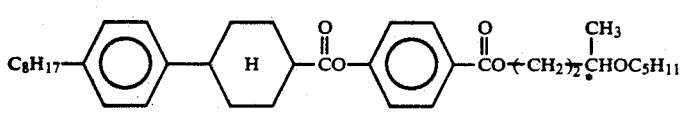 (61)
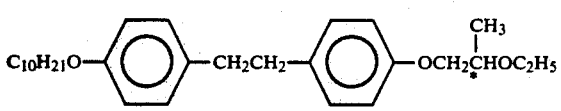 (62)
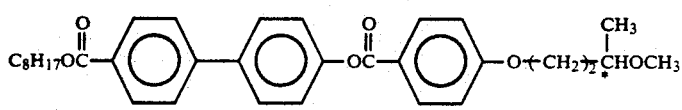 (63)
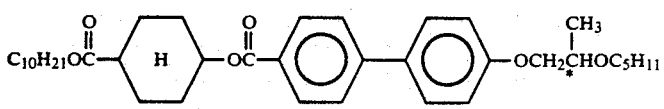 (64)

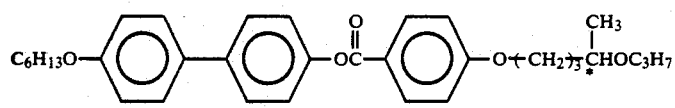
(65)
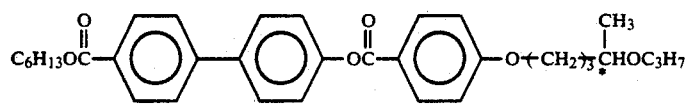
(66)
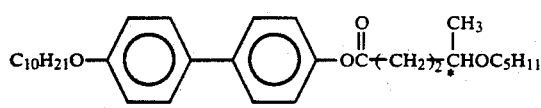
(67)
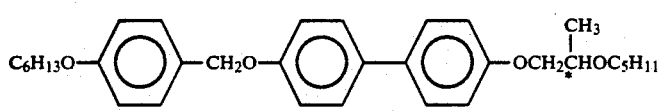
(68)
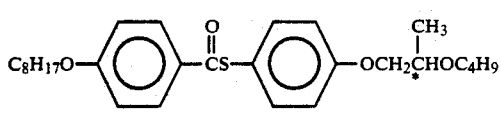
(69)
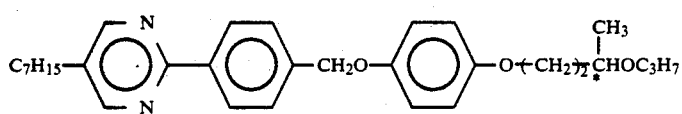
(70)
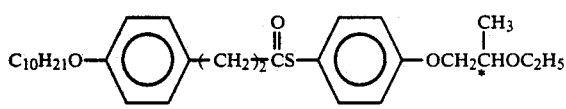
(71)
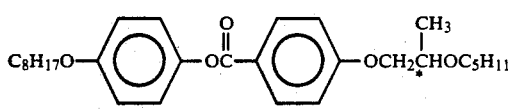
(72)
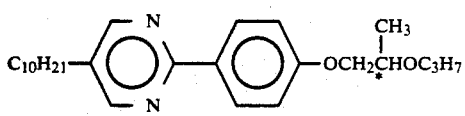
(73)
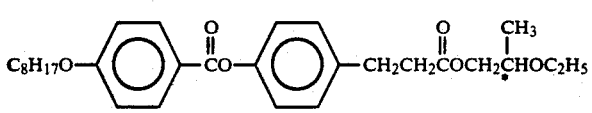
(74)
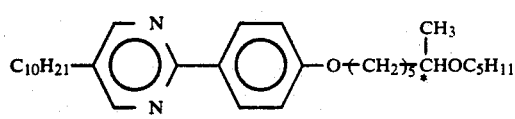
(75)
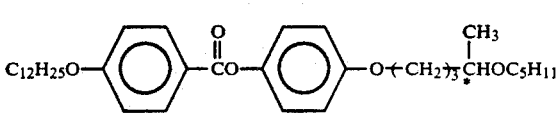
(76)
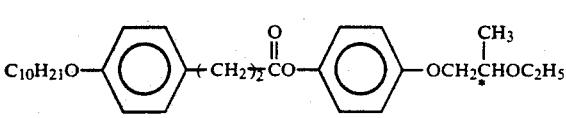
(77)

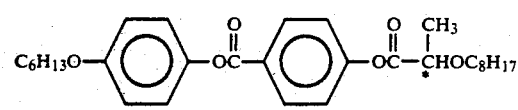 (78)
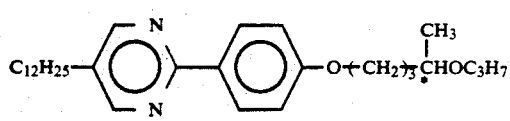 (79)
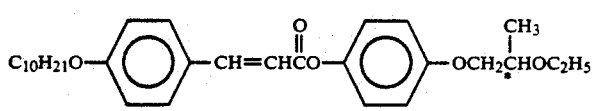 (80)
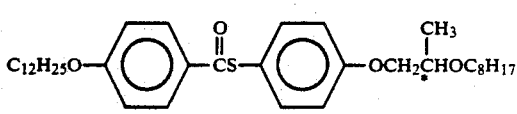 (81)
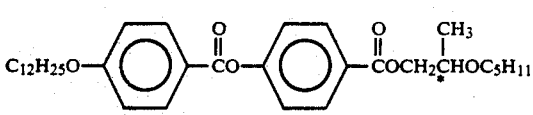 (82)
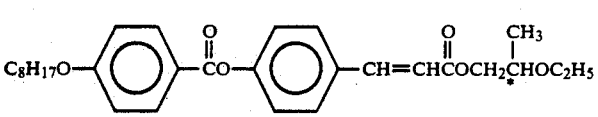 (83)
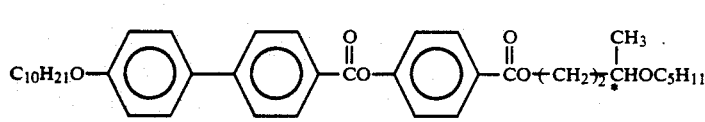 (84)
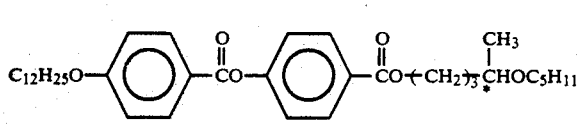 (85)
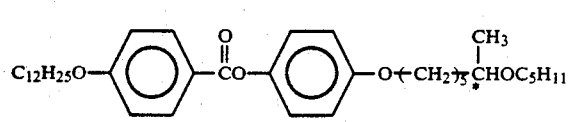 (86)
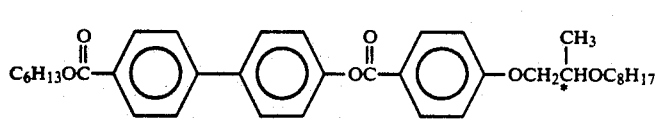 (87)
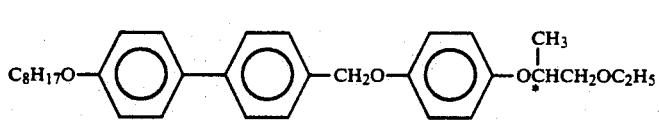 (88)
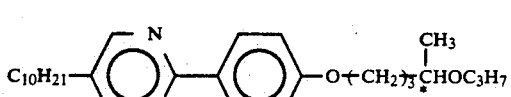 (89)
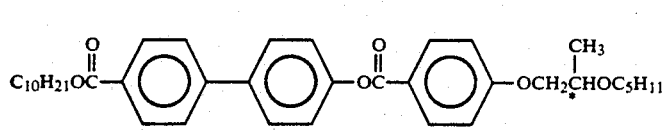 (90)

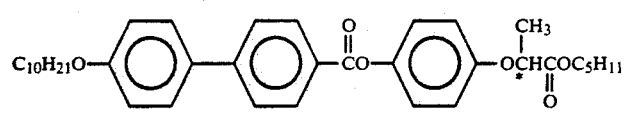 (91)
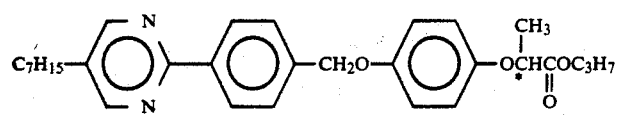 (92)
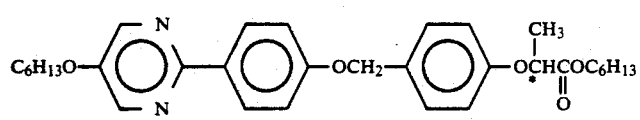 (93)
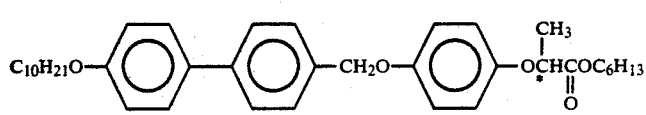 (94)
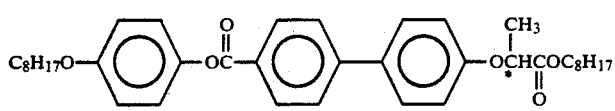 (95)
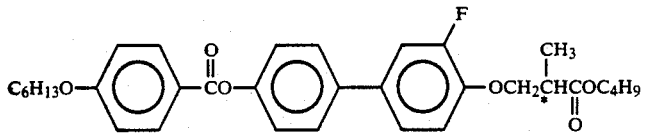 (96)
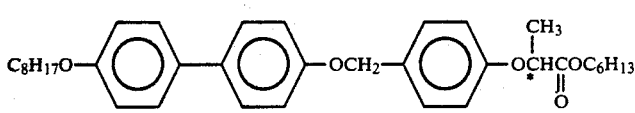 (97)
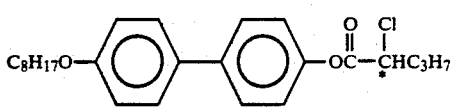 (98)
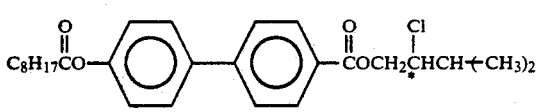 (99)
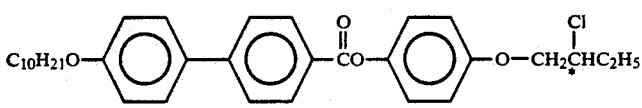 (100)
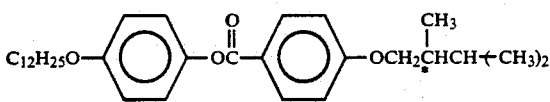 (101)
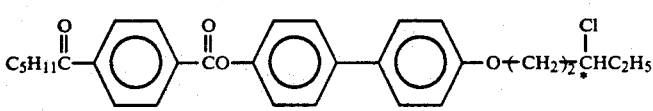 (102)
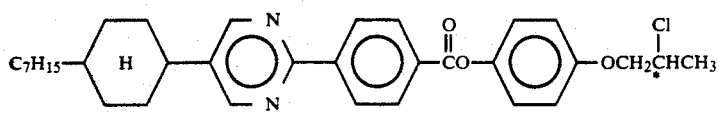 (103)

-continued
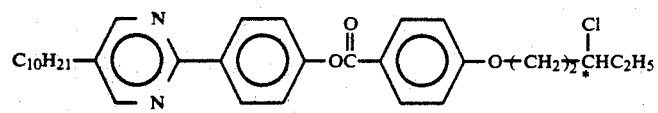 (104)
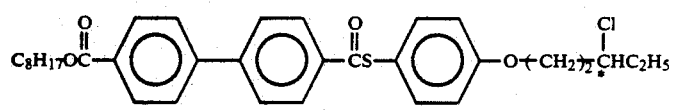 (105)
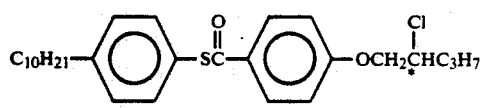 (106)
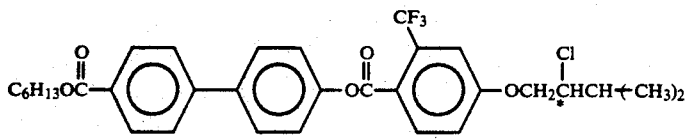 (107)
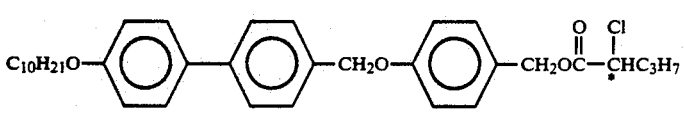 (108)
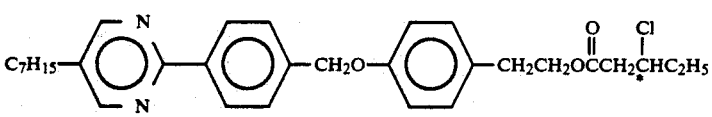 (109)
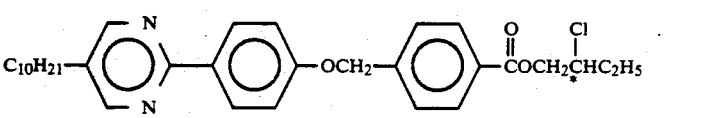 (110)
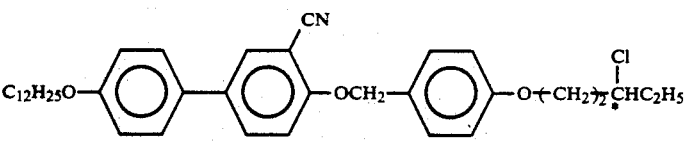 (111)
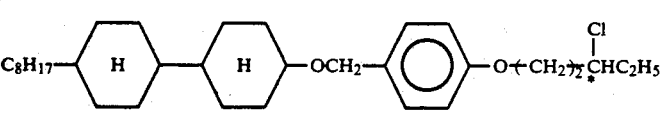 (112)
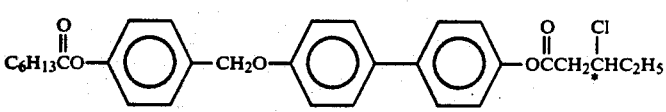 (113)
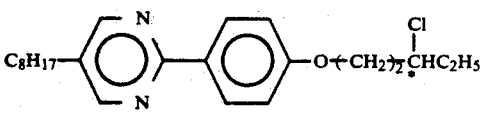 (114)
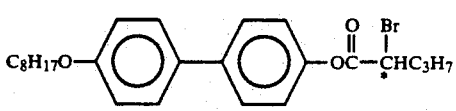 (115)
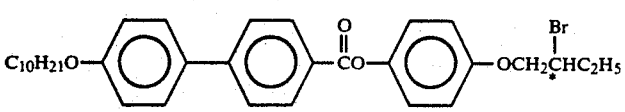 (116)

-continued
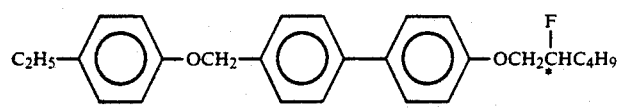 (117)
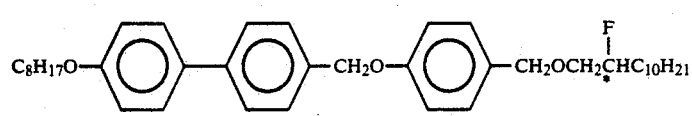 (118)
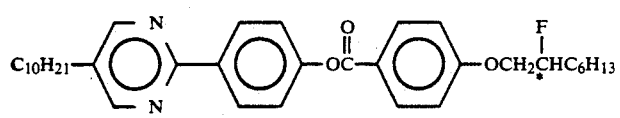 (119)
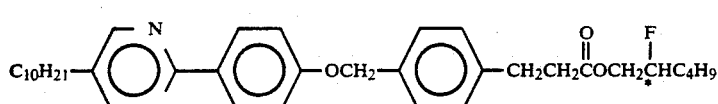 (120)
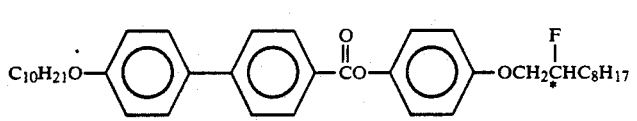 (121)
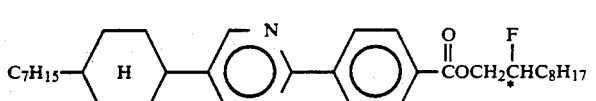 (122)
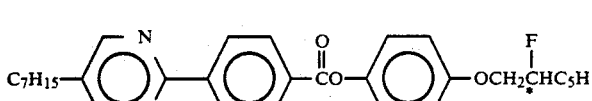 (123)
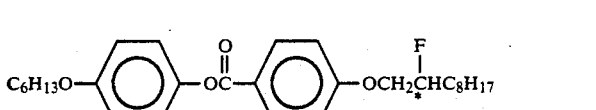 (124)
 (125)
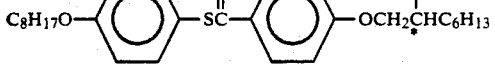 (126)
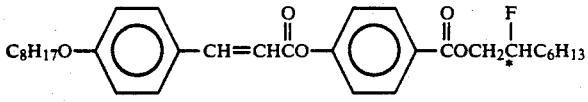 (127)
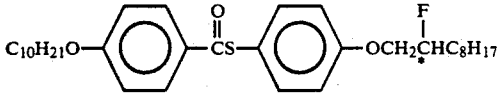 (128)
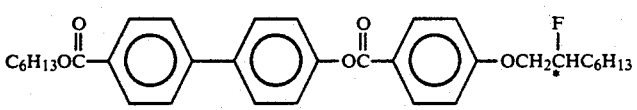 (129)
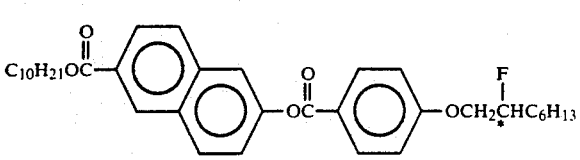

-continued
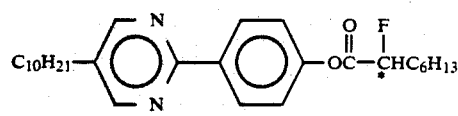 (130)
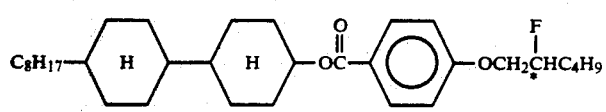 (131)
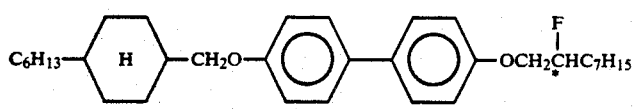 (132)
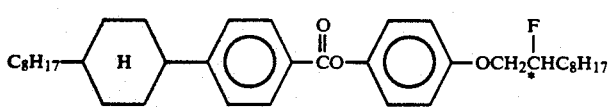 (133)
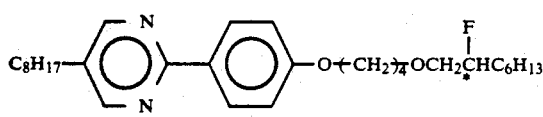 (134)
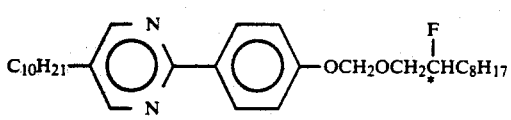 (135)
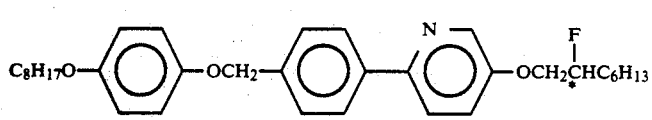 (136)
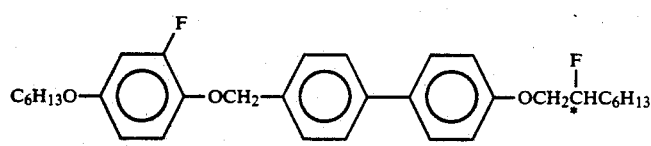 (137)
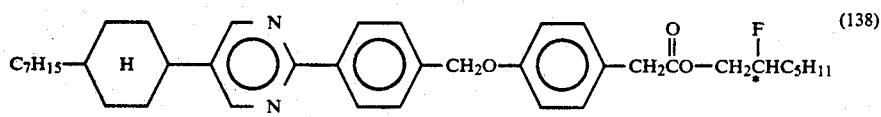 (138)
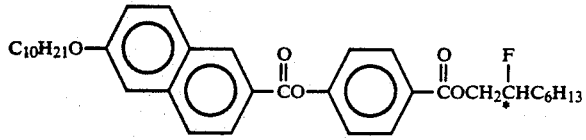 (139)
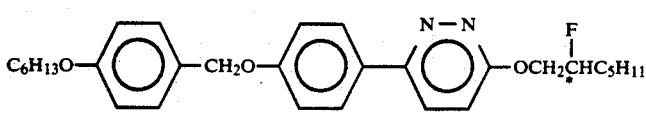 (140)
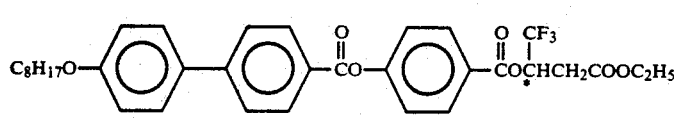 (142)
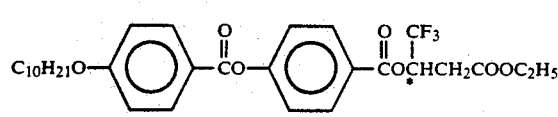 (143)

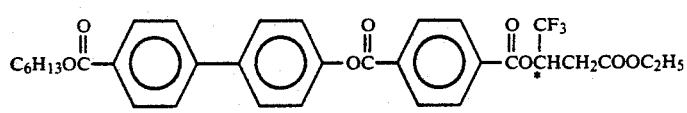 (144)
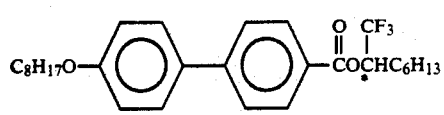 (145)
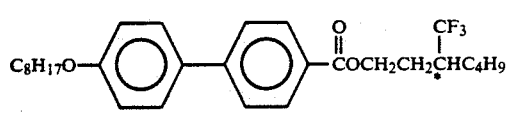 (146)
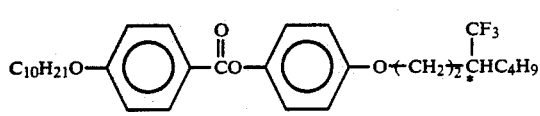 (147)
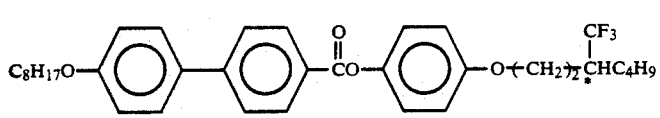 (148)
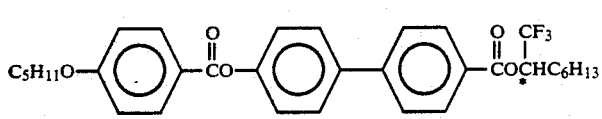 (149)
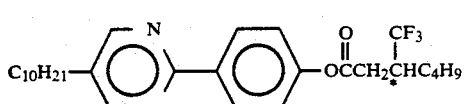 (150)
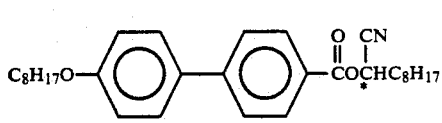 (151)
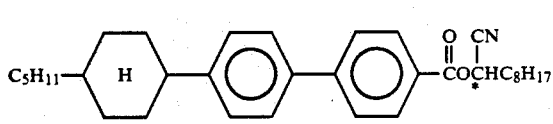 (152)
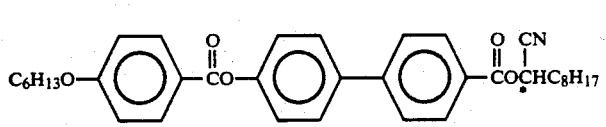 (153)
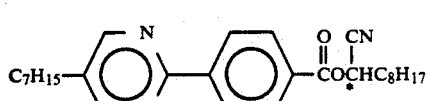 (154)
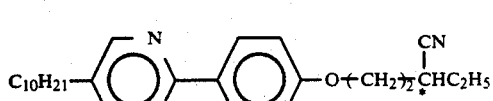 (155)
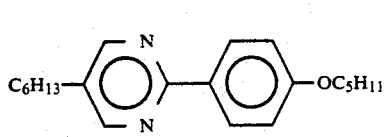 (156)

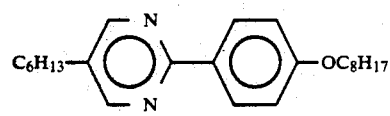 (157)
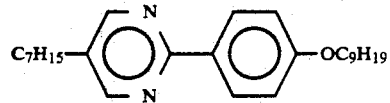 (158)
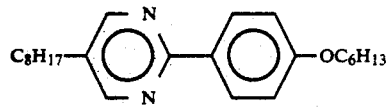 (159)
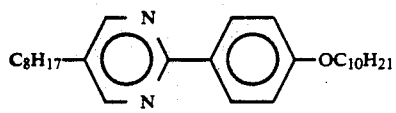 (160)
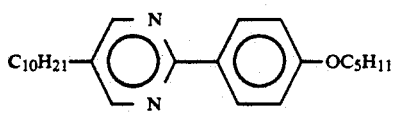 (161)
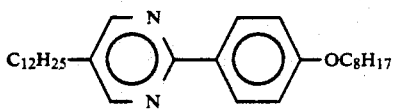 (162)
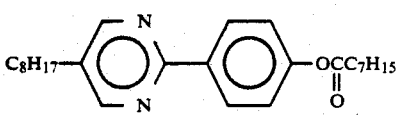 (163)
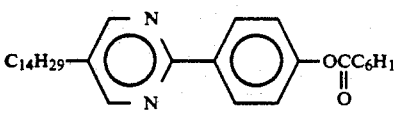 (164)
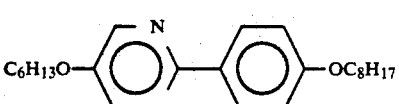 (165)
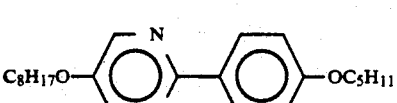 (166)
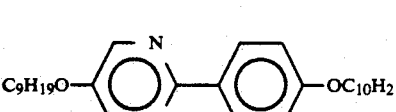 (167)
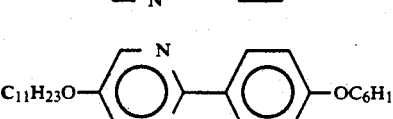 (168)
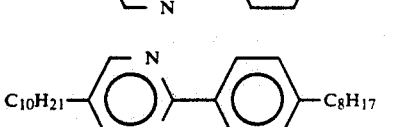 (169)

-continued
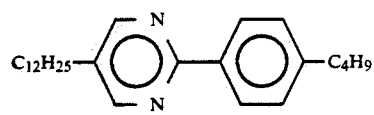 (170)
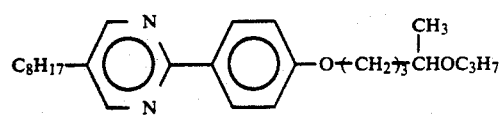 (171)
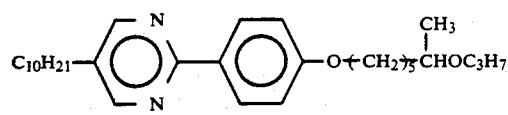 (172)
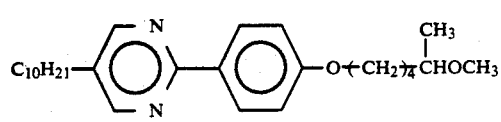 (173)
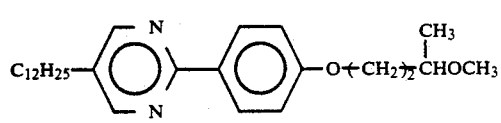 (174)
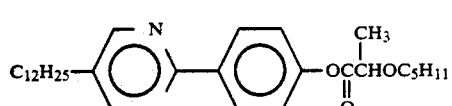 (175)
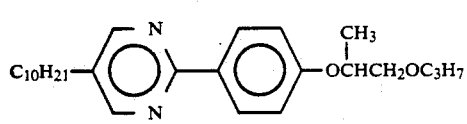 (176)
 (177)
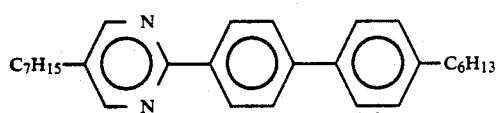 (178)
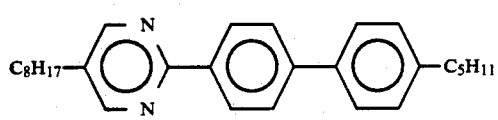 (179)
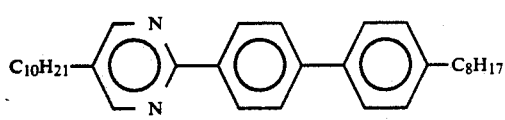 (180)
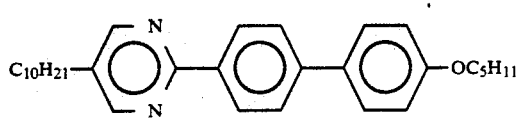 (181)
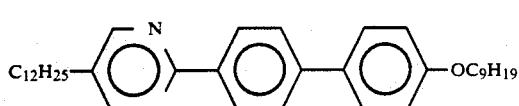 (182)

-continued
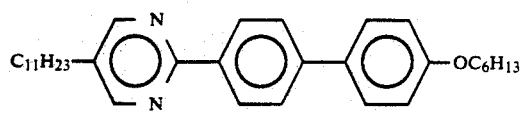 (183)
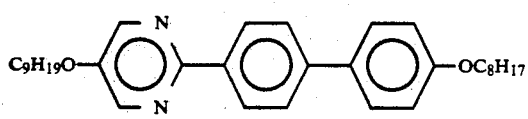 (184)
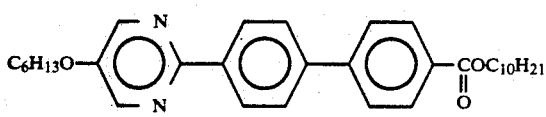 (185)
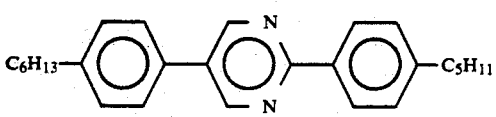 (186)
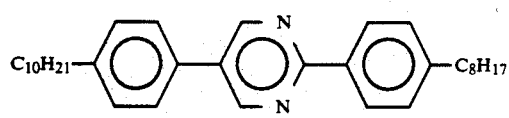 (187)
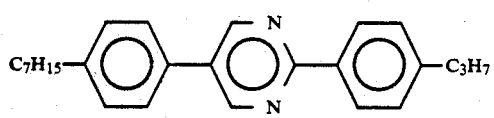 (188)
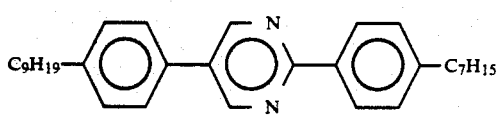 (189)
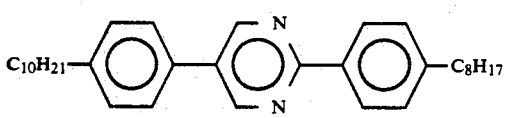 (190)
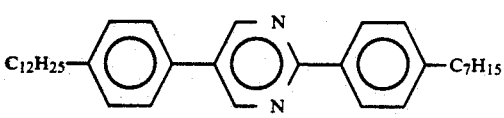 (191)
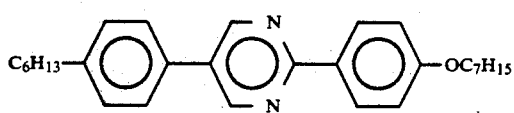 (192)
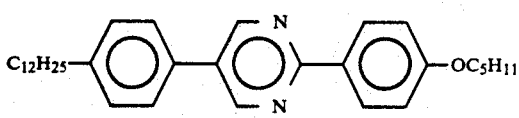 (193)
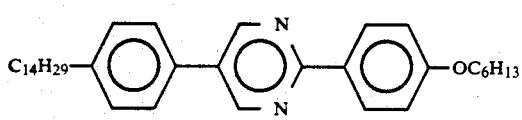 (194)
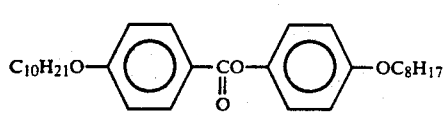 (195)

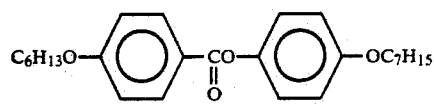 (196)
 (197)
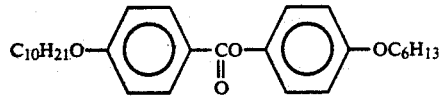 (198)
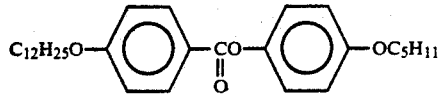 (199)
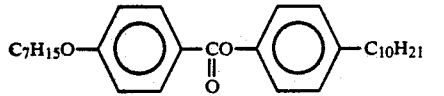 (200)
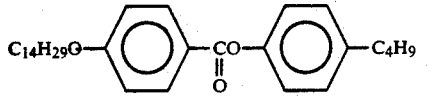 (201)
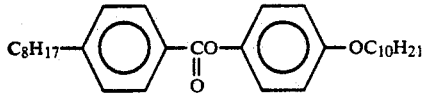 (202)
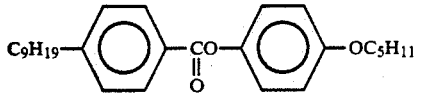 (203)
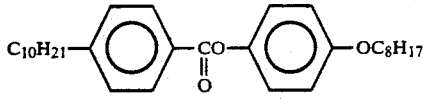 (204)
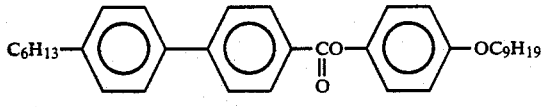 (205)
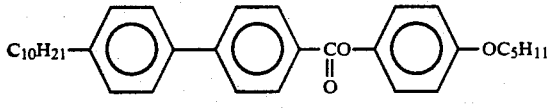 (206)
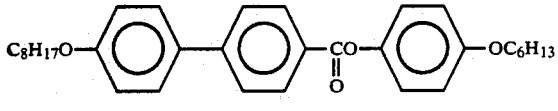 (207)
 (208)
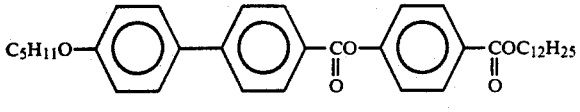 (209)
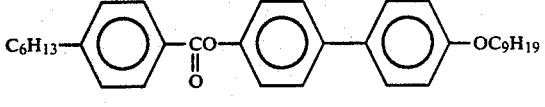

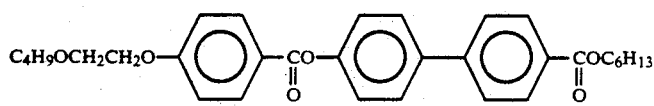
(210)
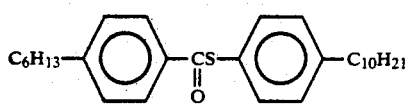
(211)
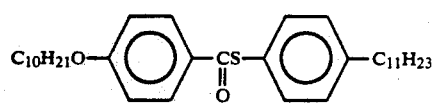
(212)
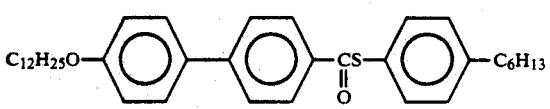
(213)
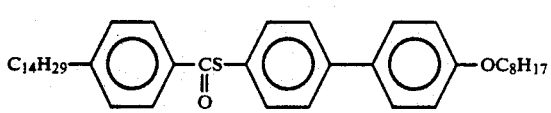
(214)
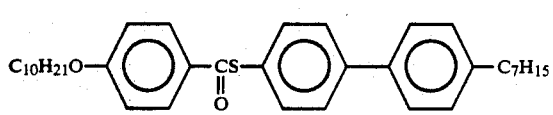
(215)
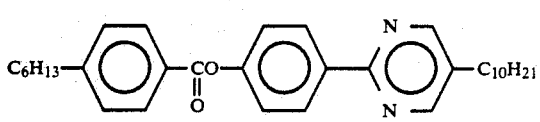
(216)
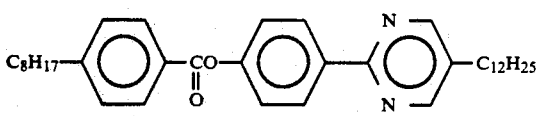
(217)
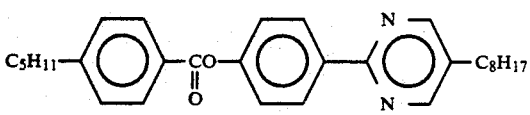
(218)
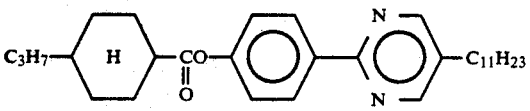
(219)
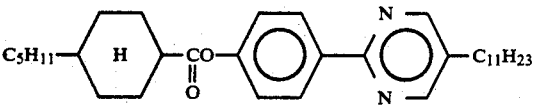
(220)
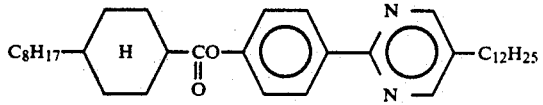
(221)
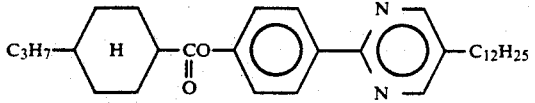
(222)

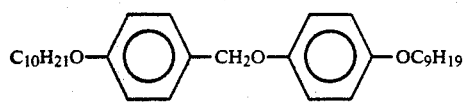 (223)

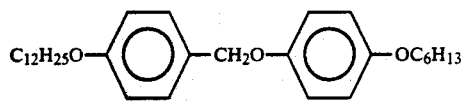 (224)

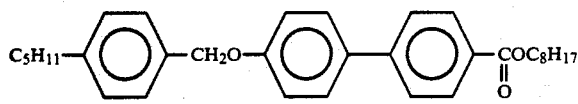 (225)

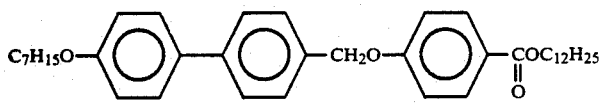 (226)

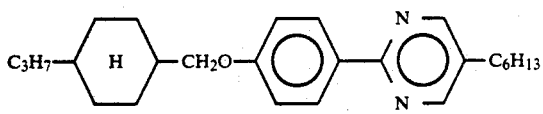 (227)

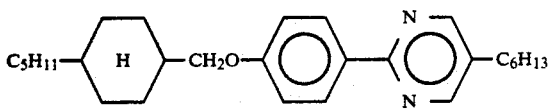 (228)

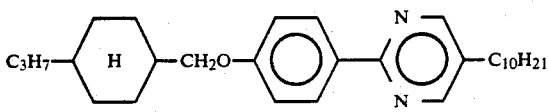 (229)

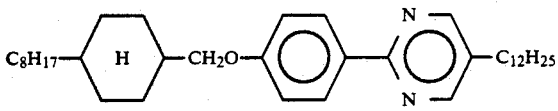 (230)

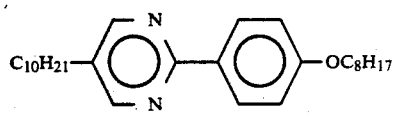 (231)

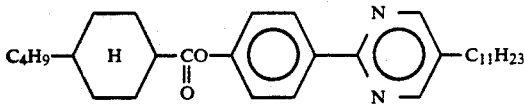 (232)

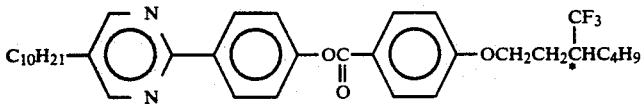 (233)

In formulating the liquid crystal composition according to the present invention, it is desirable to mix 1–300 wt. parts each, preferably 2–100 wt. parts each, of a compound represented by the formula (I) and a compound represented by the formula (II) with 100 wt. parts of another mesomorphic compound as mentioned above which can be composed of two or more species.

Further, when two or more species of either one or both of the compounds represented by the formulas (I) and (II) are used, the two or more species of the compound of the formula (I) or (II) may be used in a total amount of 1–500 wt. parts, preferably 2–100 wt. parts, per 100 wt. parts of another mesomorphic compound as described above which can be composed of two or more species.

The ferroelectric liquid crystal device according to the present invention may preferably be prepared by heating the liquid crystal composition prepared as described above into an isotropic liquid under vacuum, filling a blank cell comprising a pair of oppositely spaced electrode plates with the composition, gradually cooling the cell to form a liquid crystal layer and restoring the normal pressure.

FIG. 1 is a schematic sectional view of an embodiment of the ferroelectric liquid crystal device prepared as described above for explanation of the structure thereof.

Referring to FIG. 1, the ferroelectric liquid crystal device includes a ferroelectric liquid crystal layer 1 disposed between a pair of glass substrates 2 each having thereon a transparent electrode 3 and an insulating alignment control layer 4. Lead wires 6 are connected to the electrodes so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a solution of an organic insulating material or a precursor thereof in a concentration of 0.1 to 20 wt. %, preferably 0.2-10 wt. %, by spinner coating, dip coating, screen printing, spray coating or roller coating, followed by curing or hardening under prescribed hardening condition (e.g., by heating). The insulating alignment control layer may have a thickness of ordinarily 50 Å-1 micron, preferably 100-3000 Å, further preferably 100-1000 Å. The two glass substrates 2 with transparent electrodes 3 (which may be inclusively referred to herein as "electrode plates") and further with insulating alignment control layers 4 thereof are held to have a prescribed (but arbitrary) gap with a spacer 5. For example, such a cell structure with a prescribed gap may be formed by sandwiching spacers of silica beads or alumina beads having a prescribed diameter with two glass plates, and then sealing the periphery thereof with, e.g., an epoxy adhesive. Alternatively, a polymer film or glass fiber may also be used as a spacer. Between the two glass plates, a ferroelectric liquid crystal is sealed up to provide a ferroelectric liquid crystal layer 1 in a thickness of generally 0.5 to 20 microns, preferably 1 to 5 microns.

The transparent electrodes 3 are connected to the external power supply 7 through the lead wires 6. Further, outside the glass substrates 2, polarizers 8 are applied. The device shown in FIG. 1 is of a transmission type and is provided with a light source 9.

Figure 2:
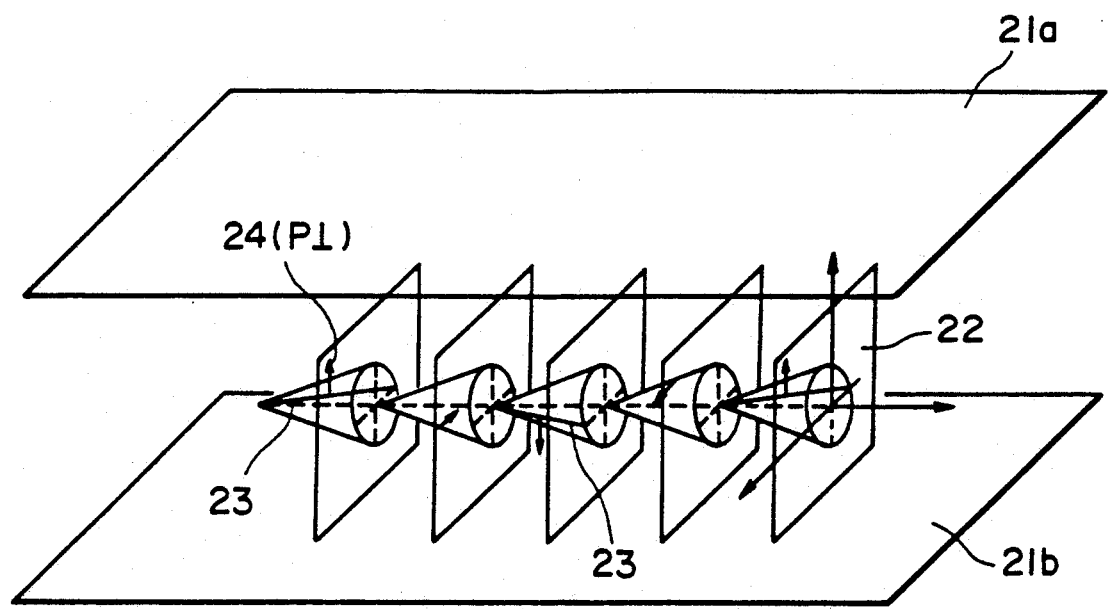
FIGS. 2 and 3 are schematic perspective views of a device cell embodiment for illustrating the operation principle of a ferroelectric liquid crystal device.

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment ($P_\perp$) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments ($P_\perp$) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
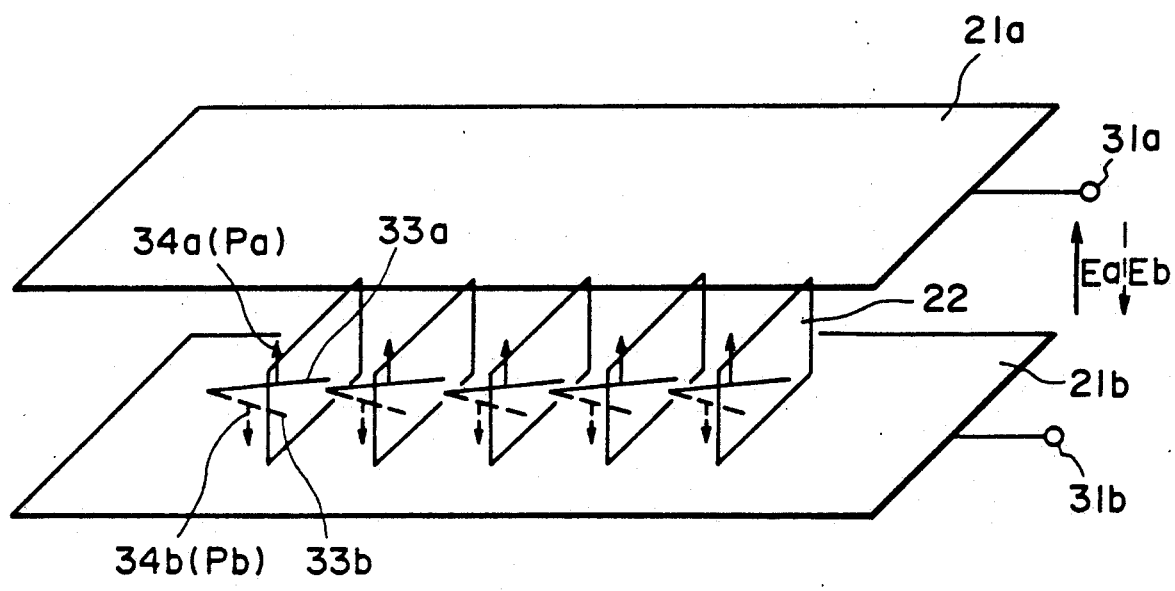

Further, when the liquid crystal cell is made sufficiently thin (e.g., less than about 10 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by using voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation element, it is possible to obtain two advantages as described above. First is that the response speed is quite fast. Second is that the orientation of the liquid crystal molecules shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

When such a ferroelectric liquid crystal device comprising a ferroelectric liquid crystal composition as described above between a pair of electrode plates is constituted as a simple matrix display device, the device may be driven by a driving method as disclosed in Japanese Laid-Open Patent Applications (KOKAI) Nos. 193426/1984, 193427/1984, 156046/1985, 156047/1985, etc.

Hereinbelow, the present invention will be explained more specifically with reference to examples. It is however to be understood that the present invention is not restricted to these examples.

EXAMPLE 1

A liquid crystal composition 1-A was prepared by mixing the following compounds in respectively indicated proportions.

| Ex. Compound No. | Structural formula | Wt. parts |
|---|---|---|
| 7 | $C_8H_{17}$–⬡–COO–⬡–⬡–OCH$_2$C*HC$_2$H$_5$ (with CH$_3$) | 15 |
| 65 | $C_3H_7$OC*H(CH$_3$)(CH$_2$)$_3$O–⬡–COO–⬡–⬡–OC$_6H_{13}$ | 5 |
| 66 | $C_3H_7$OC*H(CH$_3$)(CH$_2$)$_3$O–⬡–COO–⬡–⬡–COOC$_6H_{13}$ | 10 |
| 195 | $C_{10}H_{21}$O–⬡–COO–⬡–OC$_8H_{17}$ | 5 |
| 201 | $C_8H_{17}$–⬡–COO–⬡–OC$_{10}H_{21}$ | 8 |
| 197 | $C_{10}H_{21}$O–⬡–COO–⬡–OC$_6H_{13}$ | 5 |
| 203 | $C_{10}H_{21}$–⬡–COO–⬡–OC$_8H_{17}$ | 12 |
| 9 | $C_8H_{17}$O–⬡–COS–⬡–OCH$_2$C*HC$_2$H$_5$ (with CH$_3$) | 9 |
| 11 | $C_{10}H_{21}$O–⬡–COS–⬡–OCH$_2$C*HC$_2$H$_5$ (with CH$_3$) | 6 |
| 54 | $C_4H_9$OCH$_2$C*HO(CH$_3$)–⬡–COO–⬡–⬡–COOC$_8H_{17}$ | 5 |
| 82 | $C_{12}H_{25}$O–⬡–COO–⬡–COO–CH$_2$C*HOC$_5H_{11}$ (with CH$_3$) | 15 |

-continued

| Ex. Compound No. | Structural formula | Wt. parts |
|---|---|---|
| 85 | 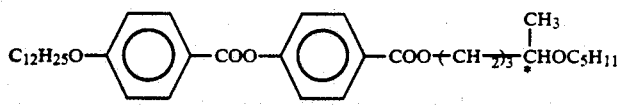 | 5 |

A liquid crystal composition 1-B was prepared by mixing the following example compounds in the proportions indicated below with the above-prepared composition 1-A.

| Ex. Comp. No. | Structural formula | Wt. parts |
|---|---|---|
| 1-13 | 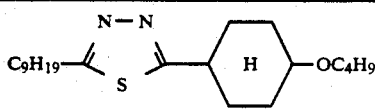 | 2 |
| I-49 | 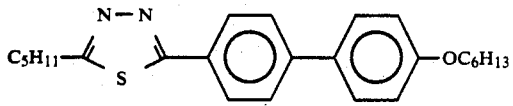 | 4 |
| I-88 | 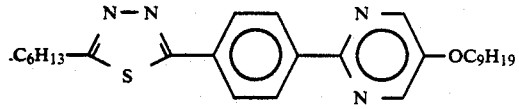 | 3 |
| II-20 | 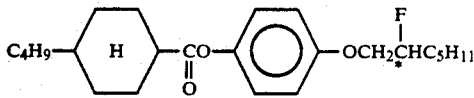 | 2 |
| II-40 | 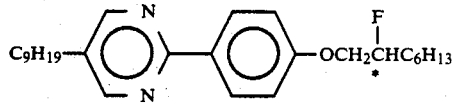 | 3 |
| II-102 | 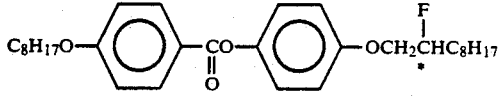 | 2 |
| Composition 1-A | | 84 |

The above-prepared liquid crystal composition 1-B was used to prepare a liquid crystal device in combination with a blank cell prepared in the following manner.

Two 1.1 mm-thick glass plates were provided and respectively coated with an ITO film to form an electrode for voltage application, which was further coated with an insulating layer of vapor-deposited $SiO_2$. The insulating layer was further coated with a 1.0%-solution of polyimide resin precursor (SP-710, available from Toray K.K.) in dimethylacetoamide by a spinner coater rotating at 2500 rpm for 15 seconds. Thereafter, the coating film was subjected to heat curing at 300° C. for 60 min. to obtain about 200 Å-thick film. The coating film was rubbed with acetate fiber-planted cloth. The thus treated two glass plates were washed with isopropyl alcohol. After silica beads with an average particle size of 1.5 microns were dispersed on one of the glass plates, the two glass plates were applied to each other with a bonding sealing agent (Lixon Bond, available from Chisso K.K.) so that their rubbed directions were parallel to each other and heated at 100° C. for 60 min. to form a blank cell. The cell gap was found to be about 1.5 microns as measured by a Berek compensator.

Then, the above-prepared liquid crystal composition 1-B was heated into an isotropic liquid, and injected into the above prepared cell under vacuum and, after sealing, was gradually cooled at a rate of 20° C./hour to 25° C. to prepare a ferroelectric liquid crystal device.

The ferroelectric liquid crystal device was subjected to measurement of an optical response time (time from voltage application until the transmittance change reaches 90% of the maximum) at specified temperatures under the application of a peak-to-peak voltage Vpp of 25 volts in combination with right-angle cross-nicol polarizers. The results are shown below.

| | 10° C | 25° C. | 40° C. |
|---|---|---|---|
| Response time | 786 μsec | 259 μsec | 106 μsec |

Further, a contrast of 12.5 was attained at 25° C. during the driving, and a clear switching function was observed. The bistability after termination of the voltage application was also good.

COMPARATIVE EXAMPLE 1

A liquid crystal composition 1-C was prepared by omitting Example compounds Nos. II-20, II-40 and II-102 from the liquid crystal composition 1-B prepared in Example 1, i.e., by adding only Example compounds Nos. I-13, I-49 and I-88 to the liquid crystal composition 1-A, and a liquid crystal composition 1-D was prepared by omitting Example compounds Nos. I-13, I-49 and I-88 from the composition 1-B, i.e., by adding only Example compounds Nos. II-20, II-40 and II-102 to the composition 1-A.

Ferroelectric liquid crystal devices 1-A, 1-C and 1-D were prepared by using the compositions 1-A, 1-C and 1-D, respectively, instead of the composition 17-B, and subjected to measurement of optical response time, otherwise in the same manner as in Example 1. The results are shown below.

Response Time

| | Response time | | |
|---|---|---|---|
| | 10° C. | 25° C. | 40° C. |
| 1-A | 1410 μsec | 435 μsec | 155 μsec |
| 1-C | 1209 μsec | 372 μsec | 138 μsec |
| 1-D | 910 μsec | 292 μsec | 120 μsec |

As apparent from the above Example 1 and Comparative Example 1, the ferroelectric liquid crystal device containing the liquid crystal composition 1-B according to the present invention provided improved response speed and operation characteristic at a lower temperature and also provided a descreased temperature dependence of response speed (ratio of response time (10° C./40° C.)).

EXAMPLE 2

A liquid crystal composition 2-B was prepared by mixing the following example compounds in the indicated proportions with the liquid crystal composition 1-A prepared in Example 1.

| Ex. Comp. No. | Structural formula | wt. parts |
|---|---|---|
| I-21 | $C_{10}H_{21}$—[N-N/S]—⟨⟩—$C_4H_9$ (with N in right ring) | 3 |
| I-44 | $C_8H_{17}$—[N-N/S]—⟨⟩—⟨⟩—$C_6H_{13}$ | 3 |
| I-73 | $C_{12}H_{25}$—[N-N/S]—⟨⟩—⟨H⟩—$C_6H_{13}$ | 2 |
| II-11 | $C_3H_7$—⟨H⟩—CO-O—⟨⟩—OCH$_2$CHFC$_5$H$_{11}$ | 2 |
| II-45 | $C_{10}H_{21}$—⟨N,N⟩—⟨⟩—OCH$_2$CHFC$_6$H$_{13}$ | 4 |
| II-96 | $C_{10}H_{21}$CO-O—⟨⟩—CO-O—⟨⟩—OCH$_2$CHFC$_7$H$_{15}$ | 2 |
| | Composition 1-A | 84 |

A ferroelectric liquid crystal device was prepared in the same manner as in Example 1 except that the above liquid crystal composition 2-B was used, and the device was subjected to measurement of optical response time and observation of switching states. In the device, a monodomain with a good and uniform alignment characteristic was observed. The results of the measurement are shown below.

| | 10° C. | 25° C. | 40° C. |
|---|---|---|---|
| Response time | 734 μsec | 248 μsec | 106 μsec |

Further, a contrast of 11.9 was attained at 25° C. during the driving, and a clear switching function was observed. The bistability after termination of the voltage application was also good.

COMPARATIVE EXAMPLE 2

A liquid crystal composition 2-C was prepared by omitting Example compounds Nos. II-11, II-45 and II-96 from the liquid crystal composition 2-B prepared in Example 2, i.e., by adding only Example compounds Nos. I-21, I-44 and I-73 to the liquid crystal composition 1-A, and a liquid crystal composition 2-D was prepared by omitting Example compounds Nos. I-21, I-44 and I-73 from the composition 2-B, i.e., by adding only Example compounds Nos. II-11, II-45 and II-96 to the composition 1-A.

Ferroelectric liquid crystal devices 1-A, 2-C and 2-D were prepared by using the compositions 1-A, 2-C and 2-D, respectively, instead of the composition 1-B, and subjected to measurement of optical response time, otherwise in the same manner as in Example 1. The results are shown below.

Response time

|     | Response time |         |         |
| --- | ---           | ---     | ---     |
|     | 10° C.        | 25° C.  | 40° C.  |
| 1-A | 1410 μsec     | 435 μsec | 155 μsec |
| 2-C | 1214 μsec     | 371 μsec | 136 μsec |
| 2-D | 847 μsec      | 283 μsec | 119 μsec |

As apparent from the above Example 2 and Comparative Example 2, the ferroelectric liquid crystal device containing the liquid crystal composition 2-B according to the present invention provided improved response speed and operation characteristic at a lower temperature and also provided a decreased temperature dependence of response speed.

EXAMPLE 3

A liquid crystal composition 3-B was prepared by mixing the following example compounds in the indicated proportions with the liquid crystal composition 1-A prepared in Example 1.

| Ex. Comp. No. | Structural formula | wt. parts |
| --- | --- | --- |
| I-29 | $C_{10}H_{21}$-[thiadiazole]-[phenyl]-O-(CH$_2$)$_3$CH=CH$_2$ | 4 |
| I-38 | $C_{10}H_{21}$-[thiadiazole]-[thiophene]-$C_6H_{13}$ | 2 |
| I-44 | $C_8H_{17}$-[thiadiazole]-[phenyl]-[phenyl]-$C_6H_{13}$ | 3 |
| II-3 | $C_5H_{11}$-[H]-COO-[phenyl]-COOCH$_2$CHFC$_6$H$_{13}$* | 2 |
| II-75 | $C_{10}H_{21}$-[pyrimidine]-[phenyl]-CH$_2$CHFC$_6$H$_{31}$* | 2 |
| II-93 | $C_{14}H_{29}$O-[phenyl]-COO-[phenyl]-COOCH$_2$CHFC$_4$H$_9$* | 2 |
| Composition 1-A | | 85 |

A ferroelectric liquid crystal device was prepared in the same manner as in Example 1 except that the above liquid crystal composition 3-B was used, and the device was subjected to measurement of optical response time and observation of switching states. In the device, a monodomain with a good and uniform alignment characteristic was observed. The results of the measurement are shown below.

|               | 10° C.    | 25° C.    | 40° C.    |
| ---           | ---       | ---       | ---       |
| Response time | 858 μsec  | 278 μsec  | 109 μsec  |

Further, a contrast of 11.2 was attained at 25° C. during the driving, and a clear switching function was observed. The bistability after termination of the voltage application was also good.

COMPARATIVE EXAMPLE 3

A liquid crystal composition 3-C was prepared by omitting Example compounds Nos. II-3, II-75 and II-93 from the liquid crystal composition 3-B prepared in Example 3, i.e., by adding only Example compounds Nos. I-29, I-38 and I-44 to the liquid crystal composition 1-A, and a liquid crystal composition 3-D was prepared by omitting Example compounds Nos. I-29, I-38 and I-44 from the composition 3-B, i.e., by adding only Example compounds Nos. II-3, II-75 and II-93 to the composition 1-A.

Ferroelectric liquid crystal devices 1-A, 3-C and 3-D were prepared by using the compositions 1-A, 3-C and 3-D, respectively, instead of the composition 1-B, and subjected to measurement of optical response time, otherwise in the same manner as in Example 1. The results are shown below.

Response time (μsec)

|     | Response time (μsec) | | |
| --- | --- | --- | --- |
|     | 10° C. | 25° C. | 40° C. |
| 1-A | 1410 | 435 | 155 |
| 3-C | 1206 | 372 | 135 |
| 3-D | 992 | 315 | 124 |

As apparent from the above Example 3 and Comparative Example 3, the ferroelectric liquid crystal device containing the liquid crystal composition 3-B according to the present invention provided improved response speed and operation characteristic at a lower temperature and also provided a decreased temperature dependence of response speed.

EXAMPLE 4

A liquid crystal composition 4-B was prepared by mixing the following example compounds in the indicated proportions with the liquid crystal composition 1-A prepared in Example 1.

monodomain with a good and uniform alignment characteristic was observed. The results of the measurement are shown below.

|     | 10° C. | 25° C. | 40° C. |
| --- | --- | --- | --- |
| Response time | 809 μsec | 272 μsec | 112 μsec |

Further, a contrast of 12.4 was attained at 25° C. during the driving, and a clear switching function was observed. The bistability after termination of the voltage application was also good.

COMPARATIVE EXAMPLE 4

A liquid crystal composition 4-C was prepared by omitting Example compounds Nos. II-17, II-39 and II-50 from the liquid crystal composition 4-B prepared in Example 4, i.e., by adding only Example compounds Nos. I-28 and I-58 to the liquid crystal composition 1-A, and a liquid crystal composition 4-D was prepared by omitting Example compounds Nos. I-28 and I-58 from the composition 4-B, i.e., by adding only Example compounds Nos. II-17, II-39 and II-50 to the composition 1-A.

Ferroelectric liquid crystal devices 1-A, 4-C and 4-D were prepared by using the compositions 1-A, 4-C and 4-D, respectively, instead of the composition 1-B, and subjected to measurement of optical response time, otherwise in the same manner as in Example 1. The results are shown below.

Response time (μsec)

| Ex. Comp. No. | Structural formula | wt. parts |
| --- | --- | --- |
| I-28 | $C_{10}H_{21}$—[N—N / S]—〈⟩—$OC_8H_{17}$ (with pyridine N) | 4 |
| I-58 | $C_9H_{19}$—[N—N / S]—〈⟩—〈⟩—O$(CH_2)_3$CH($CH_3$)O$C_3H_7$ | 2 |
| II-17 | $C_5H_{11}$—[H]—CO—O—〈⟩—OCH$_2$CHFC$_6H_{13}$* | 3 |
| II-39 | $C_9H_{19}$—[N⟩⟨N]—〈⟩—OCH$_2$CHFC$_5H_{11}$* | 3 |
| II-50 | $C_{10}H_{21}$—[N⟩⟨N]—〈⟩—OCH$_2$CHFC$_{12}H_{25}$* | 2 |
| Composition 1-A | | 86 |

A ferroelectric liquid crystal device was prepared in the same manner as in Example 1 except that the above liquid crystal composition 4-B was used, and the device was subjected to measurement of optical response time and observation of switching states. In the device, a

|     | Response time (μsec) | | |
| --- | --- | --- | --- |
|     | 10° C. | 25° C. | 40° C. |
| 1-A | 1410 | 435 | 155 |

| | Response time (μsec) | | |
|---|---|---|---|
| | 10° C. | 25° C. | 40° C. |
| 4-C | 1229 | 379 | 137 |
| 4-D | 918 | 303 | 124 |

As apparent from the above Example 4 and Comparative Example 4, the ferroelectric liquid crystal device containing the liquid crystal composition 4-B according to the present invention provided improved response speed and operation characteristic at a lower temperature and also provided a descreased temperature dependence of response speed.

EXAMPLE 5

A liquid crystal composition 5-A was prepared by mixing the following compounds in respectively indicated proportions.

| Ex. Comp. No. | Structural formula | wt. parts |
|---|---|---|
| 195 | 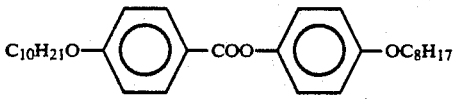 | 6 |
| 201 | 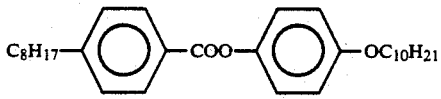 | 8 |
| 197 | 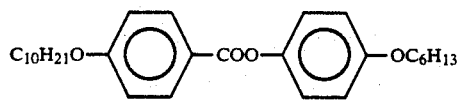 | 9 |
| 203 | 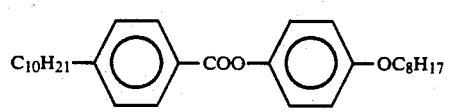 | 12 |
| 18 | 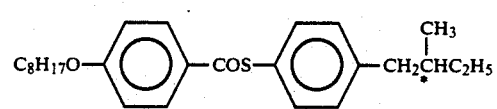 | 3 |
| 19 | 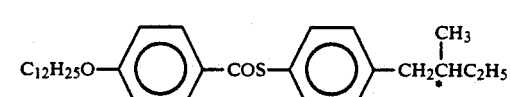 | 3 |
| 9 | 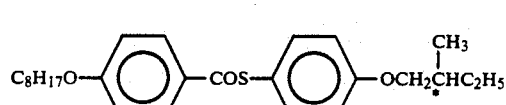 | 3 |
| 11 | 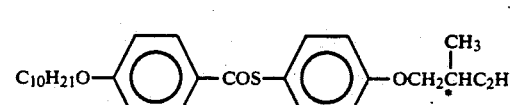 | 3 |
| 66 | 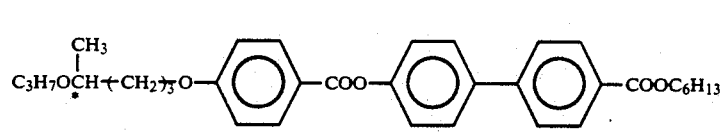 | 15 |
| 54 | 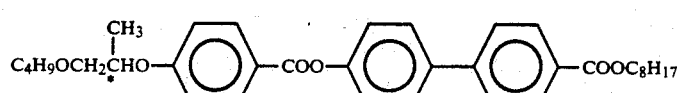 | 15 |
| 63 | 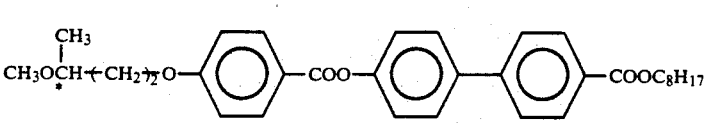 | 8 |

-continued

| Ex. Comp. No. | Structural formula | wt. parts |
|---|---|---|
| 82 | $C_{12}H_{25}O$—⟨Ph⟩—COO—⟨Ph⟩—COO—$CH_2\overset{*}{C}H(CH_3)OC_5H_{11}$ | 9 |
| 85 | $C_{12}H_{25}O$—⟨Ph⟩—COO—⟨Ph⟩—COO—$(CH_2)_3\overset{*}{C}H(CH_3)OC_5H_{11}$ | 6 |

A liquid crystal composition 5-B was prepared by mixing the following example compounds in the indicated proportions with the liquid crystal composition 5-A.

| Ex. Comp. No. | Structural formula | wt. parts |
|---|---|---|
| I-7 | $C_{10}H_{21}$—⟨thiadiazole⟩—⟨H-cyclohexyl⟩—$C_6H_{13}$ | 2 |
| I-32 | $C_9H_{19}$—⟨thiadiazole⟩—⟨pyridyl⟩—$OCOC_6H_{13}$ | 4 |
| I-51 | $C_6H_{13}$—⟨thiadiazole⟩—⟨Ph⟩—⟨Ph⟩—$OC_4H_9$ | 4 |
| II-18 | $C_3H_7$—⟨H-cyclohexyl⟩—COO—⟨Ph⟩—$OCH_2\overset{*}{C}H(F)C_7H_{15}$ | 4 |
| II-33 | $C_6H_{13}$—⟨pyrimidinyl⟩—⟨Ph⟩—$OCH_2\overset{*}{C}H(F)C_4H_9$ | 2 |
| II-98 | $C_{10}H_{21}O$—⟨Ph⟩—COO—⟨Ph⟩—$OCH_2\overset{*}{C}H(F)C_6H_{13}$ | 3 |
| | Composition 5-A | 81 |

A ferroelectric liquid crystal device was prepared in the same manner as in Example 1 except that the above liquid crystal composition 5-B was used, and the device was subjected to measurement of optical response time and observation of switching states. In the device, a monodomain with a good and uniform alignment characteristic was observed. The results of the measurement are shown below.

| | 10° C. | 25° C. | 40° C. |
|---|---|---|---|
| Response time | 745 μsec | 261 μsec | 102 μsec |

Further, a contrast of 10.6 was attained at 25° C. during the driving, and a clear switching function was observed. The bistability after termination of the voltage application was also good.

COMPARATIVE EXAMPLE 5

A liquid crystal composition 5-C was prepared by omitting Example compounds Nos. II-18, II-33 and II-98 from the liquid crystal composition 5-B prepared in Example 5, i.e., by adding only Example compounds Nos. I-7, I-32 and I-51 to the liquid crystal composition 5-A, and a liquid crystal composition 5-D was prepared by omitting Example compounds Nos. I-7, I-32 and I-51 from the composition 5-B, i.e., by adding only Example compounds Nos. II-18, II-33 and II-98 to the composition 5-A.

Ferroelectric liquid crystal devices 5-A, 5-C and 5-D were prepared by using the compositions 5-A, 5-C and 5-D, respectively, instead of the composition 1-B, and subjected to measurement of optical response time, otherwise in the same manner as in Example 1. The results are shown below.

Response time (μsec)

|     | Response time (μsec) | | |
| --- | --- | --- | --- |
|     | 10° C. | 25° C. | 40° C. |
| 5-A | 1155 | 362 | 133 |
| 5-C | 968 | 322 | 118 |
| 5-D | 873 | 278 | 110 |

As apparent from the above Example 5 and Comparative Example 5, the ferroelectric liquid crystal device containing the liquid crystal composition 5-B according to the present invention provided improved response speed and operation characteristic at a lower temperature and also provided a descreased temperature dependence of response speed.

EXAMPLE 6

A liquid crystal composition 6-B was prepared by mixing the following example compounds in the indicated proportions with the liquid crystal composition 5-A prepared in Example 5.

| Ex. Comp. No. | Structural formula | wt. parts |
| --- | --- | --- |
| I-41 | $C_9H_{19}$—[thiazole N—N]—[thiophene]—$CC_6H_{13}$ (=O) | 2 |
| I-61 | $C_{11}H_{23}$—[thiazole N—N]—[biphenyl]—$OC(=O){+}CH_2{\rightarrow}_7 SC_3H_7$ | 4 |
| I-70 | $C_6H_{13}$—[thiazole N—N]—[phenyl]—[cyclohexyl H]—$C_5H_{11}$ | 2 |
| II-59 | $C_{12}H_{25}$—[pyrimidine N,N]—[phenyl]—$OCH_2\overset{*}{C}H(F)C_6H_{13}$ | 4 |
| II-107 | $C_{10}H_{21}$—[phenyl]—CO(=O)—[phenyl]—$OCH_2\overset{*}{C}H(F)C_6H_{13}$ | 2 |
| II-116 | $C_{11}H_{23}O$—[phenyl]—CO(=O)—[phenyl]—$OCH_2\overset{*}{C}H(F)C_5H_{11}$ | 2 |
| Composition 5-A | | 84 |

A ferroelectric liquid crystal device was prepared in the same manner as in Example 1 except that the above liquid crystal composition 6-B was used, and the device was subjected to measurement of optical response time and observation of switching states. In the device, a monodomain with a good and uniform alignment characteristic was observed. The results of the measurement are shown below.

|     | 10° C. | 25° C. | 40° C. |
| --- | --- | --- | --- |
| Response time | 782 μsec | 272 μsec | 102 μsec |

Further, a contrast of 10.1 was attained at 25° C. during the driving, and a clear switching function was observed. The bistability after termination of the voltage application was also good.

COMPARATIVE EXAMPLE 6

A liquid crystal composition 6-C was prepared by omitting Example compounds Nos. II-59, II-107 and II-116 from the liquid crystal composition 6-B prepared in Example 6, i.e., by adding only Example compounds Nos. I-41, I-61 and I-70 to the liquid crystal composition 5-A, and a liquid crystal composition 6-D was prepared by omitting Example compounds Nos. I-41, I-61 and I-70 from the composition 6-B, i.e., by adding only Example compounds Nos. II-59, II-107 and II-116 to the composition 5-A.

Ferroelectric liquid crystal devices 5-A, 6-C and 6-D were prepared by using the compositions 5-A, 6-C and 6-D, respectively, instead of the composition 1-B, and subjected to measurement of optical response time, otherwise in the same manner as in Example 1. The results are shown below.

Response time (μsec)

|     | Response time (μsec) | | |
| --- | --- | --- | --- |
|     | 10° C. | 25° C. | 40° C. |
| 5-A | 1155 | 362 | 133 |

-continued

| | Response time (μsec) | | |
|---|---|---|---|
| | 10° C. | 25° C. | 40° C. |
| 6-C | 995 | 335 | 122 |
| 6-D | 899 | 289 | 110 |

As apparent from the above Example 6 and Comparative Example 6, the ferroelectric liquid crystal device containing the liquid crystal composition 6-B according to the present invention provided improved response speed and operation characteristic at a lower temperature and also provided a descreased temperature dependence of response speed.

EXAMPLE 7

A liquid crystal composition 7-B was prepared by mixing the following example compounds in the indicated proportions with the liquid crystal composition 5-A prepared in Example 5.

| Ex. Comp. No. | Structural formula | wt. parts |
|---|---|---|
| I-24 | $CH_3$ / $C_2H_5CH$–$(CH_2)_2$– [thiadiazole] – [pyridine] – $C_8H_{17}$ | 3 |
| I-49 | $C_5H_{11}$ – [thiadiazole] – [phenyl] – [phenyl] – $OC_6H_{13}$ | 3 |
| I-76 | $C_8H_{17}$ – [thiadiazole] – [cyclohexane] – [phenyl] – $C_5H_{11}$ | 2 |
| II-13 | $C_2H_5$ – [cyclohexane] – CO–O– [phenyl] – $OCH_2\overset{*}{C}HC_{12}H_{25}$ (F) | 2 |
| II-69 | $C_4H_9OCH_2CH_2$ – [pyrimidine] – [phenyl] – $OCH_2\overset{*}{C}HC_6H_{13}$ (F) | 2 |
| II-104 | $C_9H_{19}O$ – [phenyl] – CO–O– [phenyl] – $OCH_2\overset{*}{C}HC_4H_9$ (F) | 4 |
| Composition 5-A | | 84 |

A ferroelectric liquid crystal device was prepared in the same manner as in Example 1 except that the above liquid crystal composition 7-B was used, and the device was subjected to measurement of optical response time and observation of switching states. In the device, a monodomain with a good and uniform alignment characteristic was observed. The results of the measurement are shown below.

| | 10° C. | 25° C. | 40° C. |
|---|---|---|---|
| Response time | 781 μsec | 269 μsec | 101 μsec |

Further, a contrast of 11.2 was attained at 25° C. during the driving, and a clear switching function was observed. The bistability after termination of the voltage application was also good.

COMPARATIVE EXAMPLE 7

A liquid crystal composition 7-C was prepared by omitting Example compounds Nos. II-13, II-69 and II-104 from the liquid crystal composition.7-B prepared in Example 7, i.e., by adding only Example compounds Nos. I-24, I-49 and I-76 to the liquid crystal composition 5-A, and a liquid crystal composition 7-D was prepared by omitting Example compounds Nos. I-24, I-49 and I-76 from the composition 7-B, i.e., by adding only Example compounds Nos. II-13, II-69 and II-104 to the composition 5-A.

Ferroelectric liquid crystal devices 5-A, 7-C and 7-D were prepared by using the compositions 5-A, 7-C and 7-D, respectively, instead of the composition 1-B, and subjected to measurement of optical response time, otherwise in the same manner as in Example 1. The results are shown below.

| | Response time (μsec) | | |
|---|---|---|---|
| | 10° C. | 25° C. | 40° C. |
| 5-A | 1155 | 362 | 133 |
| 7-C | 991 | 331 | 119 |
| 7-D | 895 | 283 | 109 |

As apparent from the above Example 7 and Comparative Example 7, the ferroelectric liquid crystal device containing the liquid crystal composition 7-B according to the present invention provided improved response speed and operation characteristic at a lower temperature and also provided a descreased temperature dependence of response speed.

EXAMPLE 8

A liquid crystal composition 8-B was prepared by mixing the following example compounds in the indicated proportions with the liquid crystal composition 5-A prepared in Example 5.

| Ex. Comp. No. | Structural formula | wt. parts |
| --- | --- | --- |
| I-53 | $C_6H_{13}$–[thiadiazole]–[phenyl]–[phenyl]–$OC_{12}H_{25}$ | 4 |
| I-81 | $C_8H_{17}$–[thiadiazole]–[H]–[H]–$C_6H_{13}$ | 2 |
| I-85 | $C_6H_{13}$–[thiadiazole]–[phenyl]–[pyrimidine]–$C_7H_{15}$ | 3 |
| II-2 | $C_3H_7$–[H]–CO–O–[phenyl]–COCH$_2$*CHC$_8$H$_{17}$ (F) | 4 |
| II-95 | $C_{13}H_{27}O$–[phenyl]–CO–O–[phenyl]–COCH$_2$*CHC$_3$H$_7$ (F) | 2 |
| Composition 5-A | | 85 |

A ferroelectric liquid crystal device was prepared in the same manner as in Example 1 except that the above liquid crystal composition 8-B was used, and the device was subjected to measurement of optical response time and observation of switching states. In the device, a monodomain with a good and uniform alignment characteristic was observed. The results of the measurement are shown below.

| | 10° C. | 25° C. | 40° C. |
| --- | --- | --- | --- |
| Response time | 778 μsec | 267 μsec | 98 μsec |

Further, a contrast of 10.5 was attained at 25° C. during the driving, and a clear switching function was observed. The bistability after termination of the voltage application was also good.

COMPARATIVE EXAMPLE 8

A liquid crystal composition 8-C was prepared by omitting Example compounds Nos. II-2 and II-95 from the liquid crystal composition 8-B prepared in Example 8, i.e., by adding only Example compounds Nos. I-53, I-81 and I-85 to the liquid crystal composition 5-A, and a liquid crystal composition 8-D was prepared by omitting Example compounds Nos. I-53, I-81 and I-85 from the composition 8-B, i.e., by adding only Example compounds Nos. II-2 and II-95 to the composition 5-A.

Ferroelectric liquid crystal devices 5-A, 8-C and 8-D were prepared by using the compositions 5-A, 8-C and 8-D, respectively, instead of the composition 1-B, and subjected to measurement of optical response time, otherwise in the same manner as in Example 1. The results are shown below.

| | Response time (μsec) | | |
| --- | --- | --- | --- |
| | 10° C. | 25° C. | 40° C. |
| 5-A | 1155 | 362 | 133 |
| 8-C | 988 | 328 | 120 |
| 8-D | 970 | 306 | 118 |

As apparent from the above Example 8 and Comparative Example 8, the ferroelectric liquid crystal device containing the liquid crystal composition 8-b according to the present invention provided improved response speed and operation characteristic at a lower temperature and also provided a descreased temperature dependence of response speed.

EXAMPLE 9

A liquid crystal composition 9-B was prepared by mixing the following compounds in respectively indicated proportions.

| Ex. Comp. No. | Structural formula | wt. parts |
|---|---|---|
| 18 | 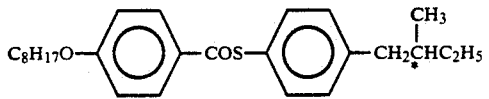 | 18 |
| 19 | 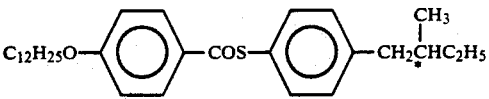 | 18 |
| 9 | 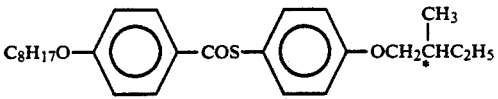 | 8 |
| 11 | 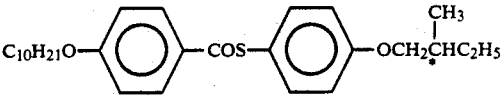 | 8 |
| 87 | 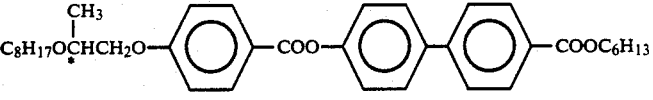 | 12 |
| 210 | 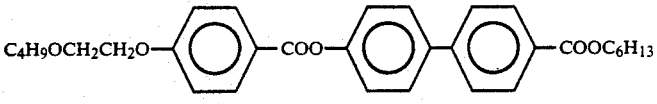 | 12 |
| 90 | 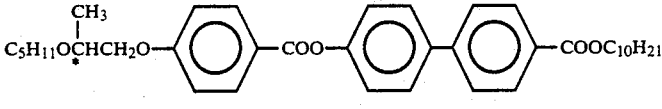 | 6 |
| 157 | 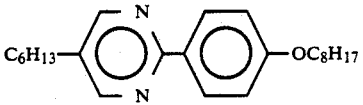 | 6 |
| 160 | 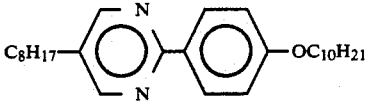 | 6 |
| 177 | 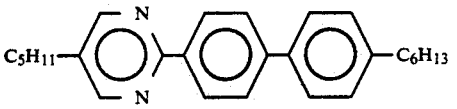 | 4 |
| 189 | 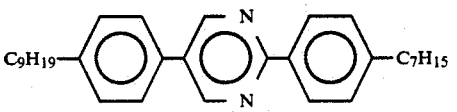 | 2 |
A liquid crystal composition 9-B was prepared by mixing the following example compounds in the indicated proportions with the liquid crystal composition 9-A.

| Ex. Comp. No. | Structural formula | wt. parts |
|---|---|---|
| I-21 | $C_{10}H_{21}$—[thiadiazole N-N/S]—[pyridine N]—$C_4H_9$ | 3 |
| I-53 | $C_6H_{13}$—[thiadiazole N-N/S]—[phenyl]—[phenyl]—$OC_{12}H_{25}$ | 4 |
| I-89 | $C_{10}H_{21}$—[thiadiazole N-N/S]—[phenyl]—[pyrimidine N/N]—$OC_6H_{13}$ | 2 |
| II-12 | $C_4H_9$—[cyclohexyl H]—CO—O—[phenyl]—$OCH_2\overset{*}{C}H(F)C_8H_{17}$ | 2 |
| II-33 | $C_6H_{13}$—[pyrimidine N/N]—[phenyl]—$OCH_2\overset{*}{C}H(F)C_4H_9$ | 2 |
| II-100 | $C_6H_{13}O$—[phenyl]—CO—O—[phenyl]—$OCH_2\overset{*}{C}H(F)C_6H_{13}$ | 2 |
| Composition 9-A | | 85 |

A ferroelectric liquid crystal device was prepared in the same manner as in Example 1 except that the above liquid crystal composition 9-B was used, and the device was subjected to measurement of optical response time and observation of switching states. In the device, a monodomain with a good and uniform alignment characteristic was observed. The results of the measurement are shown below.

| | 10° C. | 25° C. | 40° C. |
|---|---|---|---|
| Response time | 629 μsec | 187 μsec | 68 μsec |

Further, a contrast of 11.4 was attained at 25° C. during the driving, and a clear switching function was observed. The bistability after termination of the voltage application was also good.

COMPARATIVE EXAMPLE 9

A liquid crystal composition 9-C was prepared by omitting Example compounds Nos. II-12, II-33 and II-100 from the liquid crystal composition 9-B prepared in Example 9, i.e., by adding only Example compounds Nos. I-21, I-53 and I-89 to the liquid crystal composition 9-A, and a liquid crystal composition 9-D was prepared by omitting Example compounds Nos. I-21, I-53 and I-89 from the composition 9-B, i.e., by adding only Example compounds Nos. II-12, II-33 and II-100 to the composition 9-A.

Ferroelectric liquid crystal devices 9-A, 9-C and 9-D were prepared by using the compositions 9-A, 9-C and 9-D, respectively, instead of the composition 1-B, and subjected to measurement of optical response time, otherwise in the same manner as in Example 1. The results are shown below.

| | Response time (μsec) | | |
|---|---|---|---|
| | 10° C. | 25° C. | 40° C. |
| 9-A | 1180 | 326 | 100 |
| 9-C | 1037 | 292 | 92 |
| 9-D | 697 | 208 | 75 |

As apparent from the above Example 9 and Comparative Example 9, the ferroelectric liquid crystal device containing the liquid crystal composition 9-B according to the present invention provided improved response speed and operation characteristic at a lower temperature and also provided a descreased temperature dependence of response speed.

EXAMPLE 10

A liquid crystal composition 10-B was prepared by mixing the following example compounds in the indicated proportions with the liquid crystal composition 9-A prepared in Example 9.

| Ex. Comp. No. | Structural formula | wt. parts |
|---|---|---|
| I-6 | $C_9H_{19}$—[N—N/S triazole]—[H cyclohexane]—$C_4H_9$ | 2 |
| I-59 | $C_5H_{11}$—[N—N/S triazole]—[phenyl]—[phenyl]—$OCC_6H_{13}$ (=O) | 4 |
| I-92 | $C_6H_{13}$—[N—N/S triazole]—[N,N-pyrimidine]—[phenyl]—$C_{10}H_{21}$ | 4 |
| II-5 | $C_3H_7$—[H cyclohexane]—CO(=O)—[phenyl]—$COCH_2\overset{*}{C}HC_6H_{13}$ with F | 3 |
| II-86 | $C_{12}H_{25}$—[N,N-pyrimidine]—[phenyl]—$COCH_2\overset{*}{C}HC_8H_{17}$ with F | 3 |
| | Composition 9-A | 84 |

A ferroelectric liquid crystal device was prepared in the same manner as in Example 1 except that the above liquid crystal composition 10-B was used, and the device was subjected to measurement of optical response time and observation of switching states. In the device, a monodomain with a good and uniform alignment characteristic was observed. The results of the measurement are shown below.

| | 10° C. | 25° C. | 40° C. |
|---|---|---|---|
| Response time | 641 μsec | 122 μsec | 70 μsec |

Further, a contrast of 11.2 was attained at 25° C. during the driving, and a clear switching function was observed. The bistability after termination of the voltage application was also good.

COMPARATIVE EXAMPLE 10

A liquid crystal composition 10-C was prepared by omitting Example compounds Nos. II-5 and II-86 from the liquid crystal composition 10-B prepared in Example 10, i.e., by adding only Example compounds Nos. I-6, I-59 and I-92 to the liquid crystal composition 9-A, and a liquid crystal composition 10-D was prepared by omitting Example compounds Nos. I-6, I-59 and I-92 from the composition 10-B, i.e., by adding only Example compounds Nos. II-5 and II-86 to the composition 9-A.

Ferroelectric liquid crystal devices 9-A, 10-C and 10-D were prepared by using the compositions 9-A, 10-C and 10-D, respectively, instead of the composition 1-B, and subjected to measurement of optical response time, otherwise in the same manner as in Example 1. The results are shown below.

| | Response time (μsec) | | |
|---|---|---|---|
| | 10° C. | 25° C. | 40° C. |
| 9-A | 1180 | 326 | 100 |
| 10-C | 1022 | 289 | 91 |
| 10-D | 722 | 215 | 77 |

As apparent from the above Example 10 and Comparative Example 10, the ferroelectric liquid crystal device containing the liquid crystal composition 10-B according to the present invention provided improved response speed and operation characteristic at a lower temperature and also provided a descreased temperature dependence of response speed.

EXAMPLE 11

A liquid crystal composition 11-B was prepared by mixing the following example compounds in the indicated proportions with the liquid crystal composition 9-A prepared in Example 9.

| Ex. Comp. No. | Structural formula | wt. parts |
|---|---|---|
| I-33 | $C_8H_{17}$—[N—N/S triazole]—[phenyl/N pyridine]—$O(CH_2)_3\overset{*}{C}HC_2H_5$ with $CH_3$ | 3 |

| Ex. Comp. No. | Structural formula | wt. parts |
|---|---|---|
| I-41 | 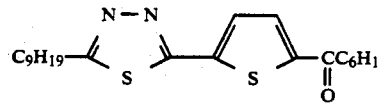 | 2 |
| I-72 | 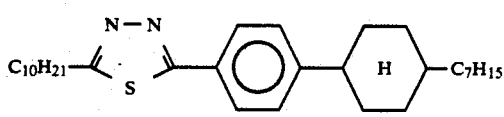 | 2 |
| II-32 | 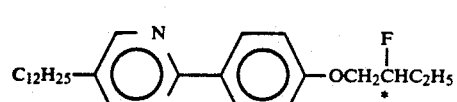 | 2 |
| II-53 | 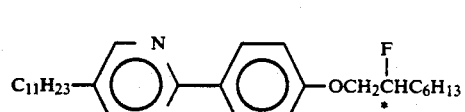 | 2 |
| II-112 | 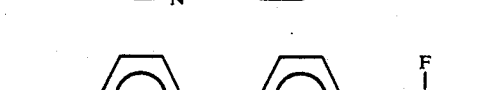 | 2 |
| | Composition 9-A | 87 |

A ferroelectric liquid crystal device was prepared in the same manner as in Example 1 except that the above liquid crystal composition 11-B was used, and the device was subjected to measurement of optical response time and observation of switching states. In the device, a monodomain with a good and uniform alignment characteristic was observed. The results of the measurement are shown below.

| | 10° C. | 25° C. | 40° C. |
|---|---|---|---|
| Response time | 604 μsec | 185 μsec | 68 μsec |

Further, a contrast of 11.7 was attained at 25° C. during the driving, and a clear switching function was observed. The bistability after termination of the voltage application was also good.

COMPARATIVE EXAMPLE 11

A liquid crystal composition 11-C was prepared by omitting Example compounds Nos. II-32, II-53 and II-112 from the liquid crystal composition 11-B prepared in Example 11, i.e., by adding only Example compounds Nos. I-33, I-41 and I-72 to the liquid crystal composition 9-A and a liquid composition composition 11-D was prepared by omitting Example compounds Nos. I-33, I-41 and I-72 from the composition 11-B, i.e., by adding only Example compounds Nos. II-32, II-53 and II-112 to the composition 9-A.

Ferroelectric liquid crystal devices 9-A, 11-C and 11-D were prepared by using the compositions 9-A, 11-C and 11-D, respectively, instead of the composition 1-B, and subjected to measurement of optical response time, otherwise in the same manner as in Example 1. The results are shown below.

| | Response time (μsec) | | |
|---|---|---|---|
| | 10° C. | 25° C. | 40° C. |
| 9-A | 1180 | 326 | 100 |
| 11-C | 1048 | 296 | 92 |
| 11-D | 666 | 202 | 74 |

As apparent from the above Example 11 and Comparative Example 11, the ferroelectric liquid crystal device containing the liquid crystal composition 11-B according to the present invention provided improved response speed and operation characteristic at a lower temperature and also provided a descreased temperature dependence of response speed.

EXAMPLES 12–15

Liquid crystal compositions 12-B to 15-B were prepared by replacing the example compounds and the liquid crystal compositions used in Examples 1 and 5 with example compounds and liquid crystal compositions shown in the following Table 1. Ferroelectric liquid crystal devices were prepared by respectively using these compositions instead of the composition 1-B, and subjected to measurement of optical response time and observation of switching states. In the devices, a monodomain with a good and uniform alignment characteristic was observed. The results of the measurement are shown in the following Table 1.

TABLE 1

| Ex. No. (Comp. No.) | Example Compound No. or liquid crystal composition No. (weight parts) | | | | | | | Response time (μsec) | | |
|---|---|---|---|---|---|---|---|---|---|---|
| | | | | | | | | 10° C. | 25° C. | 40° C. |
| 12 | I-4 | I-34 | I-47 | II-17 | II-30 | II-112 | 1-A | 647 | 222 | 95 |
| (12-B) | 2 | 2 | 4 | 2 | 4 | 4 | 82 | | | |
| 13 | I-27 | I-52 | I-101 | II-4 | II-76 | II-85 | A-1 | 784 | 260 | 105 |
| (13-B) | 3 | 3 | 2 | 4 | 2 | 2 | 84 | | | |
| 14 | I-56 | I-104 | II-14 | II-37 | II-90 | | 5-A | 729 | 254 | 96 |
| (14-B) | 4 | 2 | 3 | 3 | 2 | | 86 | | | |
| 15 | I-10 | I-54 | I-65 | II-45 | II-73 | II-91 | 5-A | 717 | 250 | 95 |
| (15-B) | 2 | 4 | 3 | 3 | 2 | 2 | 84 | | | |

As is apparent from the results shown in the above Table 1, the ferroelectric liquid crystal devices containing the liquid crystal compositions 12-B to 15-B provided improved response speed and operation characteristic at a lower temperature and also provided a decreased temperature dependence of the response speed.

EXAMPLE 16

A blank cell was prepared in the same manner as in Example 1 except for omitting the SiO$_2$ layer to form an alignment control layer composed of the polyimide resin layer alone on each electrode plate. Four ferroelectric liquid crystal devices were prepared by filling such a blank cell with liquid crystal compositions 1-B, 1-A, 1-C and 1-D, respectively, prepared in Example 1 and Comparative Example 1. These liquid crystal devices were subjected to measurement of optical response time in the same manner as in Example 1. The results are shown below.

| | Response time (μsec) | | |
|---|---|---|---|
| | 10° C. | 25° C. | 40° C. |
| 1-B | 708 | 237 | 98 |
| 1-A | 1271 | 392 | 141 |
| 1-C | 1093 | 336 | 125 |
| 1-D | 822 | 264 | 110 |

As is apparent from the above Example 16, also in the case of a different device structure, the device containing the ferroelectric liquid crystal composition 1-B according to the present invention provided improved operation characteristic at a lower temperature and also a decreased temperature dependence of response speed.

EXAMPLE 17

Two liquid crystal devices were prepared by using the liquid crystal compositions 1-B and 1-A used in Example 1 and Comparative Example 1, respectively, otherwise in the same manner as in Example 1.

The tilt angles of the above devices were measured under right-angle cross nicols at 25° C. and microscopic observation to provide 7.6 degrees for the liquid crystal composition 1-A and 8.1 degrees for the liquid crystal composition 1-B. Then, the devices were subjected to application of a ±8 V rectangular waveform at a frequency of 60 KHz, and the tilt angles were measured under the voltage application and microscopic observation to provide 8.7 degrees for the liquid crystal composition 1-A and 12.4 degrees for the liquid crystal composition 1-B. Under these conditions, the contrast ratios were measured to be 10:1 for the liquid crystal composition 1-A and 26:1 for the liquid crystal composition 1-B.

The above results showed the liquid crystal composition 1-B according to the present invention provided a remarkably improved display characteristic when used in a driving method utilizing AC application (or AC stabilization).

EXAMPLES 18–27

The liquid crystal devices were prepared by using the liquid crystal compositions 2-B to 11-B used in Example 2 to 11, respectively, and the liquid crystal compositions 1-A, 5-A and 9-A used in Comparative Examples 1, 5 and 9, respectively, otherwise in the same manner as in Example 1. The tilt angles of these devices were measured in the same manner as in Example 17. The results are shown below.

Tilt angle (degree, at 25° C.)

| | | Tilt angle (degree, at 25° C.) | |
|---|---|---|---|
| | Comp. | Initial (no electric field) | Under AC appln. (60 KHz, ±8 V, rectangular) |
| Ex. 18 | 1-A | 7.6 | 8.7 |
| | 2-B | 8.1 | 11.9 |
| Ex. 19 | 3-B | 7.9 | 12.2 |
| Ex. 20 | 4-B | 8.2 | 12.5 |
| Ex. 21 | 5-A | 7.3 | 8.2 |
| | 5-B | 7.9 | 12.3 |
| Ex. 22 | 6-B | 7.6 | 11.4 |
| Ex. 23 | 7-B | 7.8 | 11.7 |
| Ex. 24 | 8-B | 8.0 | 12.2 |
| Ex. 25 | 9-A | 7.1 | 7.9 |
| | 9-B | 7.6 | 11.5 |
| Ex. 26 | 10-B | 7.8 | 11.9 |
| Ex. 27 | 11-B | 7.5 | 11.6 |

The above results showed the liquid crystal compositions 2-B to 11-B according to the present invention provided a remarkably improved display characteristic when used in a driving method utilizing AC application (or AC stabilization).

As described hereinabove, the ferroelectric liquid crystal composition according to the present invention provides a liquid crystal device which shows a good switching characteristic, an improved operation characteristic and a decreased temperature dependence of response speed. Further, the liquid crystal composition according to the present invention provides a liquid crystal device which shows a remarkably improved display characteristic when used in a driving method utilizing AC stabilization.

What is claimed is:

1. A liquid crystal composition, comprising:
   at least one compound having the following formula (I):

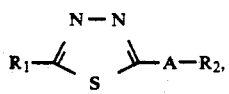 (I)

wherein R₁ and R₂ each is an optically inactive linear or branched alkyl group having 1-18 carbon atoms capable of including one or non-neighboring two or more methylene groups which can be replaced with at least one species of

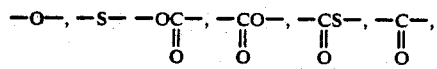

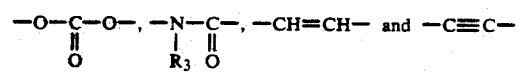

wherein R₃ is hydrogen or methyl; A is —A₁— or —A₂—A₃— wherein A₁ is

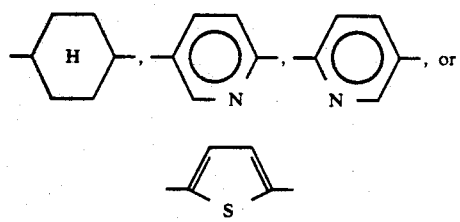

and —A₂—A₃— is

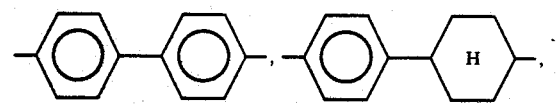

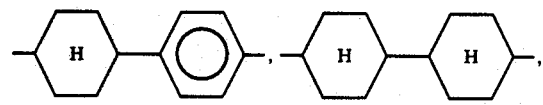

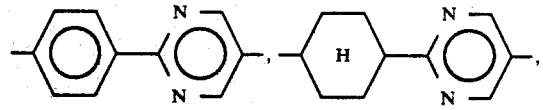

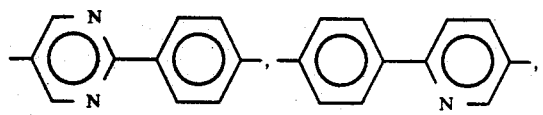

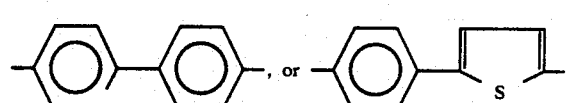

; and
at least one compound having any one of the following formulas (II-a) to (II-c):

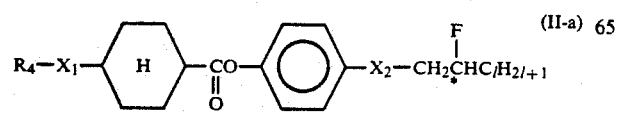 (II-a)

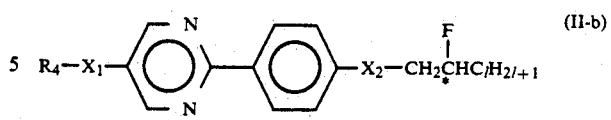 (II-b)

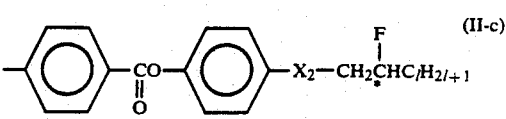 (II-c)

wherein R₄ is a linear or branched alkyl group having 1-18 carbon atoms capable of having an alkoxy substituent; X₁ is a single bond, —O—,

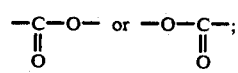

X₂ is a single bond, —O— or

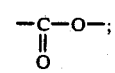

and l is 1-12.

2. A liquid crystal composition according to claim 1, wherein a compound represented by the formula (I) is any one of the following formulas (I-a) to (I-h):

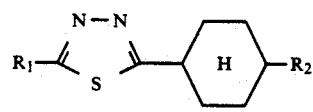 (I-a)

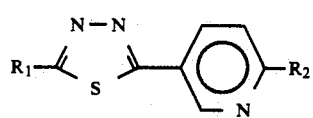 (I-b)

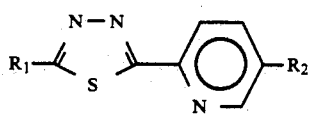 (I-c)

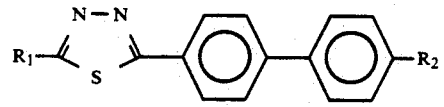 (I-d)

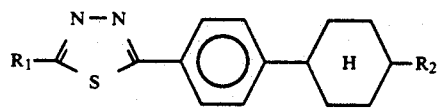 (I-e)

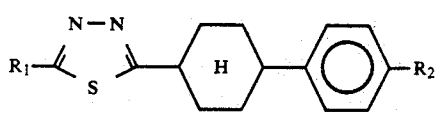 (I-f)

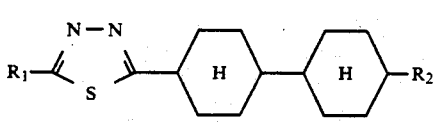 (I-g)

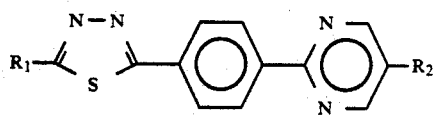

(I-h)

wherein $R_1$ and $R_2$ respectively denote an optically inactive linear or branched alkyl group having 1-18 carbon atoms capable of including one or non-neighboring two or more methylene groups which can be replaced with at least one species of

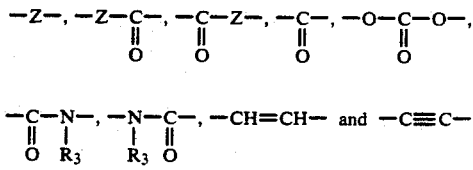

wherein Z denotes —O— or —S— and $R_3$ denotes hydrogen or an alkyl group having 1-5 carbon atoms.

3. A liquid crystal composition according to claim 2, wherein a combination of $R_1$ and $R_2$ is any one of the following combinations (I-i) to (I-vi):

$R_1$ is n-$C_mH_{2m+1}$— and $R_2$ is n-$C_nH_{2n+1}$—$X_3$—; (I-i)

$R_1$ is n-$C_mH_{2m+1}$— and $R_2$ is $R_5$—$\overset{CH_3}{\underset{|}{CH}}$$\leftarrow$$CH_2$$\rightarrow_{\overline{p}}$$X_3$—; (I-ii)

$R_1$ is n-$C_mH_{2m+1}$— and $R_2$ is $R_6O$$\leftarrow$$CH_2$$\rightarrow_{\overline{q}}$$\overset{CH_3}{\underset{|}{CH}}$$\leftarrow$$CH_2$$\rightarrow_{\overline{r}}$$X_3$—; (I-iii)

$R_1$ is $R_7$—$\overset{CH_3}{\underset{|}{CH}}$$\leftarrow$$CH_2$$\rightarrow_{\overline{s}}$ and $R_2$ is n-$C_nH_{2n+1}$—$X_3$—; (I-iv)

$R_1$ is $R_7$—$\overset{CH_3}{\underset{|}{CH}}$$\leftarrow$$CH_2$$\rightarrow_{\overline{s}}$ and $R_2$ is $R_5$—$\overset{CH_3}{\underset{|}{CH}}$$\leftarrow$$CH_2$$\rightarrow_{\overline{p}}$$X_3$—; (I-v)

$R_1$ is $R_7$—$\overset{CH_3}{\underset{|}{CH}}$$\leftarrow$$CH_2$$\rightarrow_{\overline{s}}$ and $R_2$ is $R_6O$$\leftarrow$$CH_2$$\rightarrow_{\overline{q}}$$\overset{CH_3}{\underset{|}{CH}}$$\leftarrow$$CH_2$$\rightarrow_{\overline{r}}$$X_3$—; (I-vi)

wherein m is 1-18, n is 1-17, p is 0-7, q is 0 or 1, r is 0-7 and s is 0-7; $R_5$, $R_6$ and $R_7$ respectively denote a linear or branched alkyl group; and $X_3$ denotes a single bond,

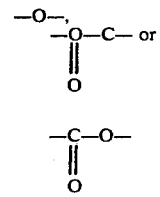

4. A liquid crystal composition according to claim 1, which comprises another mesomorphic compound other than those represented by the formulas (I) and (II) and comprises 1-300 wt. parts each of a compound of the formula (I) and a compound of the formula (II), per 100 wt. parts of said another mesomorphic compound.

5. A liquid crystal composition according to claim 1, which comprises another mesomorphic compound other than those represented by the formulas (I) and (II) and at least two species of compounds from each of at least one group of compounds of the formulas (I) and (II) in a total amount of 1-500 wt. parts per 100 wt. parts of said another mesomorphic compound.

6. A liquid crystal device, comprising a pair of electrode plates and a liquid crystal composition according to any one of claims 1 to 2 and 3 to 5 disposed between the electrode plates.

* * * * *

UNITED STATES PATENT AND TRADEMARK OFFICE
CERTIFICATE OF CORRECTION

PATENT NO. : 5,075,030
DATED : December 24, 1991
INVENTOR(S) : TAKESHI TOGANO, ET AL.

It is certified that error appears in the above-identified patent and that said Letters Patent is hereby corrected as shown below:

Title page:

IN [56] REFERENCES CITED

Under FOREIGN PATENT DOCUMENTS, "242724  11/1986  Japan" should read --246724  11/1986  Japan--.

COLUMN 3

Line 61, "267722/1986," should read --246722/1986,--.

COLUMN 80

In Table, under Ex. Comp. No. II-75, "$H_{31}$" should read --$H_{13}$--.

COLUMN 101

Table 1, " A-1       should    -- 1-A
           84  "     read         84 --.

COLUMN 106

Line 2, "(i-v) should read --(I-v)--.
Line 6, "(i-vi)" should read --(I-vi)--.

Lines 15-17, "$-O-\underset{\underset{O}{\|}}{C}-$" should read --$-O-\underset{\underset{O}{\|}}{C}-$--.

UNITED STATES PATENT AND TRADEMARK OFFICE
CERTIFICATE OF CORRECTION

PATENT NO. : 5,075,030
DATED : December 24, 1991
INVENTOR(S) : TAKESHI TOGANO, ET AL.

It is certified that error appears in the above-identified patent and that said Letters Patent is hereby corrected as shown below:

COLUMN 106

Line 39, "2 and 3 to" should be deleted.

Signed and Sealed this

Sixth Day of July, 1993

Attest:

MICHAEL K. KIRK

Attesting Officer

Acting Commissioner of Patents and Trademarks